US012154236B1

(12) United States Patent
Herman et al.

(10) Patent No.: US 12,154,236 B1
(45) Date of Patent: Nov. 26, 2024

(54) ASSISTED DRAWING AND WRITING IN EXTENDED REALITY

(71) Applicant: Apple Inc., Cupertino, CA (US)

(72) Inventors: Brad K. Herman, Culver City, CA (US); Shiraz Akmal, Playa Vista, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/119,219

(22) Filed: Mar. 8, 2023

Related U.S. Application Data

(60) Provisional application No. 63/319,199, filed on Mar. 11, 2022.

(51) Int. Cl.
| | |
|---|---|
| *G06T 19/00* | (2011.01) |
| *G06F 3/01* | (2006.01) |
| *G06F 3/16* | (2006.01) |
| *G06T 3/40* | (2024.01) |
| *G06T 3/60* | (2024.01) |
| *G06T 13/20* | (2011.01) |
| *G10L 15/22* | (2006.01) |

(52) U.S. Cl.
CPC ............ *G06T 19/006* (2013.01); *G06F 3/013* (2013.01); *G06F 3/167* (2013.01); *G06T 3/40* (2013.01); *G06T 3/60* (2013.01); *G06T 13/20* (2013.01); *G10L 15/22* (2013.01); *G10L 2015/228* (2013.01)

(58) Field of Classification Search
CPC ........... G06T 19/006; G06T 3/40; G06T 3/60; G06T 13/20; G06F 3/013; G06F 3/167; G10L 15/22; G10L 2015/228
See application file for complete search history.

(56) References Cited

U.S. PATENT DOCUMENTS

| | | | |
|---|---|---|---|
| 7,580,576 B2 | 8/2009 | Wang et al. | |
| 7,634,718 B2 | 12/2009 | Nakajima | |
| 7,721,226 B2 | 5/2010 | Barabe et al. | |
| 9,214,137 B2 | 12/2015 | Bala et al. | |
| 9,245,388 B2 | 1/2016 | Poulos et al. | |
| 10,026,209 B1 | 7/2018 | Dagley et al. | |
| 10,339,721 B1 | 7/2019 | Dascola et al. | |
| 10,373,381 B2 | 8/2019 | Nuernberger et al. | |
| 10,776,933 B2 | 9/2020 | Faulkner | |
| 11,380,323 B2 | 7/2022 | Shin et al. | |

(Continued)

FOREIGN PATENT DOCUMENTS

| | | |
|---|---|---|
| CN | 102298493 A | 12/2011 |
| EP | 2393056 A1 | 12/2011 |

(Continued)

*Primary Examiner* — Yaron Cohen
(74) *Attorney, Agent, or Firm* — DLA Piper LLP (US)

(57) ABSTRACT

An example process includes: receiving, from a user, an input corresponding to a request for assistance with a drawing; in accordance with receiving the input, selecting a physical surface in a physical environment; displaying, over the selected physical surface, a graphical overlay representing the drawing, where displaying the graphical overlay over the selected physical surface includes anchoring the graphical overlay to the selected physical surface; and while displaying the graphical overlay over the selected physical surface: detecting a marking produced by the user on the physical surface, the marking corresponding to the drawing.

60 Claims, 31 Drawing Sheets

(56) References Cited

U.S. PATENT DOCUMENTS

| | | | |
|---|---|---|---|
| 2010/0185949 A1 | 7/2010 | Jaeger | |
| 2011/0243448 A1 | 10/2011 | Kawabuchi et al. | |
| 2011/0320969 A1 | 12/2011 | Hwang et al. | |
| 2014/0071241 A1 | 3/2014 | Yang et al. | |
| 2014/0237366 A1 | 8/2014 | Poulos et al. | |
| 2014/0363074 A1 | 12/2014 | Dolfing et al. | |
| 2016/0026242 A1 | 1/2016 | Burns et al. | |
| 2017/0270715 A1* | 9/2017 | Lindsay | G06T 7/60 |
| 2018/0045963 A1 | 2/2018 | Hoover et al. | |
| 2018/0300952 A1 | 10/2018 | Evans et al. | |
| 2019/0096134 A1 | 3/2019 | Amacker et al. | |
| 2020/0218074 A1 | 7/2020 | Hoover et al. | |
| 2020/0226823 A1 | 7/2020 | Stachniak et al. | |
| 2021/0295602 A1 | 9/2021 | Scapel et al. | |
| 2022/0130126 A1 | 4/2022 | Delgado et al. | |
| 2022/0206298 A1 | 6/2022 | Goodman | |

FOREIGN PATENT DOCUMENTS

| | | |
|---|---|---|
| EP | 3336805 A1 | 6/2018 |
| EP | 3506151 A1 | 7/2019 |
| WO | 2016/118344 A1 | 7/2016 |

\* cited by examiner

ASSISTED DRAWING AND WRITING IN EXTENDED REALITY

CROSS-REFERENCE TO RELATED APPLICATIONS

This application claims the benefit of U.S. Provisional Application No. 63/319,199 filed on Mar. 11, 2022, entitled "ASSISTED DRAWING AND WRITING IN EXTENDED REALITY", which is hereby incorporated by reference in its entirety and for all purposes.

FIELD

This relates generally to extended reality, and more specifically to systems and techniques for assisted drawing and writing in extended reality.

BACKGROUND

To provide an extended reality experience, an electronic device can superimpose the display of a virtual object over a view of an environment. Modifying the view in this manner can inform users whether the virtual object is compatible with the environment. For example, displaying a virtual object (e.g., virtual furniture) at various locations in a physical environment can inform a user whether a corresponding physical object (e.g., physical furniture) fits in the physical environment at the various locations.

SUMMARY

Example methods are disclosed herein. An example method includes: receiving, from a user, an input corresponding to a request for assistance with a drawing; in accordance with receiving the input, selecting a physical surface in a physical environment; displaying, over the selected physical surface, a graphical overlay representing the drawing, where displaying the graphical overlay over the selected physical surface includes anchoring the graphical overlay to the selected physical surface; and while displaying the graphical overlay over the selected physical surface: detecting a marking produced by the user on the physical surface, the marking corresponding to the drawing.

Example non-transitory computer-readable media are disclosed herein. An example non-transitory computer-readable storage medium stores one or more programs. The one or more programs comprise instructions, which when executed by one or more processors of an electronic device, cause the electronic device to: receive, from a user, an input corresponding to a request for assistance with a drawing; in accordance with receiving the input, select a physical surface in a physical environment; display, over the selected physical surface, a graphical overlay representing the drawing, where displaying the graphical overlay over the selected physical surface includes anchoring the graphical overlay to the selected physical surface; and while displaying the graphical overlay over the selected physical surface: detect a marking produced by the user on the physical surface, the marking corresponding to the drawing.

Example electronic devices are disclosed herein. An example electronic device comprises one or more processors; a memory; and one or more programs, where the one or more programs are stored in the memory and configured to be executed by the one or more processors, the one or more programs including instructions for: receiving, from a user, an input corresponding to a request for assistance with a drawing; in accordance with receiving the input, selecting a physical surface in a physical environment; displaying, over the selected physical surface, a graphical overlay representing the drawing, where displaying the graphical overlay over the selected physical surface includes anchoring the graphical overlay to the selected physical surface; and while displaying the graphical overlay over the selected physical surface: detecting a marking produced by the user on the physical surface, the marking corresponding to the drawing.

An example electronic device comprises means for: receiving, from a user, an input corresponding to a request for assistance with a drawing; in accordance with receiving the input, selecting a physical surface in a physical environment; displaying, over the selected physical surface, a graphical overlay representing the drawing, where displaying the graphical overlay over the selected physical surface includes anchoring the graphical overlay to the selected physical surface; and while displaying the graphical overlay over the selected physical surface: detecting a marking produced by the user on the physical surface, the marking corresponding to the drawing.

Displaying the graphical overlay and anchoring the graphical overlay to a selected physical surface when predetermined conditions are met allows devices to assist users with quickly and accurately producing requested drawings. For example, the graphical overlay can include a template for the drawing and the user can trace over the graphical overlay to produce the drawing on a physical surface. Accordingly, the techniques described herein can expand the capability and usefulness of electronic devices and make the user-device interaction more efficient (e.g., by reducing the required display time of the graphical overlay, by reducing device resources (e.g., computing resources, memory resources) caused by prolonged user-device interaction to produce the drawing, by reducing user inputs required for devices to provide drawing assistance, by reducing the amount of time the device is active (e.g., turned on) when providing drawing assistance), which additionally, reduces power usage and improves device battery life by enabling quicker and more efficient device usage.

Example methods are disclosed herein. An example method includes: receiving, from a user, an input corresponding to a request for assistance with writing one or more characters in a second language different from a first language; obtaining a translation of the one or more characters from the first language to the second language; in accordance with receiving the input, selecting a physical surface in a physical environment; displaying, over the selected physical surface, a graphical overlay representing the translation, where displaying the graphical overlay over the selected physical surface includes anchoring the graphical overlay to the selected physical surface; and while displaying the graphical overlay over the selected physical surface: detecting a marking produced by the user on the physical surface, the marking corresponding to the one or more characters written in the second language; and modifying the display of the graphical overlay based on the marking.

Example non-transitory computer-readable media are disclosed herein. An example non-transitory computer-readable storage medium stores one or more programs. The one or more programs comprise instructions, which when executed by one or more processors of an electronic device, cause the electronic device to: receive, from a user, an input corresponding to a request for assistance with writing one or more characters in a second language different from a first language; obtain a translation of the one or more characters from the first language to the second language; in accordance with receiving the input, select a physical surface in a physical environment; display, over the selected physical surface, a graphical overlay representing the translation, where displaying the graphical overlay over the selected physical surface includes anchoring the graphical overlay to the selected physical surface; and while displaying the graphical overlay over the selected physical surface: detect a marking produced by the user on the physical surface, the marking corresponding to the one or more characters written in the second language; and modify the display of the graphical overlay based on the marking.

Example electronic devices are disclosed herein. An example electronic device comprises one or more processors; a memory; and one or more programs, where the one or more programs are stored in the memory and configured to be executed by the one or more processors, the one or more programs including instructions for: receiving, from a user, an input corresponding to a request for assistance with writing one or more characters in a second language different from a first language; obtaining a translation of the one or more characters from the first language to the second language; in accordance with receiving the input, selecting a physical surface in a physical environment; displaying, over the selected physical surface, a graphical overlay representing the translation, where displaying the graphical overlay over the selected physical surface includes anchoring the graphical overlay to the selected physical surface; and while displaying the graphical overlay over the selected physical surface: detecting a marking produced by the user on the physical surface, the marking corresponding to the one or more characters written in the second language; and modifying the display of the graphical overlay based on the marking.

An example electronic device comprises means for: receiving, from a user, an input corresponding to a request for assistance with writing one or more characters in a second language different from a first language; obtaining a translation of the one or more characters from the first language to the second language; in accordance with receiving the input, selecting a physical surface in a physical environment; displaying, over the selected physical surface, a graphical overlay representing the translation, where displaying the graphical overlay over the selected physical surface includes anchoring the graphical overlay to the selected physical surface; and while displaying the graphical overlay over the selected physical surface: detecting a marking produced by the user on the physical surface, the marking corresponding to the one or more characters written in the second language; and modifying the display of the graphical overlay based on the marking.

Displaying the graphical overlay representing the translation and anchoring the graphical overlay to a selected physical surface when predetermined conditions are met allows devices to assist users with quickly and accurately writing in a desired (e.g., foreign) language. For example, the graphical overlay can include a template for writing in the foreign language and the user can trace over the graphical overlay to produce desired writing on a physical surface. Further, modifying the display of the graphical overlay based on the marking can further increase the efficiency and accuracy of the user's writing. For example, the modified graphical overlay can indicate a correct next stroke for writing the foreign language and/or indicate which portions of the writing the user has successfully completed. Accordingly, the techniques described herein can expand the capability and usefulness of electronic devices and make the user-device interaction more efficient (e.g., by reducing the required display time of the graphical overlay, by reducing device resources (e.g., computing resources, memory resources) caused by prolonged user-device interaction to produce the writing, by reducing user inputs required for devices to provide writing assistance, by reducing the amount of time the device is active (e.g., turned on) to provide accurate writing assistance, by expanding the educational capabilities of electronic devices), which additionally, reduces power usage and improves device battery life by enabling quicker and more efficient device usage.

Example methods are disclosed herein. An example method includes: receiving, from a user, a first input corresponding to a request for assistance with a drawing; in accordance with receiving the first input, selecting a physical surface in a physical environment; displaying, over the selected physical surface, a graphical overlay representing the drawing, where displaying the graphical overlay over the selected physical surface includes anchoring the graphical overlay to the selected physical surface; while displaying the graphical overlay over the selected physical surface, receiving, from the user, a second input corresponding to a request to save a layout corresponding to the drawing; in accordance with receiving the second input, generating the layout corresponding to the drawing, where the layout indicates an anchoring of the graphical overlay to the selected physical surface; and transmitting the layout to an external electronic device.

Example non-transitory computer-readable media are disclosed herein. An example non-transitory computer-readable storage medium stores one or more programs. The one or more programs comprise instructions, which when executed by one or more processors of an electronic device, cause the electronic device to: receive, from a user, a first input corresponding to a request for assistance with a drawing; in accordance with receiving the first input, select a physical surface in a physical environment; display, over the selected physical surface, a graphical overlay representing the drawing, where displaying the graphical overlay over the selected physical surface includes anchoring the graphical overlay to the selected physical surface; while displaying the graphical overlay over the selected physical surface, receive, from the user, a second input corresponding to a request to save a layout corresponding to the drawing; in accordance with receiving the second input, generate the layout corresponding to the drawing, where the layout indicates an anchoring of the graphical overlay to the selected physical surface; and transmit the layout to an external electronic device.

Example electronic devices are disclosed herein. An example electronic device comprises one or more processors; a memory; and one or more programs, where the one or more programs are stored in the memory and configured to be executed by the one or more processors, the one or more programs including instructions for: receiving, from a user, a first input corresponding to a request for assistance with a drawing; in accordance with receiving the first input, selecting a physical surface in a physical environment; displaying, over the selected physical surface, a graphical overlay representing the drawing, where displaying the graphical overlay over the selected physical surface includes anchoring the graphical overlay to the selected physical surface; while displaying the graphical overlay over the selected physical surface, receiving, from the user, a second input corresponding to a request to save a layout corresponding to the drawing; in accordance with receiving the second input, generating the layout corresponding to the drawing, where the layout indicates an anchoring of the graphical overlay to the selected physical surface; and transmitting the layout to an external electronic device.

An example electronic device comprises means for: receiving, from a user, a first input corresponding to a request for assistance with a drawing; in accordance with receiving the first input, selecting a physical surface in a physical environment; displaying, over the selected physical surface, a graphical overlay representing the drawing, where displaying the graphical overlay over the selected physical surface includes anchoring the graphical overlay to the selected physical surface; while displaying the graphical overlay over the selected physical surface, receiving, from the user, a second input corresponding to a request to save a layout corresponding to the drawing; in accordance with receiving the second input, generating the layout corresponding to the drawing, where the layout indicates an anchoring of the graphical overlay to the selected physical surface; and transmitting the layout to an external electronic device.

Generating and transmitting the layout when predetermined conditions are met allows devices to assist multiple users with quickly and accurately producing the same drawing. For example, using the layout, respective users of a first device (that transmitted the layout) and a second device (that received the transmitted layout) can concurrently work on the same drawing on the same physical surface. Accordingly, the techniques described herein can expand the capability and usefulness of electronic devices and make the user-device interaction more efficient (e.g., by reducing the display time of the graphical overlay required to complete the drawing, by reducing device resources (e.g., computing resources, memory resources) caused by prolonged user-device interaction to produce the drawing, by reducing user inputs required for devices to provide drawing assistance, by reducing the amount of time the device is active (e.g., turned on) when providing drawing assistance, by enabling work to be shared among users), which additionally, reduces power usage and improves device battery life by enabling quicker and more efficient device usage.

Example methods are disclosed herein. An example method includes: receiving, from an external electronic device, a layout corresponding to a drawing, where the layout indicates an anchoring of a graphical overlay representing the drawing to a physical surface; receiving, from a user, an input corresponding to a selection of the layout; in accordance with receiving the input: detecting, in a physical environment, the physical surface; and in accordance with detecting the physical surface, displaying the graphical overlay over the physical surface, where the displayed graphical overlay is anchored to the physical surface.

Example non-transitory computer-readable media are disclosed herein. An example non-transitory computer-readable storage medium stores one or more programs. The one or more programs comprise instructions, which when executed by one or more processors of an electronic device, cause the electronic device to: receive, from an external electronic device, a layout corresponding to a drawing, where the layout indicates an anchoring of a graphical overlay representing the drawing to a physical surface; receive, from a user, an input corresponding to a selection of the layout; in accordance with receiving the input: detect, in a physical environment, the physical surface; and in accordance with detecting the physical surface, display the graphical overlay over the physical surface, where the displayed graphical overlay is anchored to the physical surface.

Example electronic devices are disclosed herein. An example electronic device comprises one or more processors; a memory; and one or more programs, where the one or more programs are stored in the memory and configured to be executed by the one or more processors, the one or more programs including instructions for: receiving, from an external electronic device, a layout corresponding to a drawing, where the layout indicates an anchoring of a graphical overlay representing the drawing to a physical surface; receiving, from a user, an input corresponding to a selection of the layout; in accordance with receiving the input: detecting, in a physical environment, the physical surface; and in accordance with detecting the physical surface, displaying the graphical overlay over the physical surface, where the displayed graphical overlay is anchored to the physical surface.

An example electronic device comprises means for: receiving, from an external electronic device, a layout corresponding to a drawing, where the layout indicates an anchoring of a graphical overlay representing the drawing to a physical surface; receiving, from a user, an input corresponding to a selection of the layout; in accordance with receiving the input: detecting, in a physical environment, the physical surface; and in accordance with detecting the physical surface, displaying the graphical overlay over the physical surface, where the displayed graphical overlay is anchored to the physical surface.

Receiving the layout and displaying the graphical overlay when predetermined conditions are met allows devices to assist multiple users with quickly and accurately producing the same drawing. For example, using the layout, respective users of a first device (that transmitted the layout) and a second device (that received the transmitted layout) can concurrently work on the same drawing on the same physical surface. Accordingly, the techniques described herein can expand the capability and usefulness of electronic devices and make the user-device interaction more efficient (e.g., by reducing the display time of the graphical overlay required to complete the drawing, by reducing device resources (e.g., computing resources, memory resources) caused by prolonged user-device interaction to produce the drawing, by reducing user inputs required for devices to provide drawing assistance, by reducing the amount of time the device is active (e.g., turned on) when providing drawing assistance, by enabling work to be shared among users), which additionally, reduces power usage and improves device battery life by enabling quicker and more efficient device usage.

DESCRIPTION

Figure 1A:
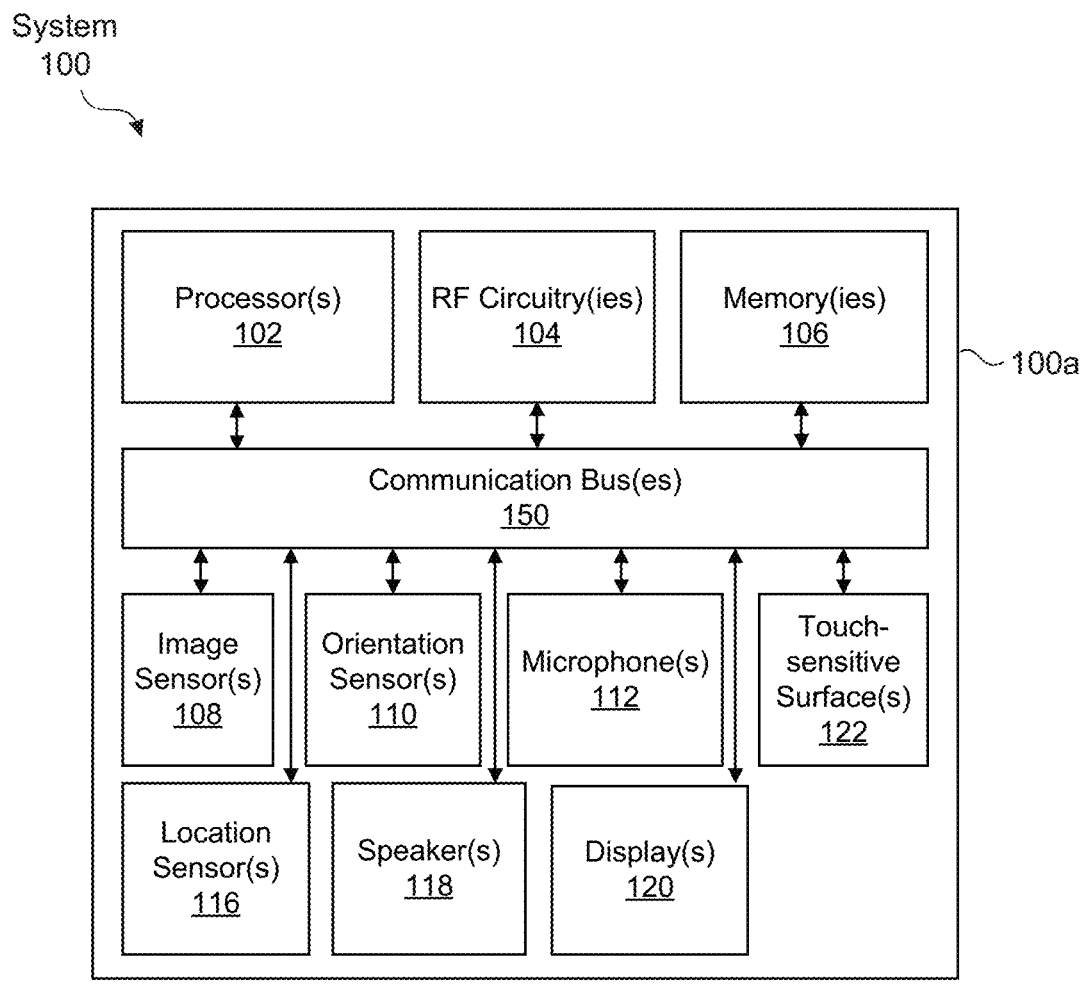
FIGS. 1A-1B depict exemplary systems for use in various computer-generated reality technologies, including virtual reality and mixed reality.

Various examples of electronic systems and techniques for using such systems in relation to various computer-generated reality technologies are described.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
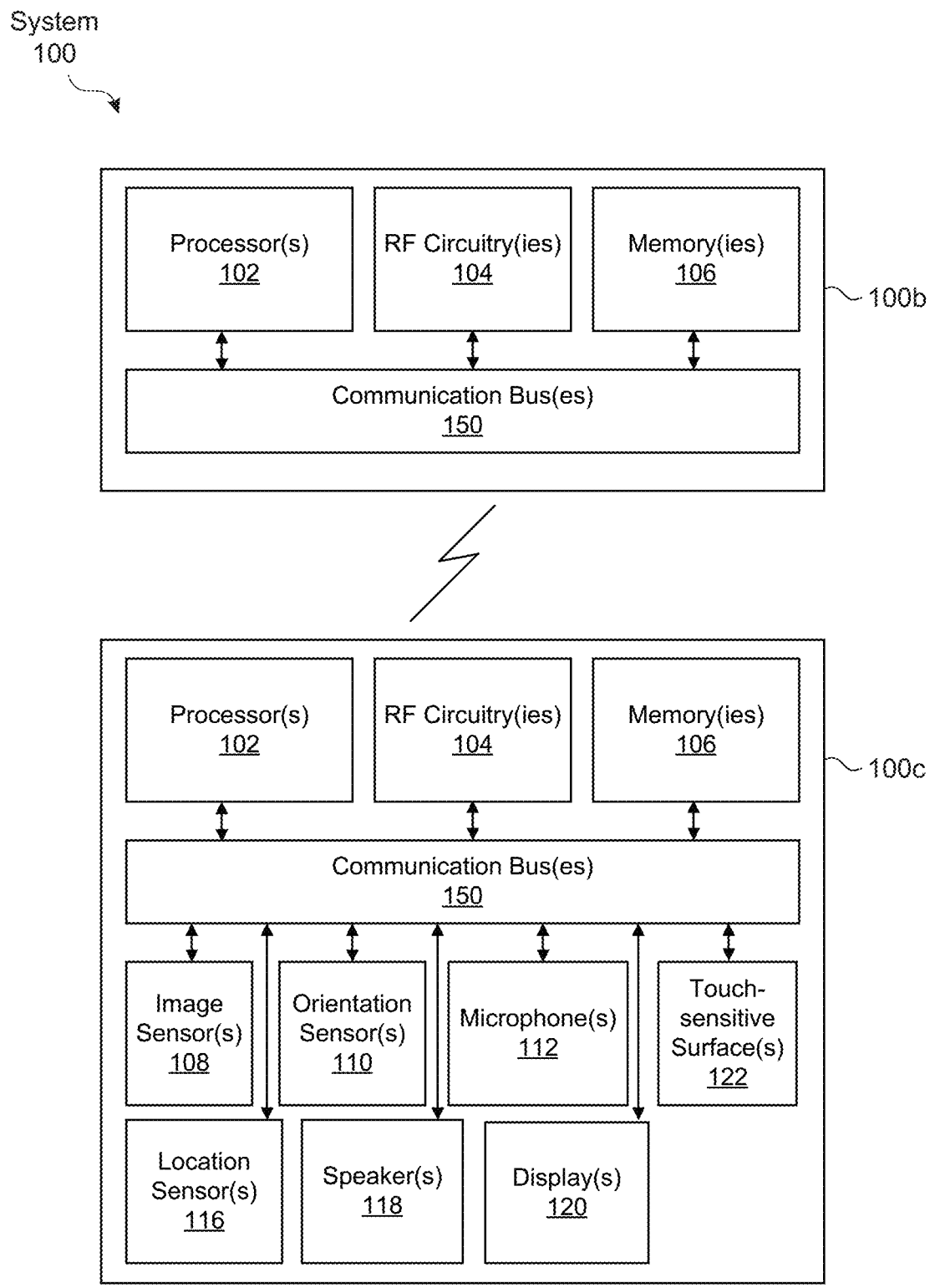

FIG. 1A and FIG. 1B depict exemplary system 100 for use in various computer-generated reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is a head-mounted display (HMD) device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

As used herein, an "installed application" refers to a software application that has been downloaded onto an electronic device (e.g., devices 100*a*, 100*b*, and/or 100*c*) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information, e.g., in memory(ies) 106. An open or executing application is, optionally, any one of the following types of applications:

- an active application, which is currently displayed on a display screen of the device that the application is being used on (or which is currently being projected by the device that the application is being used on);
- a background application (or background processes), which is not currently displayed (or not currently projected), but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Figure 2:
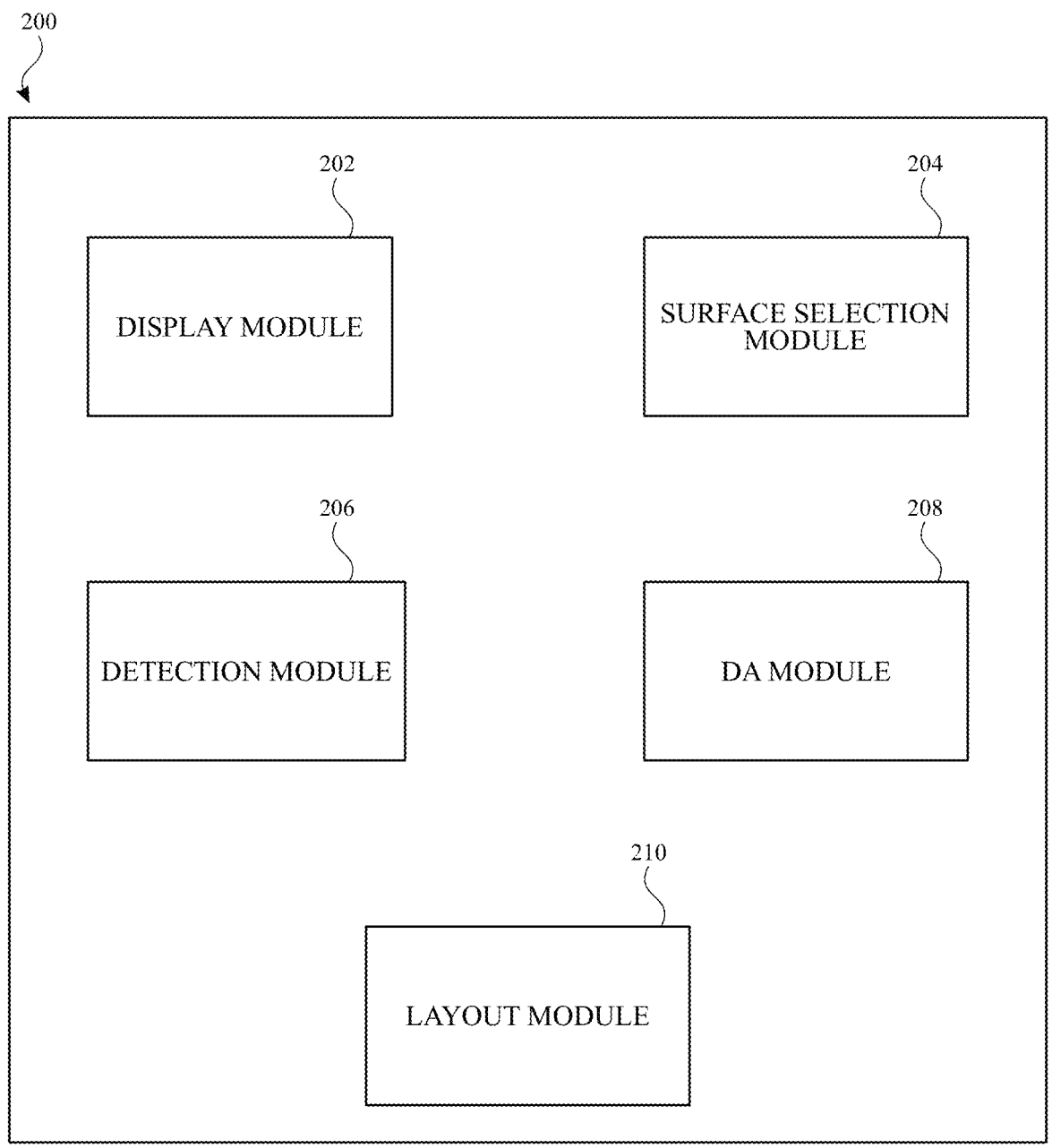
FIG. 2 illustrates a system for providing drawing or writing assistance in extended reality, according to various examples.

FIG. 2 illustrates system 200 for providing drawing or writing assistance in extended reality, according to various examples.

System 200 is at least partially implemented within system 100, e.g., within device 100*a*, device 100*b*, and/or device 100*c*. For example, at least some of the components of functionalities of system 200 are implemented as computer-executable instructions stored in memory(ies) 106. As a particular example, some of the components of system 200 (e.g., display module 202, surface selection module 204, detection module 206, and layout module 210) are implemented within a software application installed on system 100, e.g., a drawing or writing assistance application.

The various components and functions of system 200 may be implemented in hardware, software instructions for execution by one or more processors, firmware, including one or more signal processing and/or application specific integrated circuits, or a combination or sub-combination thereof. Further, system 200 is only one example of a system for providing drawing or writing assistance, and system 200 can have more or fewer components than shown, can combine two or more components, or can have a different configuration or arrangement of the components. Further, although the below describes that a single component of system 200 performs a certain function, another component of system 200 may perform the function, or the function may be performed by a combination of two or more components.

System 200 includes display module 202. Display module 202 is configured to cause an electronic device to display a graphical overlay (e.g., graphical overlays 314, 402, 512, 604, 702, and 902). In some examples, the graphical overlay visually represents a user requested drawing. In some examples, the graphical overlay visually represents one or more characters (e.g., letters, symbols, words), such as characters translated from a user's native language to a foreign language. Thus, when the device displays the graphical overlay over a surface, a user can trace over the graphical overlay with a drawing instrument (e.g., pen, pencil, marker, paintbrush, chalk, or any other instrument capable of marking the surface) to produce the drawing or the characters on the surface.

In some examples, display module 202 is configured to cause the device to modify a display manner of the graphical overlay (or a portion thereof). Example display manner modifications include modifications to brightness, color (e.g., hue, vibrance), transparency, depth, contrast, line width, and line style (e.g., solid lines, dashed lines). Other example display manner modifications include applying an image processing technique (e.g., applying a filter (e.g., high contrast filter, black and white filter, any other filter available in an image editing application, e.g., Abode Photoshop, Instagram, the Photos application by Apple Inc.)) to the graphical overlay, magnifying the display of the graphical overlay, and animating the graphical overlay, e.g., to show a suggested stroke order for the drawing or writing. Other example display manner modifications include modifications to the graphical overlay's location, orientation, and scale. In some examples, display module 202 causes the device to perform different types of modifications to the graphical overlay in accordance with determining that respective different conditions are met, as described in detail below.

In examples where the device is implemented as a projection-based device (e.g., having no display capability), the electronic device can project the graphical overlay and modify the projection. Accordingly, the below description of displaying a graphical overlay and modifying the display thereof applies analogously to a projection-based device projecting the graphical overlay and modifying the projection thereof.

Further details about displaying and modifying graphical overlays are discussed with respect to FIGS. 3A-3M, 4A-4E, 5A-5F, 6A-6F, 7A-7F, 8A-8B, and 9A-9I below.

System 200 includes surface selection module 204. Surface selection module 204 is configured to select a surface (e.g., a physical surface in a physical environment, a virtual surface in a virtual environment) over which to display the graphical overlay. In some examples, surface selection module 204 receives user input (e.g., surface selection input such as gesture input, gaze input, speech input, or touch input) detected by sensor(s) of the device (e.g., image sensor(s) 108, microphone(s) 112, touch sensitive surface(s) 122) and processes the user input to select the surface.

In some examples, surface selection module 204 is configured to anchor the graphical overlay to the selected surface. For example, surface selection module 204 is configured to cause the electronic device to modify a display location of the graphical overlay (e.g., responsive to the user's and/or device's pose (e.g., position and orientation) changes) such that the graphical overlay does not appear to move relative to the surface. In some examples, anchoring the graphical overlay to the selected surface includes displaying the graphical overlay on the selected surface and maintaining the graphical overlay's actual size (e.g., scale) relative to the surface's actual size. As used herein, the actual size of an object quantifies the dimensions of the object, e.g., 5 feet long and 10 feet wide. Accordingly, the actual size of an object remains constant if a user views the object from varying poses. In contrast, the perceived (e.g., displayed) size of an object can change based on a user's distance from the object. For example, an object has a larger (or smaller) perceived size as the user moves towards (or away from) the object, but the object's actual size remains constant. Accordingly, when anchored to the surface, the actual size of the graphical overlay does not increase or decrease relative to the actual size of the surface when the user and/or device changes pose.

In some examples, surface selection module 204 is configured to determine whether a graphical overlay (having a current location, orientation, and actual size) is compatible with a surface. For example, surface selection module 204 determines whether the graphical overlay can be anchored to the surface and/or determines whether the actual size of the graphical overlay is compatible with the actual size of the surface, e.g., whether the graphical overlay entirely fits on the surface.

In some examples, surface selection module 204 is configured to detect a surface previously selected by another device, e.g., using image sensor(s) 108. For example, the device implementing surface selection module 204 receives, from another device, a drawing layout representing the previously selected surface. Surface selection module 204 then attempts to detect the same surface represented by the drawing layout. Drawing layouts are discussed in greater detail below with respect to layout module 210.

Further details about surface selection module 204 are discussed with respect to FIGS. 3A-3M, 4A-4E, 5A-5F, 6A-6F, 7A-7F, 8A-8B, and 9A-9I below.

System 200 includes detection module 206. In some examples, detection module 206 is configured to cause a device to detect a marking (e.g., drawing and/or writing) produced by a user on a surface, e.g., using image sensor(s) 108. In some examples, detection module 206 processes the detected marking using image recognition techniques. For example, detection module 206 compares the detected marking to the graphical overlay to determine a degree of match between the user's drawing and the graphical overlay, to determine a degree of completion of the represented drawing (or represented character(s)), and/or to determine a proper next stroke for drawing (or writing) the represented drawing (or the represented character(s)).

In some examples, detection module 206 is configured to cause the device to detect movement of the user that corresponds to producing the marking. In some examples, detecting movement of the user includes detecting movement of a particular appendage (e.g., arm, hand, fingers) of the user. In some examples, detecting movement of the user includes detecting movement of a drawing instrument held by the user. For example, detection module 206 applies object recognition and tracking techniques to data from image sensor(s) 108 to track user movements corresponding to producing the marking. In some examples, based on the detected movement, detection module 206 determines a visual representation of the movement. For example, detection module 206 generates a video animating the marking being produced over time and/or animating the user's (and/or drawing instrument's) movements that produce the marking.

Further details about detection module 206 are discussed with respect to FIGS. 3A-3M, 4A-4E, 5A-5F, 6A-6F, 7A-7F, 8A-8B, and 9A-9I below.

System 200 includes layout module 210. Layout module 210 is configured to generate and save a layout corresponding to a drawing (drawing layout). The drawing layout is a file including data representing the graphical overlay (e.g., with a preselected location, scale, and/or orientation) and a selected surface over which the graphical overlay is displayed and/or anchored to. In some examples, the drawing layout indicates an anchoring of the graphical overlay to the selected surface.

In some examples, the device transmits the drawing layout to an external device. Based on the received drawing layout, the external device can detect the previously selected surface and display the graphical overlay over the same surface. In some examples, because the drawing layout indicates an anchoring of the graphical overlay to the surface, the external electronic device does not perform additional processing (or performs reduced processing) to anchor the graphical overlay to the surface. As discussed in greater detail below with respect to FIGS. 8A-8B and FIGS. 9A-9I, transmitting the drawing layout to external devices can allow multiple users to concurrently work on the same drawing on the same surface.

Further details about layout module 210 are discussed with respect to FIGS. 8A-8B and 9A-9I below.

System 200 includes digital assistant (DA) module 208. DA module 208 is configured to provide DA functionality to the device. A DA processes natural language input (e.g., in spoken or textual form) to perform a corresponding task for a user. For example, DA module 208 is configured to perform automatic speech recognition (ASR) on received natural language speech input to obtain candidate textual representation(s). DA module 208 is configured to perform natural language processing (NLP) on the textual representation(s) to determine corresponding actionable intent(s). An actionable intent (or user intent) includes a computer generated representation the natural language input's meaning and corresponds to one or more task flows. A task flow includes a series of steps (e.g., computer executable instructions), that when executed, causes the device to satisfy the corresponding actionable intent.

Accordingly, once DA module 208 determines an actionable intent, DA module 208 executes the corresponding task flow to provide an output to satisfy the user intent. It will be appreciated that the number of actionable intents (and corresponding task flows) recognized by DA module 208 can define the scope of the DA's capabilities. Example actionable intents include sending a message, performing a web search, translating between languages, retrieving sports information, retrieving weather information, setting a timer, launching an application, controlling an external electronic device (e.g., a home automation device), making a payment, providing drawing or writing assistance, and the like. Example DAs include Siri by Apple Inc., Alexa by Amazon.com, Inc., Google Assistant by Google LLC, Cortana by Microsoft Corp, and Bixby by Samsung Electronics Co., Ltd.

In some examples, DA module 208 processes a natural language input in accordance with receiving input indicating the natural language input is intended for the DA. Examples of such inputs include a spoken trigger input (e.g., "Hey Assistant"), input pressing a button, input selecting a displayed icon, predetermined types of gesture input, gaze input (e.g., indicating gaze at an icon), and the like. In some examples, DA module 208 interprets natural language inputs as intended for the DA if the DA is awaiting (e.g., listening for) natural language input, e.g., if the DA and/or the device recently prompted the user to provide natural language input.

FIGS. 3A-3M illustrate techniques for assisted drawing, according to various examples.

FIGS. 3A-3M, 4A-4E, 5A-5F, 6A-6F, 7A-7F, and 9A-9I show a user's view of environment 300 using device 302 or device 950 (e.g., a device implemented as another instance of device 302). Device 302 is implemented as device 100a or 100c. In the examples illustrated in FIGS. 3A-3M, 4A-4E, 5A-5F, 6A-6F, 7A-7F, 8A-8B, and 9A-9I, device 302 is a head mounted device, e.g., a headset, eyeglasses, lenses designed for placement on the user's eyes, and the like. In other examples, device 302 is another type of electronic device such as a smart phone, a tablet device, a laptop computer, or a projection-based device.

In the examples illustrated in FIGS. 3A-3M, 4A-4E, 5A-5F, 6A-6F, 7A-7F, and 9A-9I, environment 300 is a physical environment, e.g., a physical room including physical whiteboard 304. For example, the user views environment 300 directly via a transparent or translucent display of device 302. As another example, device 302 includes an opaque display and device 302 displays environment 300 via pass-through video. As another example, device 302 is a projection-based device and the user views environment 300 directly without using a display and views virtual elements projected by device 302 into environment 300.

In some examples, environment 300 is a displayed virtual environment, e.g., a virtual room including whiteboard 304 as a virtual object.

Figure 3A:
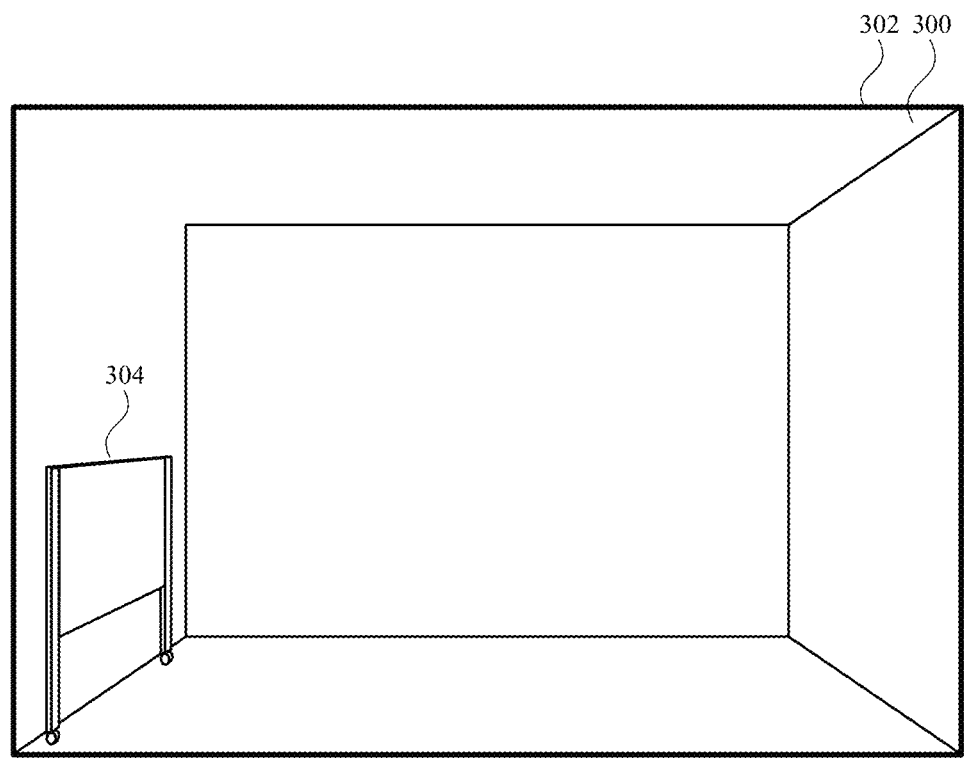
FIGS. 3A-3M illustrate techniques for assisted drawing, according to various examples.
Figure 3B:
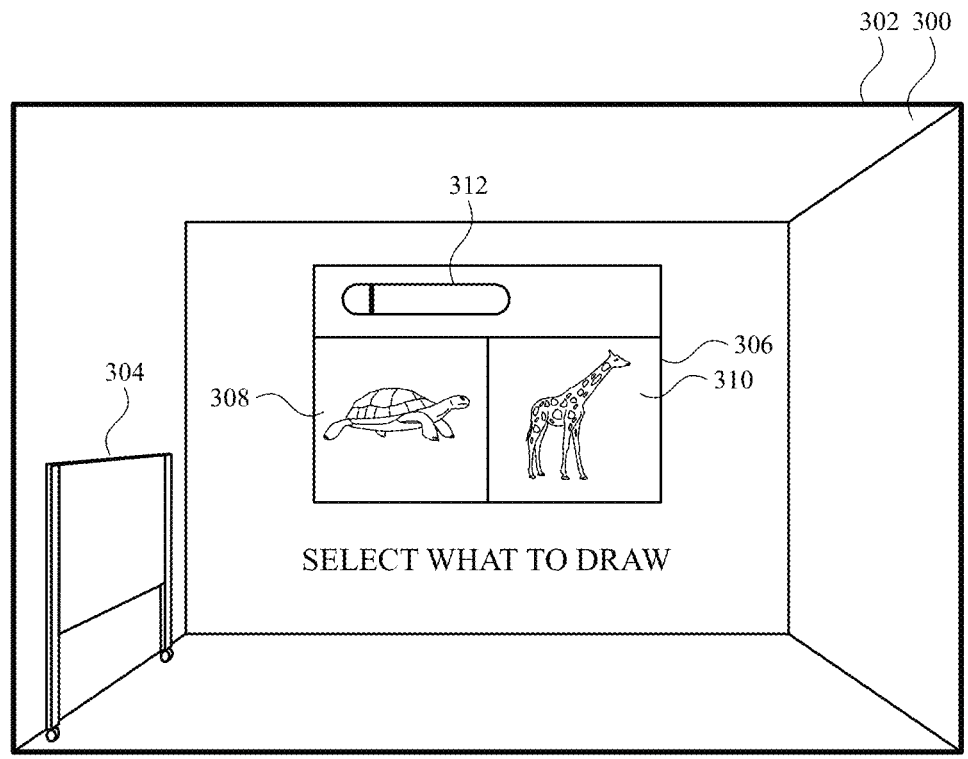

FIG. 3B shows user interface 306 displayed over environment 300, e.g., as a virtual element. User interface 306 corresponds to a drawing assistance application installed on device 302. In some examples, displaying user interface 306 includes launching the drawing assistance application (e.g., if the application was previously closed) and/or displaying user interface 306 in the foreground (e.g., if the application was previously a background application). For example, to display the view of FIG. 3B, device 302 receives user input to launch the application or to display the application in the foreground.

User interface 306 includes a displayed prompt for the user to select a drawing, e.g., "select what to draw." In some examples, a DA audibly prompts for the user to select the drawing. For example, the DA generates the prompt "select what to draw."

User interface 306 further includes drawing data, e.g., image 308 and 3-dimensional (3D) model 310 of an object. For example, the user can provide input to rotate 3D model 310 to view the object (e.g., a giraffe) with different spatial orientations. In some examples, the drawing data are sourced from a multimedia application of device 302 (e.g., a photos application), thereby allowing users to select to draw an image or 3D model from their personal data.

User interface 306 further includes search bar 312. Using search bar 312, the user can provide input to search for (e.g., via a web search) requested drawing data.

Device 302 receives, from the user, an input corresponding to a request for assistance with a drawing (drawing assistance input). In some examples, the drawing assistance input (e.g., gesture input, touch input, speech input, or gaze input) corresponds to a selection of drawing data, e.g., a selection of image 308 corresponding to the drawing or a selection of 3D model 310 corresponding to the drawing. In some examples, the drawing assistance input includes a response to the DA's prompt for the user to select the drawing.

In some examples, the drawing assistance input includes a speech input specifying the drawing. For example, DA module 208 processes the speech input to determine a user intent of providing drawing (or writing) assistance and determines the specified drawing. In some examples, the speech input includes a reference (e.g., an ambiguous reference such as "this" or "that") to the drawing data. In some examples, DA module 208 processes the speech input using associated context information to determine the specified drawing data. Example associated context information includes detected gaze input, detected touch input, detected gesture input, and the content displayed when device 302 receives the speech input. For example, based on the speech input "this one" and context data indicating that a user gestures at (e.g., points at) image 308 when providing the speech input, DA module 208 determines that the speech input specifies image 308.

Figure 3C:
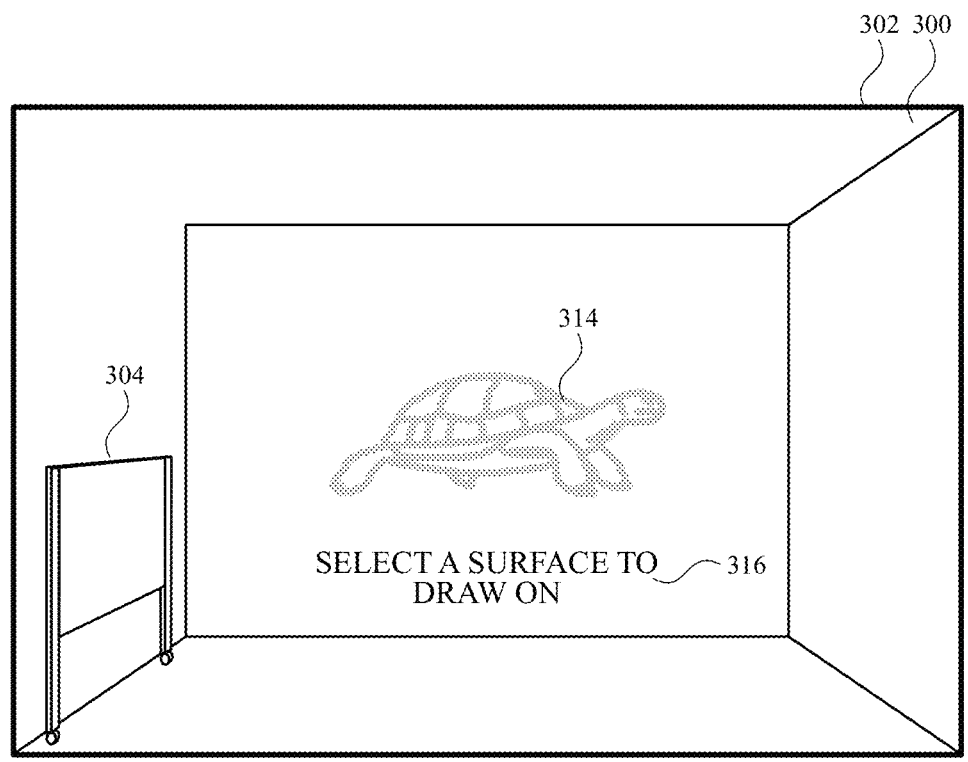

Turning to FIG. 3C, in some examples, device 302 (e.g., using display module 202) obtains graphical overlay 314 representing the drawing. In some examples, graphical overlay 314 includes a template that assists the user with producing the drawing, e.g., includes a line drawing of the drawing data, includes portions displayed in various manners (e.g., color, line width, shading) to indicate that corresponding portions of the drawing should be produced in the respective manners, and/or otherwise visually indicates how to produce the drawing. In some examples, device 302 processes selected drawing data (e.g., image or 3D model) to obtain graphical overlay 314, e.g., by converting the image or 3D model into a line drawing. In some examples, if device 302 receives natural language input specifying the drawing (e.g., "help me draw a turtle"), device 302 selects predetermined graphical overlay 314 representing the drawing. As another example, if device 302 receives natural language input specifying the drawing, device 302 searches (e.g., via a web search) for specified drawing data and processes the drawing data to obtain graphical overlay 314.

In some examples, the drawing includes multiple layers, e.g., multiple color layers, multiple paint layers. In some examples, graphical overlay 314 represents a single layer of the multiple layers. Accordingly, to produce a drawing with multiple layers, the user can request device 302 to sequentially display different graphical overlays that respectively represent the drawing's layers.

In FIG. 3C, in accordance with receiving the drawing assistance input, device 302 displays graphical overlay 314 representing the drawing over environment 300. For example, FIG. 3C shows the user's view responsive to user selection of image 308 in FIG. 3B. In some examples, displaying graphical overlay 314 over environment 300 includes displaying graphical overlay 314 to appear a predetermined distance (e.g., 10 feet, 5 feet) away from the user and/or from device 302.

In some examples, in accordance with receiving the drawing assistance input, device 302 ceases to display (or forgoes displaying), over environment 300, one or more virtual objects. In some examples, the one or more virtual objects are of a predetermined type, such as virtual objects other than graphical overlay 314 that obstruct a threshold percentage of the user's field of view. For example, in FIG. 3C, device 302 ceases to display user interface 306.

In some examples, the user rotates graphical overlay 314. For example, in FIG. 3C, device 302 displays graphical overlay 314 with a first orientation. While displaying graphical overlay 314 with the first orientation, device 302 receives input (e.g., gaze input, gesture input, speech input, or touch input) corresponding to rotation of graphical overlay 314. In accordance with receiving the input, device 302 displays graphical overlay 314 with a second orientation. In some examples, displaying graphical overlay 314 over a selected surface (as discussed below) includes displaying graphical overlay 314 with the second orientation. In some examples, the rotation is a 2-dimensional rotation, e.g., if graphical overlay 314 represents an image. In some examples, the rotation is a 2-dimensional and/or a 3-dimensional rotation, e.g., if graphical overlay 314 represents a 3D model.

In some examples, the user rescales graphical overlay 314, e.g., modifies graphical overlay 314's actual size. For example, in FIG. 3C, device 302 displays graphical overlay 314 with a first scale. While displaying graphical overlay 314 with a first scale, device 302 receives input (e.g., gaze input, gesture input, speech input, or touch input) corresponding to rescaling graphical overlay 314. In accordance with receiving the input, device 302 displays graphical overlay 314 with a second scale. In some examples, displaying graphical overlay 314 over a selected surface (as discussed below) includes displaying graphical overlay 314 with the second scale.

Figure 3D:
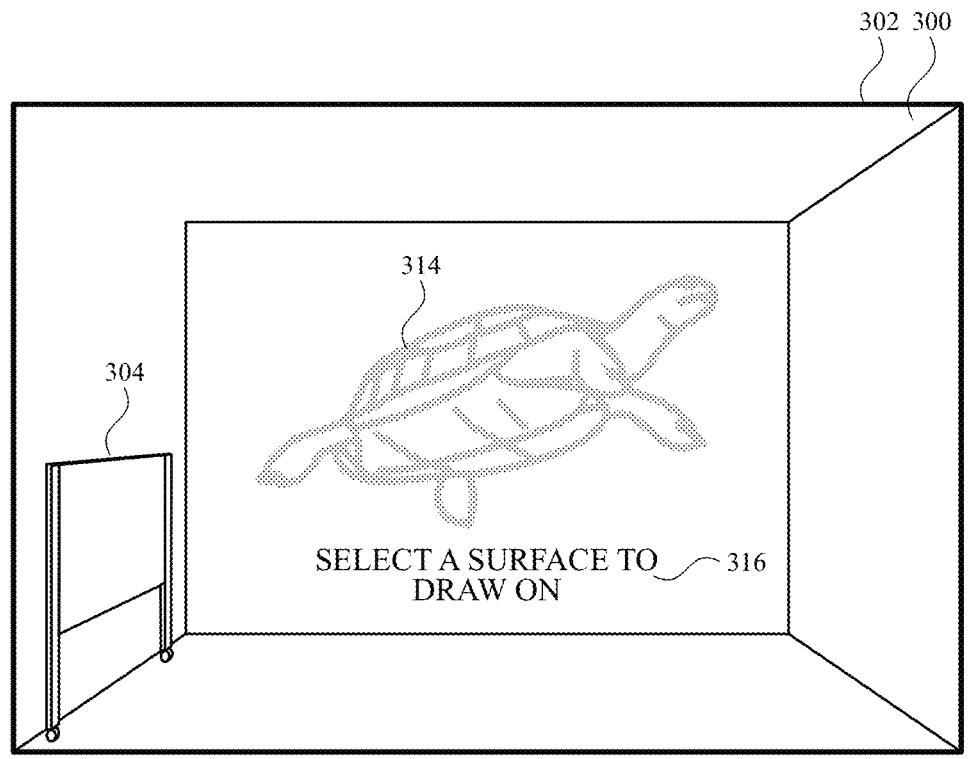

FIG. 3D shows device 302 displaying graphical overlay 314 with a second orientation and a second scale, e.g., responsive to receiving respective inputs. For example, device 302 received input to enlarge and to rotate graphical overlay 314 relative to the display of graphical overlay 314 in FIG. 3C.

In some examples, in accordance with receiving the drawing assistance input, device 302 outputs a prompt (e.g., audio prompt, displayed prompt) for a user to select a surface for the drawing. For example, in FIGS. 3C-3D, device 302 displays prompt 316 "select a surface to draw on." In another example, a DA generates and provides an audio prompt for the user to select the surface. In some examples, the prompt indicates the type of input (e.g., speech input, gesture input, gaze input) the user should provide to select the surface. Examples of such prompts include "speak which surface you would like" (indicating speech input), "point at the surface you would like" (indicating gesture input), and "gaze at the surface you would like" (indicating gaze input).

In some examples, in accordance with receiving the drawing assistance input, surface selection module 204 selects a surface in environment 300. Device 302 thus selects a surface (e.g., a physical surface) over which to display graphical overlay 314 and on which the user can produce the drawing. In some examples, selecting the surface includes receiving, from the user, an input corresponding to a selection of the surface (surface selection input). In some examples, device 302 receives the surface selection input after outputting prompt 316 for the user to select the surface and/or after displaying graphical overlay 314.

In some examples, the surface selection input includes a user gaze input (e.g., detected by image sensor(s) 108) indicating that a user gaze is directed at a surface. For example, surface selection module 204 determines that user gaze is directed at a surface by processing the user gaze input to determine that user gaze is directed at the surface for at least a predetermined duration (e.g., 0.1 seconds, 0.5 seconds). In some examples, the surface is one of one or more candidate surfaces detected by surface detection module 204. For example, in accordance with receiving the drawing assistance input, surface selection module 204 detects the candidate surface(s) in environment 300, e.g., using plane and/or surface detection techniques known in the art.

In some examples, the surface selection input includes a speech input including a reference to the surface. In some examples, selecting the surface includes processing the speech input using associated context information to resolve the reference, e.g., determine that the reference refers to the surface. Example speech inputs including references to surfaces include "this one," "that one," "the front wall," "the ceiling," "the whiteboard," "to the right of the whiteboard," and the like. Example associated context information includes sensor data (e.g., gaze data, gesture data) captured when (or within a predetermined duration before and/or after) the speech input is received. For example, responsive to the speech input (e.g., "this one"), surface selection module 204 and DA module 208 determine that the speech input refers to a particular surface because the context information indicates that the user gestures at and/or gazes at the surface, e.g., while receiving the speech input, within a predetermined duration before and/or after receiving the speech input. Another example of associated context information includes data representing a visual understanding of environment 300. For example, surface selection module 204 analyzes environment 300 using known object recognition and/or plane detection techniques to identify surfaces, other objects, and the relative locations of the surfaces and other objects. Based on such data, surface selection module 204 and DA module 208 determines that the speech input (e.g., "the front wall," "the ceiling," "the whiteboard," "to the right of the whiteboard") refers to a particular surface.

In some examples, the surface selection input includes gesture input indicating a surface. In some examples, gesture input (e.g., a pointing gesture) indicates one of the candidate surface(s) detected by surface detection module 204. In some examples, the gesture input (e.g., a dragging gesture) corresponds to moving the display of graphical overlay 314 over (e.g., on) a surface.

In some examples, the surface selection input indicates a particular location on the surface. For example, the gaze input can indicate that user gaze is directed at the particular location. As another example, the speech input can indicate the particular location. Example speech inputs indicating a particular location on the surface include "the middle of the whiteboard," "the right side of the front wall," "the bottom portion of the right wall," and the like. As another example, a pointing gesture can indicate the particular location or a dragging gesture can correspond to moving the graphical overlay to the particular location.

Figure 3E:
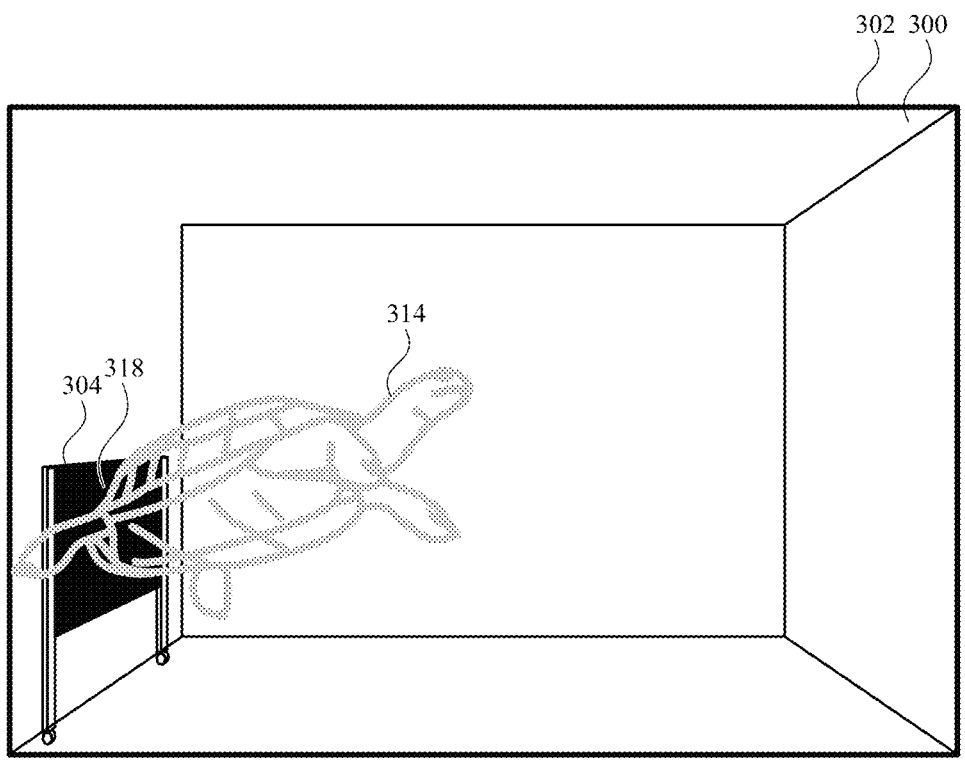

FIG. 3E shows that the user has provided surface selection input (e.g., gesture input) to move graphical overlay 314 over surface 318, e.g., whiteboard 304.

In some examples, surface selection module 204 determines that graphical overlay 314 is incompatible with a selected candidate surface, e.g., surface 318. For example, surface selection module 204 determines that graphical overlay 314 (e.g., with its current location, scale, and orientation) cannot be anchored to the candidate surface. As another example, surface selection module 204 determines that the actual size of graphical overlay 314 is incompatible with the actual size of the candidate surface, e.g., determines that graphical overlay 314, with its current location, scale, and orientation, does not entirely fit on the candidate surface. Similarly, surface selection module 204 determines that graphical overlay 314 is compatible with a candidate surface if graphical overlay 314 can be anchored to the candidate surface and/or if the actual size of graphical overlay 314 is compatible with the actual size of the candidate surface, e.g., graphical overlay 314 entirely fits on the candidate surface. In FIG. 3E, surface selection module 204 determines that graphical overlay 314 is incompatible with surface 318, e.g., as graphical overlay 314 is too large for surface 318.

In some examples, in accordance with a determination that graphical overlay 314 is incompatible with a candidate surface, device 302 provides output indicating the incompatibility. In some examples, the output includes audio output generated by the DA (e.g., "I can't put that there"), displayed output, and/or haptic output (e.g., a vibration). In some examples, the displayed output modifies a display manner (e.g., color, brightness, transparency, etc.) of the candidate surface, e.g., if the candidate surface is a virtual object or is displayed via pass-through video. In some examples, device 302 displays the output over (e.g., on) the candidate surface. For example, in FIG. 3E, the output includes a displayed overlay so that surface 318 appears a certain color (e.g., red) to indicate incompatibility with graphical overlay 314.

Figure 3F:
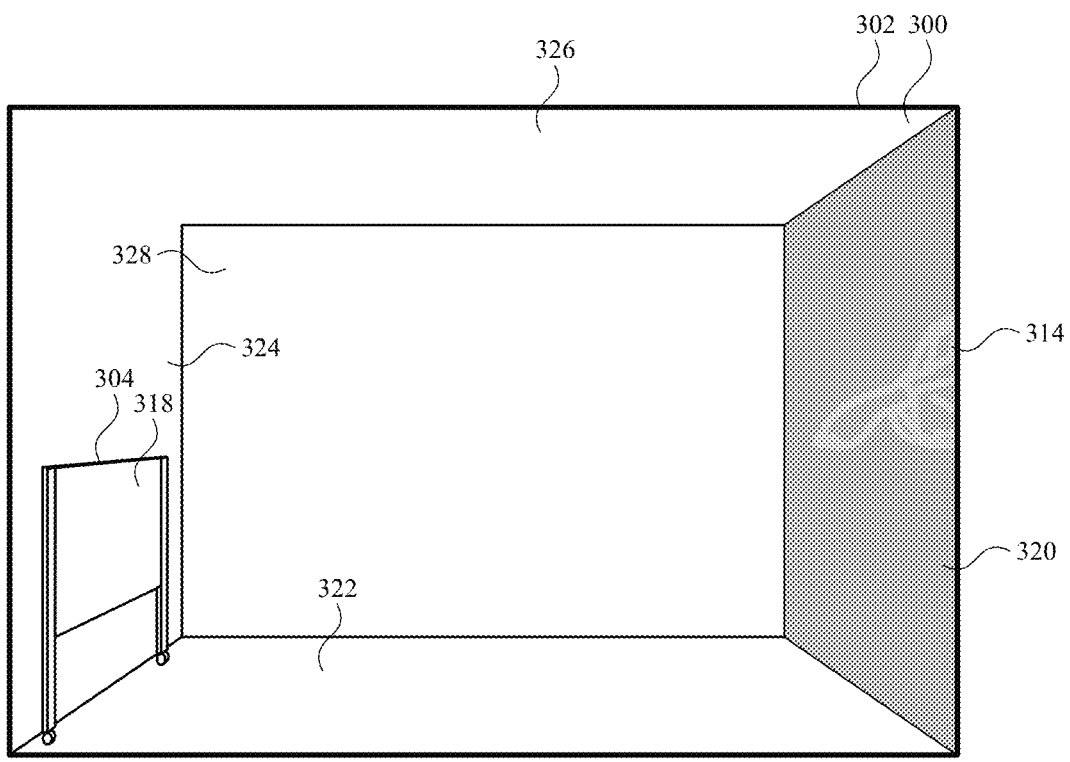

FIG. 3F shows that the user provided surface selection input (e.g., gesture input) to move graphical overlay 314 to over surface 320. Surface selection module 204 determines that graphical overlay 314 is compatible with surface 320.

In some examples, in accordance with a determination that graphical overlay 314 is compatible with a selected candidate surface, device 302 provides output indicating the compatibility. In some examples, the output includes audio output generated by the DA (e.g., "the drawing fits here"), displayed output, and/or haptic output (e.g., a vibration). In some examples, the displayed output modifies a display manner of the candidate surface, e.g., if the candidate surface is a virtual object or is displayed via pass-through video. In some examples, device 302 displays the output over (e.g., on) the candidate surface. For example, in FIG. 3F, the output includes a displayed overlay so that surface 320 appears a certain color (e.g., green) to indicate compatibility with graphical overlay 314.

Accordingly, FIGS. 3E-3F show that responsive to surface selection input (e.g., drag gestures, pointing gestures, speech input, gaze input), device 302 determines whether a candidate surface corresponding to the input is compatible with graphical overlay 314. Device 302 further indicates the compatibility (or incompatibility), thereby guiding the user to select an appropriate surface.

In some examples, surface selection module 204 cannot select a surface. For example, surface selection module 204 is unable to interpret the surface selection input (e.g., cannot determine a surface indicated by user gaze data, cannot determine the surface referred to by speech input, cannot determine a surface corresponding to a gesture). As another example, surface detection module 204 fails to detect any surfaces in environment 300. In some examples, in accordance with a determination that a surface cannot be selected, device 302 provides an output indicative of an error. For example, a DA generates and provides the audio output "sorry, I can't find where to put the drawing."

In some examples, unlike that of FIGS. 3C-3F, device 302 indicates detected candidate surface(s) prior to receiving the surface selection input. For example, selecting a physical surface includes detecting one or more candidate surfaces in environment 300 and providing output indicative of the candidate surface(s). In FIG. 3F, for instance, surface detection module 204 detects whiteboard 318, right wall 320, floor 322, left wall 324, ceiling 326, and front wall 328. In some examples, detecting the candidate surface(s) includes detecting only the candidate surface(s) compatible with graphical overlay 314, e.g., compatible with graphical overlay 314's current scale and orientation. In some examples, the output visually indicates the candidate surface(s), e.g., via displayed overlay(s) on the candidate surface(s) and/or by modifying the respective display manner(s) of the candidate surface(s). In some examples, the output further prompts the user to select one of the candidate surface(s). For example, device 302 displays the prompt "please choose one of these surfaces" and/or the DA audibly outputs the prompt. In some examples, after providing the output, device 302 receives a surface selection input selecting of one of the candidate surfaces.

In some examples, device 302 does not display graphical overlay 314 over environment 300 prior to receiving the surface selection input. For example, in accordance with receiving the drawing assistance input, rather than displaying the view of FIG. 3C, device 302 provides output indicative of the detected candidate surface(s). After the user provides surface selection input to select from the detected (and compatible) candidate surface(s), device 302 displays graphical overlay 314 over the selected surface.

Figure 3G:
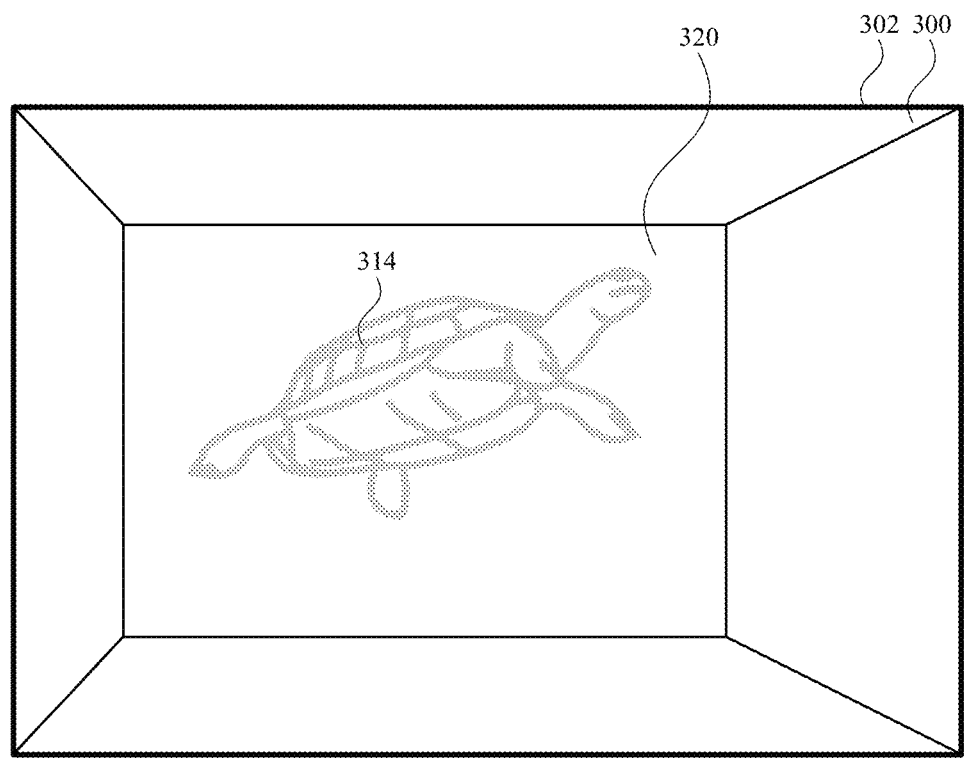

In FIG. 3G, in accordance with receiving the surface selection input, device 302 displays graphical overlay 314 over (e.g., on) selected surface 320. In FIG. 3G, the user has turned to face the right side of the room, e.g., to begin drawing on the right wall. While FIGS. 3D-3G show that the user provides gesture input to move (e.g., displace) graphical overlay 314 to its location in FIG. 3G, in other examples, the user provides gaze input (e.g., gaze at right wall 320) or speech input (e.g., "the right wall") to displace graphical overlay 314 to its location in FIG. 3G. Accordingly, in some examples, prior to receiving the surface selection input, device 302 displays graphical overlay 314 at a first location (e.g., an initial location in FIG. 3D) and the surface selection input corresponds to displacing graphical overlay from the first location to a location on surface 320.

While some examples herein illustrate that device 302 uses techniques to display 2D content as a graphical overlay over a flat surface, in other examples, device 302 uses other techniques to display 2D or 3D content as a graphical overlay over (e.g., on) surface(s) of varying types. As one example, device 302 uses projection mapping techniques to display the graphical overlay over a curved surface. For example, in accordance with receiving a surface selection input selecting a curved surface, device 302 projection maps a graphical overlay representing 2D or 3D content onto the curved surface such that the content appears to wrap around the surface. As another example, device 302 displays the graphical overlay over multiple surfaces. For example, the surface selection input selects multiple surfaces (e.g., the input corresponds to moving a first portion of graphical overlay 314 over front wall 328 and moving a second portion of graphical overlay 314 over floor 322) or selects an object (e.g., a cube) having multiple surfaces. In such examples, in accordance with receiving the surface selection input, device 302 projection maps the graphical overlay onto the multiple surfaces (e.g., multiple currently visible surfaces) so the content appears to wrap around the multiple surfaces. In examples where the surface selection input selects multiple surfaces, device 302 provides output indicating incompatibility (or compatibility) with one or more of the multiple surfaces according to the techniques discussed above. For example, device 302 provides an output indicating incompatibility in accordance with determining that an actual size of a portion of the graphical overlay is incompatible with the actual size of a respective surface of the multiple surfaces and/or determining that the portion cannot be anchored to the respective surface. Accordingly, it will be appreciated that the techniques discussed herein with respect to displaying a graphical overlay over a surface apply analogously to displaying a portion of the graphical overlay over a respective surface of the multiple surfaces.

As yet another example, device 302 displays a graphical overlay representing 3D content over a surface (e.g., 2D surface) so that the content appears 3D when a user views the surface from a correct perspective. For example, in accordance with receiving surface selection input, device 302 projection maps the graphical overlay onto the selected surface (e.g., with a selected scale and orientation) so the content appears to be 3D when viewed from the user's current perspective. In this manner, device 302 may assist users with producing drawings on 2D surfaces (e.g., a street, a sidewalk, a wall, a floor, and the like) that have 3D effects (e.g., depth).

In some examples, displaying graphical overlay 314 over selected surface 320 includes animating, using graphical overlay 314, a suggested stroke order for the drawing. For example, device 302 modifies the respective display manners of different portions of graphical overlay 314 so it appears be to traced with the suggested stroke order. In some examples, device 302 animates graphical overlay 314 upon initial display of graphical overlay 314. In some examples, device 302 animates graphical overlay 314 upon displaying graphical overlay over selected surface 320 (e.g., upon anchoring graphical overlay 314 to selected surface 320, discussed below). In some examples, device 302 animates graphical overlay 314 in accordance with determining that the user and/or device 302 is within a threshold distance of surface 320. In some examples, device 302 animates graphical overlay 314 upon receiving user input requesting to animate graphical overlay 314, e.g., upon the DA receiving speech input such as "show me how to draw this." In some examples, device 302 animates graphical overlay 314 for a predetermined duration, e.g., 15 seconds, 30 seconds. In some examples, device 302 continually animates graphical overlay 314, e.g., animates graphical overlay 314 in a loop. Further details about animating a graphical overlay to indicate a suggested stroke order are discussed with respect to FIGS. 6A-6F and 7A-7F below.

Figure 3H:
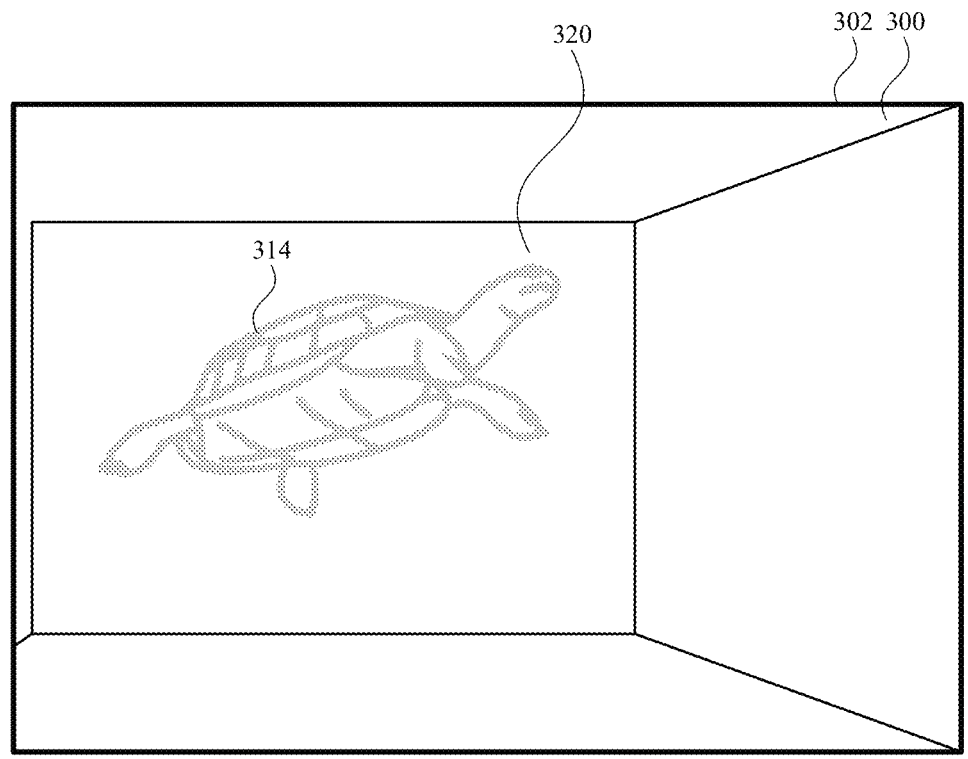

In some examples, displaying graphical overlay 314 over selected surface 320 (or over multiple surfaces) includes anchoring graphical overlay 314 to selected surface 320 (or to the multiple surfaces). For example, surface selection module 204 processes selected surface 320 and surrounding environmental features to determine features (e.g., corners, edges, borders) to serve as anchors for graphical overlay 314. In some examples, anchoring graphical overlay 314 includes modifying a display location of graphical overlay 314 responsive to the user's and/or device 302's pose changes such that graphical overlay 314 does not move relative to surface 320 (or relative to the multiple surfaces). For example, in FIG. 3G, device 302 displays graphical overlay at a location on surface 320. FIG. 3H shows that the user has moved rightward. Device 302 detects the movement, and in response, continues to display graphical overlay 314 at the same location on surface 320. For example, while the displayed location of graphical overlay 314 in FIG. 3H moves relative to FIG. 3G, graphical overlay 314 remains displayed at the same location on surface 320. In some examples, anchoring graphical overlay 314 to surface 320 includes maintaining graphical overlay 314's actual size and orientation relative to surface 320's actual size and orientation (or relative to the multiple surfaces' respective actual sizes and orientations). For example, responsive to the user's and/or device 302's pose changes, graphical overlay 314's actual size and orientation remain constant relative to those of surface 320, e.g., so that the actual size of graphical overlay 314 does not grow or shrink and graphical overlay 314 does not rotate relative to surface 320.

In some examples, while graphical overlay 314 is displayed over (e.g., anchored to) surface 320, device 302 receives input corresponding to a rescaling or a rotation of graphical overlay 314, e.g., as discussed above with respect to FIGS. 3C-3D. In some examples, if the resulting rescaling and/or rotation causes graphical overlay 314 to be incompatible with surface 320, device 302 provides an output indicating the incompatibility, as discussed above.

Figure 3I:
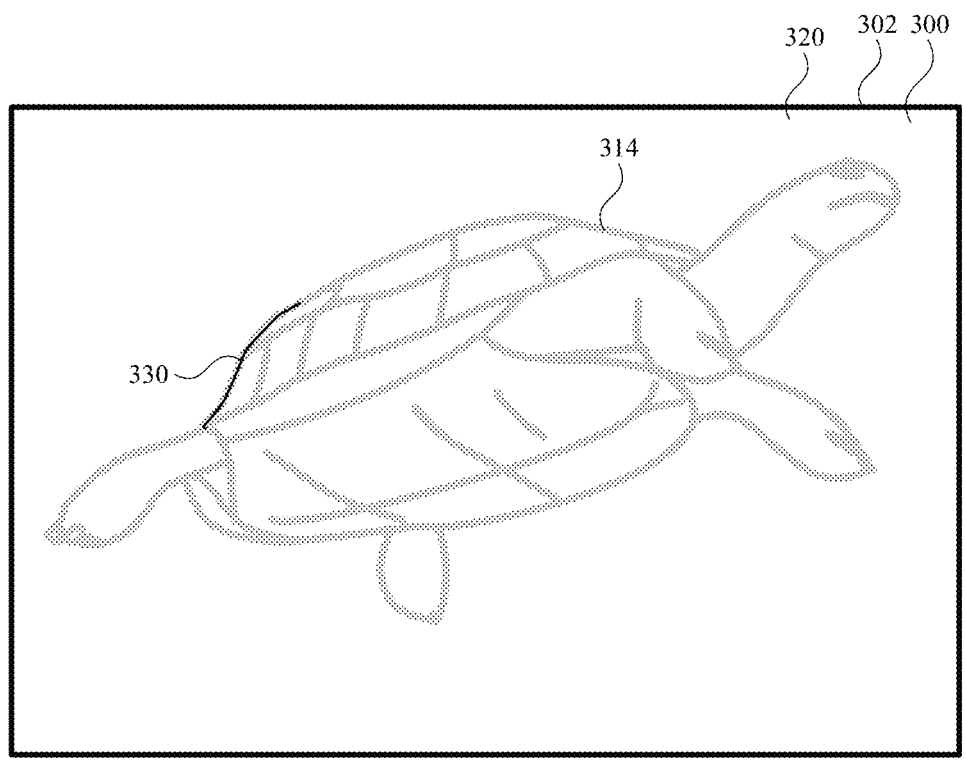

In FIG. 3I, the user has approached surface 320 and begins to produce marking 330 corresponding to the drawing. For example, the user begins to trace over graphical overlay 314 to draw the represented turtle. In some examples, marking 330 is a physical element, e.g., the user marks physical surface 320 with a physical drawing instrument. In some examples, marking 330 is a virtual element, e.g., the user marks virtual surface 320 with a physical drawing instrument (e.g., a stylus) or with a virtual drawing instrument (e.g., a virtual drawing instrument held by an avatar associated with the user).

In some examples, while displaying graphical overlay 314 over surface 320, device 302 detects marking 330, e.g., using detection module 206. For example, device 302 captures and/or processes image or video data of marking 330.

In some examples, surface selection module 204 anchors (e.g., re-anchors) graphical overlay 314 to surface 320 based on detected marking 330. For example, as the user produces marking 330, surface selection module 204 processes detected marking 330 to identify visual features (e.g., lines, curves) that serve as anchors for graphical overlay 314 to surface 320. In this manner, surface selection module 204 can continually update, as the user draws, the visual features used to anchor graphical overlay 314.

In some examples, device 302 prompts the user to produce a marking to serve as an anchor for graphical overlay 314. For example, if surface selection module 204 determines that graphical overlay 314 cannot be anchored to a candidate surface, device 302 prompts the user (e.g., via a displayed prompt and/or an audio prompt provided by the DA) to produce a marking (e.g., draw a border) on the candidate surface. After device 302 detects the produced marking (e.g., a border surrounding where the user desires to draw), surface selection module 204 can re-attempt to anchor graphical overlay 314 to the candidate surface using the detected marking.

In some examples, device 302 detects movement of the user that corresponds to producing marking 330, e.g., as discussed above with respect to detection module 206.

Figure 3J:
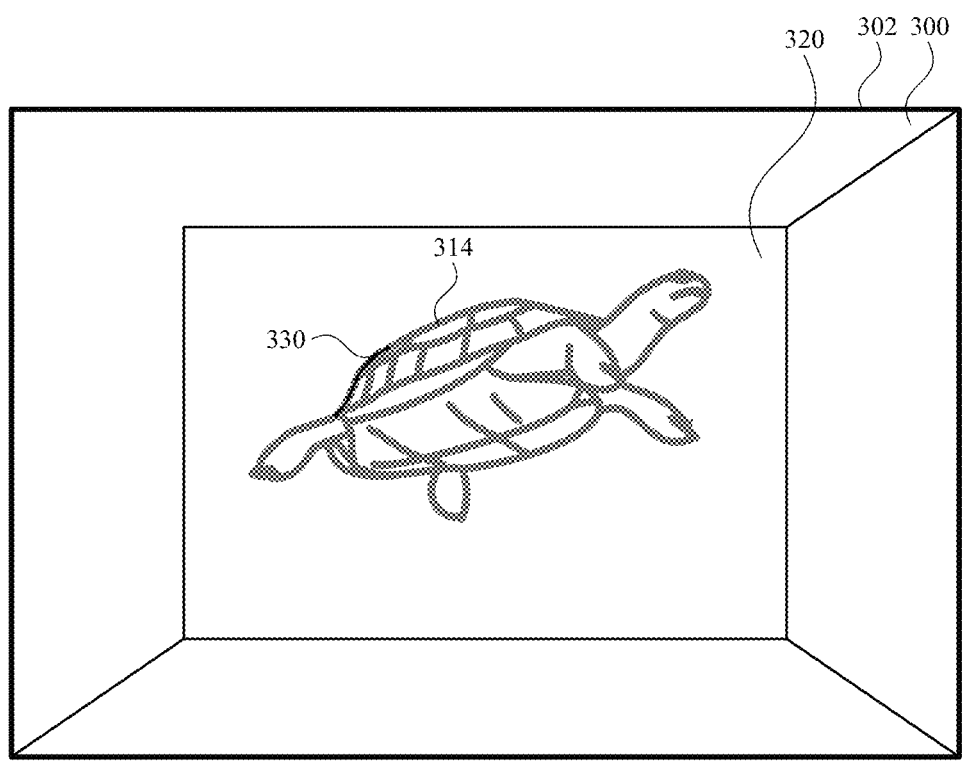

FIG. 3J shows that the user has moved away from surface 320. For example, the user has stepped back from surface 320 to confirm if they want the drawing at the current location.

In some examples, while displaying graphical overlay 314 over surface 320, device 302 detects movement of itself (and/or user 302) away from surface 320. In some examples, detecting movement away from surface 320 includes detecting that device 302 (and/or the user) is a threshold distance (e.g., 5 feet, 10 feet) away from surface 320. In some examples, in accordance with detecting movement away from surface 320, display module 202 determines whether one or more drawing completion criteria are satisfied.

In some examples, the one or more drawing completion criteria are satisfied if the drawing assistance application has been active (e.g., displayed in the foreground) for a predetermined duration. In some examples, the one or more drawing completion criteria are satisfied if graphical overlay 314 has been displayed (e.g., displayed over surface 320) for a predetermined duration. In some examples, detection module 206 determines that detected marking 330 corresponds to a completed portion of the drawing, e.g., by using image recognition to compare marking 330 to graphical overlay 314. In some examples, the one or more drawing completion criteria are satisfied if the completed portion satisfies a completion threshold, e.g., over 50% complete, over 75% complete, over 90% complete. In some examples, the one or more drawing completion criteria are satisfied if detection module 206 detects movement of the user (corresponding to producing marking 330) that satisfies a threshold, e.g., detects movement of the user for longer than a threshold duration, detects movement representing a threshold number of drawing strokes. In some examples, detection module 206 processes the detected movement data to determine a marking (e.g., marking 330) produced by the movement. In some examples, if the marking corresponds to a completed portion of the drawing that satisfies the completion threshold, the one or more drawing completion criteria are satisfied, as discussed. In some examples, the one or more drawing completion criteria are not satisfied if one or more of the above described conditions are not satisfied.

In some examples, in accordance with a determination that the one or more drawing completion criteria are not satisfied, device 302 modifies graphical overlay 314 to display graphical overlay 314 over surface 320 in a first manner. In some examples, the modification makes graphical overlay 314 appear more prominent relative to surface 320. For example, device 302 modifies graphical overlay 314's color to have higher contrast with that of surface 320, increases the brightness of graphical overlay 314, decreases the transparency of graphical overlay 314, increases the line width of graphical overlay 314, or the like.

In FIG. 3J, device 302 determines that the one or more drawing completion criteria are not satisfied. For example, device 302 determines that the completed portion of the drawing (corresponding to marking 330) does not satisfy the completion threshold and/or that graphical overlay 314 has been displayed over surface 320 for less than a threshold duration. Device 302 thus modifies the display manner of graphical overlay 314 to appear more prominent, e.g., as shown by the decreased transparency of graphical overlay 314 in FIG. 3J relative to FIG. 3I.

In this manner, if the user moves away from surface 320 and the drawing is incomplete, device 300 can increase the prominence of graphical overlay 314 so the user can more easily discern if they want the drawing at the current location. In other words, device 302 can interpret a user moving away from an incomplete drawing as the user confirming whether they want the drawing at the current location.

Figure 3K:
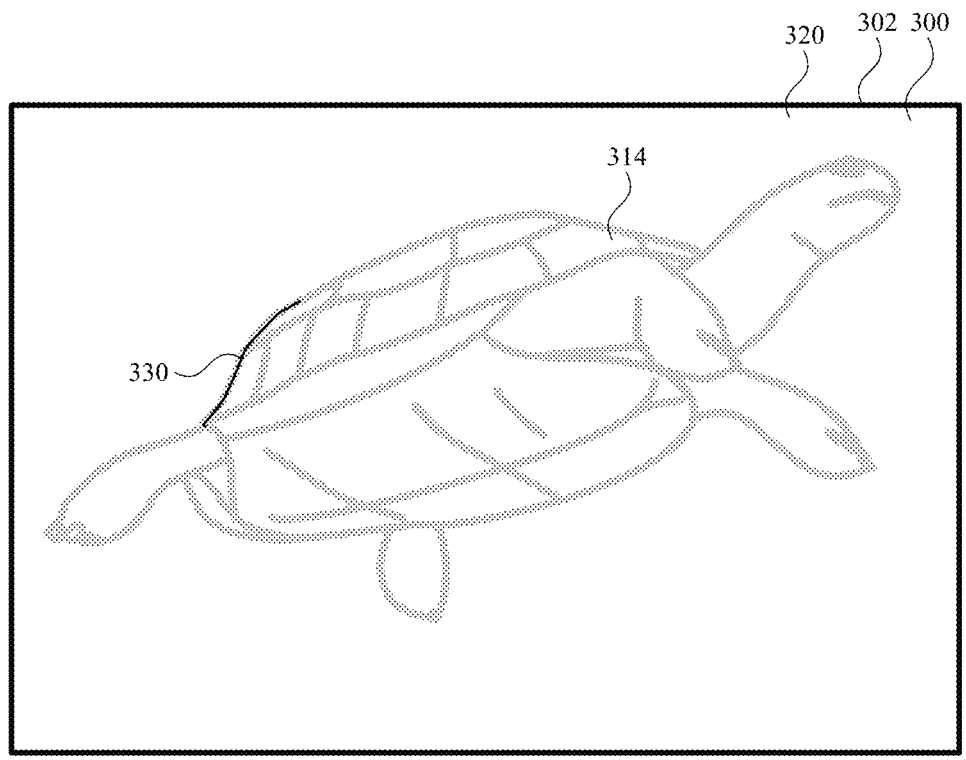

FIG. 3K shows that the user has re-approached surface 320. For example, the user has confirmed that they want the drawing at the current location and has re-approached surface 320 to complete the drawing. Device 302 detects movement of itself (and/or the user) towards surface 320. In some examples, detecting movement towards surface 320 includes determining that device 302 (and/or the user) is within a threshold distance of surface 320.

In some examples, in accordance with detecting movement towards surface 320 (and a determination that one or more drawing completion criteria are not satisfied), device 302 ceases to apply, to graphical overlay 314, a previously applied display manner modification (e.g., previously applied because the user moved away from surface 320). For example, in FIG. 3K, device 302 ceases to decrease the transparency of graphical overlay 314.

Figure 3L:
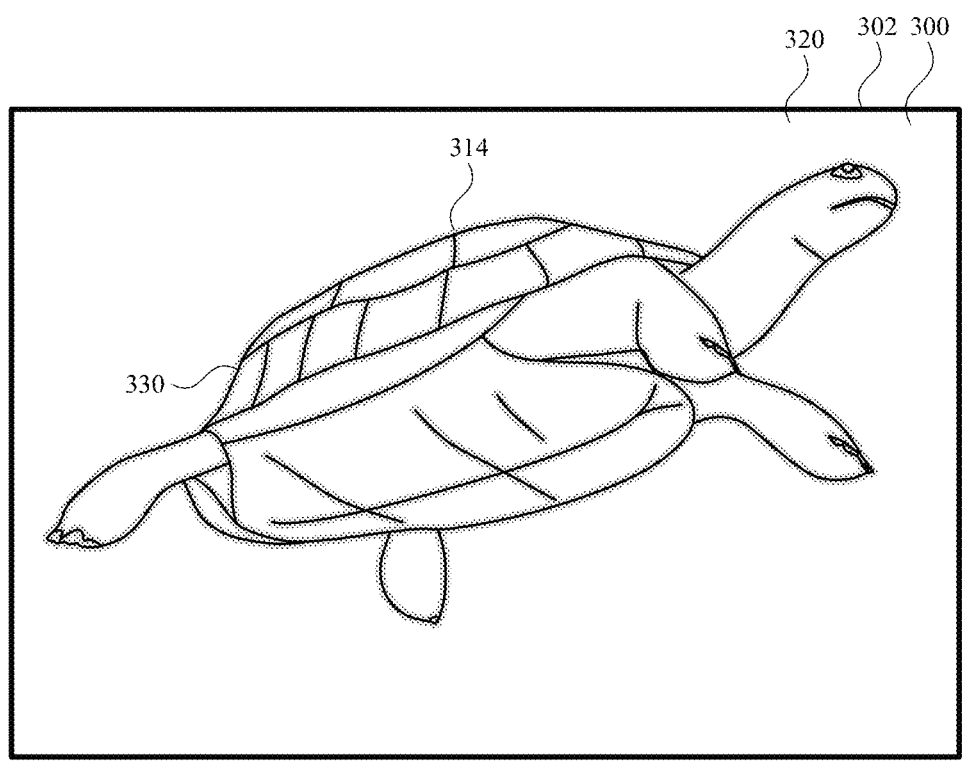

FIG. 3L shows that the user has completed the drawing, e.g., as indicated by completed marking 330.

Figure 3M:
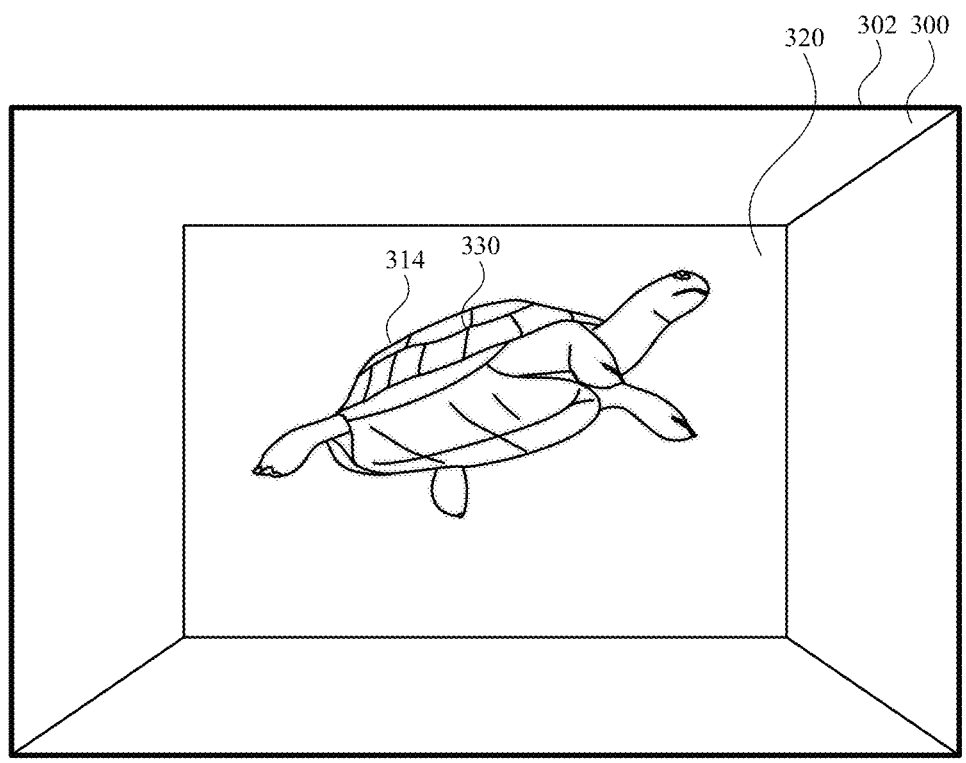

FIG. 3M shows that the user has moved away from surface 320. For example, the user has completed the drawing and wants to see how the completed drawing looks.

Device 302 detects such movement of itself (and/or the user) away from surface 320. In some examples, in accordance with detecting the movement, device 302 determines whether the one or more drawing completion criteria are satisfied. In FIG. 3M, device 302 determines that the one or more drawing completion criteria are satisfied. For example, detected marking 330 corresponds to a completed portion of the drawing satisfying the completion threshold and/or graphical overlay 314 has been displayed over surface 320 for greater than a threshold duration.

In some examples, in accordance with a determination that the one or more drawing completion criteria are satisfied, device 302 modifies graphical overlay 314 to display graphical overlay 314 over surface 320 in a second manner. In some examples, the modification makes graphical overlay 314 appear less prominent relative to surface 320. For example, device 302 modifies graphical overlay 314's color to have lesser contrast with that of surface 320, decreases the brightness of graphical overlay 314, increases the transparency of graphical overlay 314, decreases the line width of graphical overlay 314, or the like. For example, in FIG. 3M, device 302 increases the transparency of graphical overlay 314 relative to that of FIG. 3L.

In this manner, if the user moves away from surface 320 and the drawing is complete, device 300 can decrease the prominence of graphical overlay 314 so the user can more easily view their produced drawing. In other words, device 302 can interpret a user moving away from a completed drawing as the user wanting to review their completed drawing.

In some examples, the user re-approaches surface 320. In some examples, in accordance with detecting movement towards surface 320 (and a determination that one or more drawing completion criteria are satisfied), device 302 ceases to apply, to graphical overlay 314, a previously applied display manner modification (e.g., previously applied because the user moved away from surface 320). For example, if the user re-approaches surface 320 in FIG. 3M, device 302 displays graphical overlay 314 with the same transparency as in FIG. 3L.

FIGS. 4A-4E illustrate additional techniques for modifying the display manner of a graphical overlay, according to various examples.

Figure 4A:
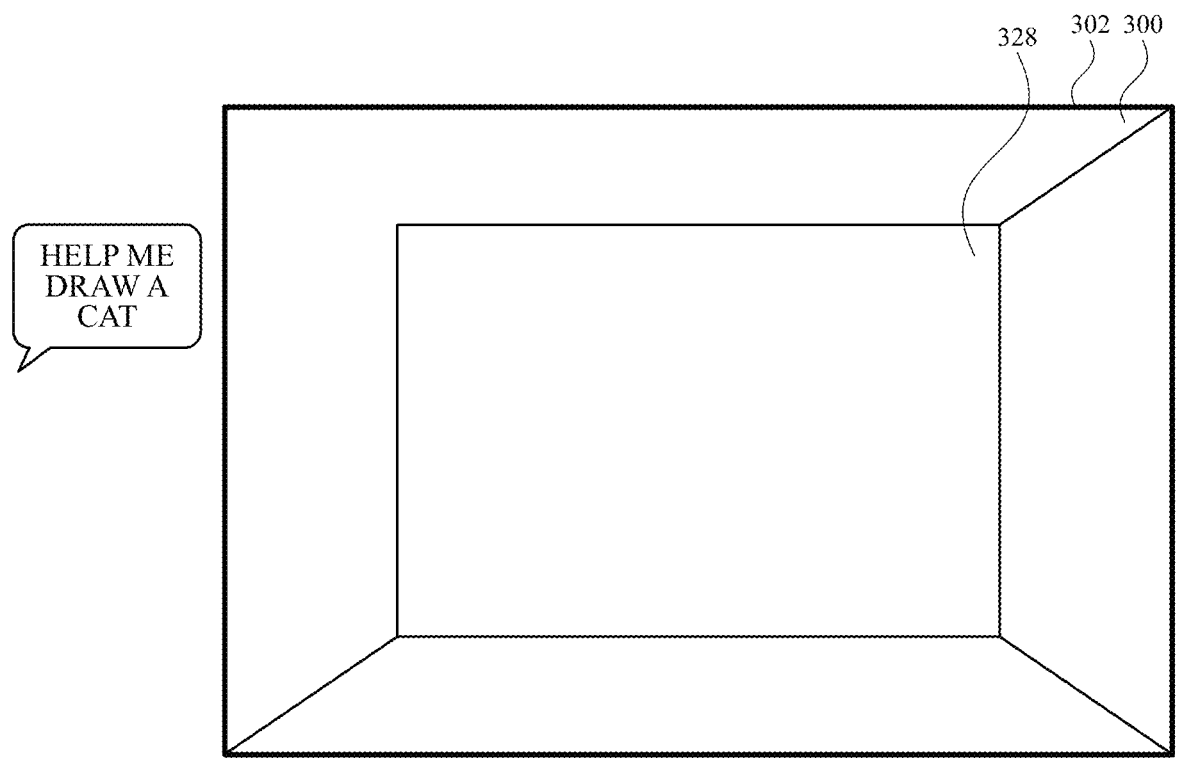
FIGS. 4A-4E illustrate techniques for modifying the display manner of a graphical overlay, according to various examples.

FIG. 4A shows a user's view of environment 300 using device 302. In FIG. 4A, device 302 receives a drawing assistance input from the user, e.g., the speech input "help me draw a cat."

Figure 4B:
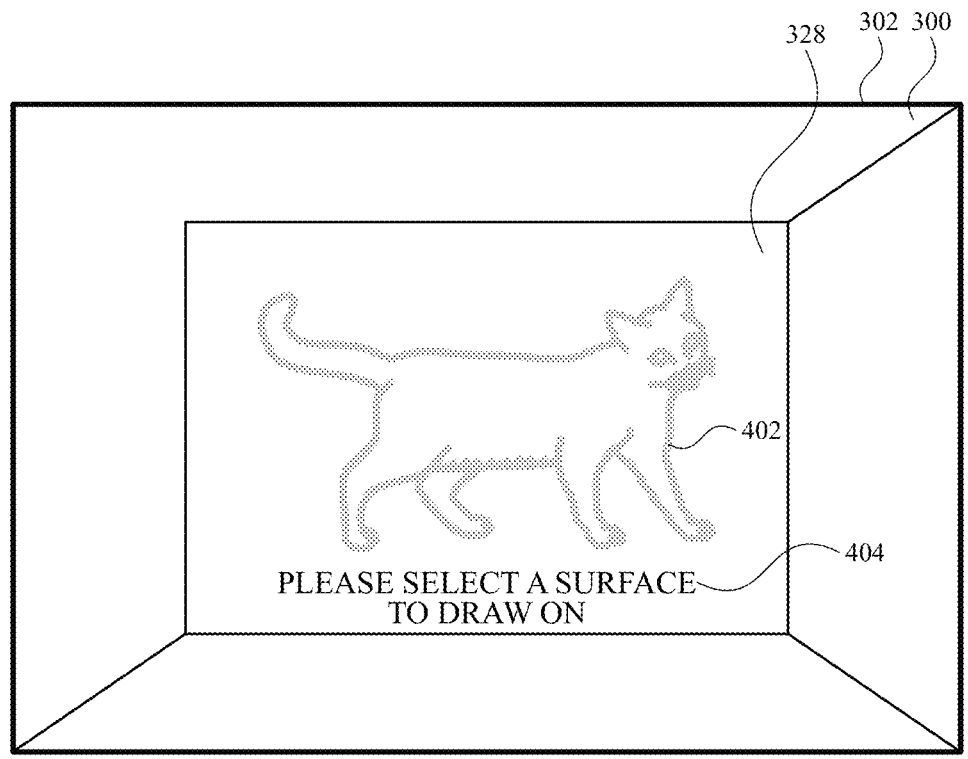

DA module 208 processes the speech input to determine a user intent of drawing (or writing) assistance. In some examples, in accordance with determining a user intent of drawing or writing assistance, DA module 208 causes device 302 to launch a drawing assistance application and/or display the application the foreground. For example, FIG. 4B shows that in accordance with receiving the drawing assistance input, device 302 launches the drawing assistance application, obtains graphical overlay 402 specified by the speech input, and displays graphical overlay 402 over environment 300. Device 302 (e.g., the DA) further outputs prompt 404 for the user to select a surface, e.g., "please select a surface to draw on."

Figure 4C:
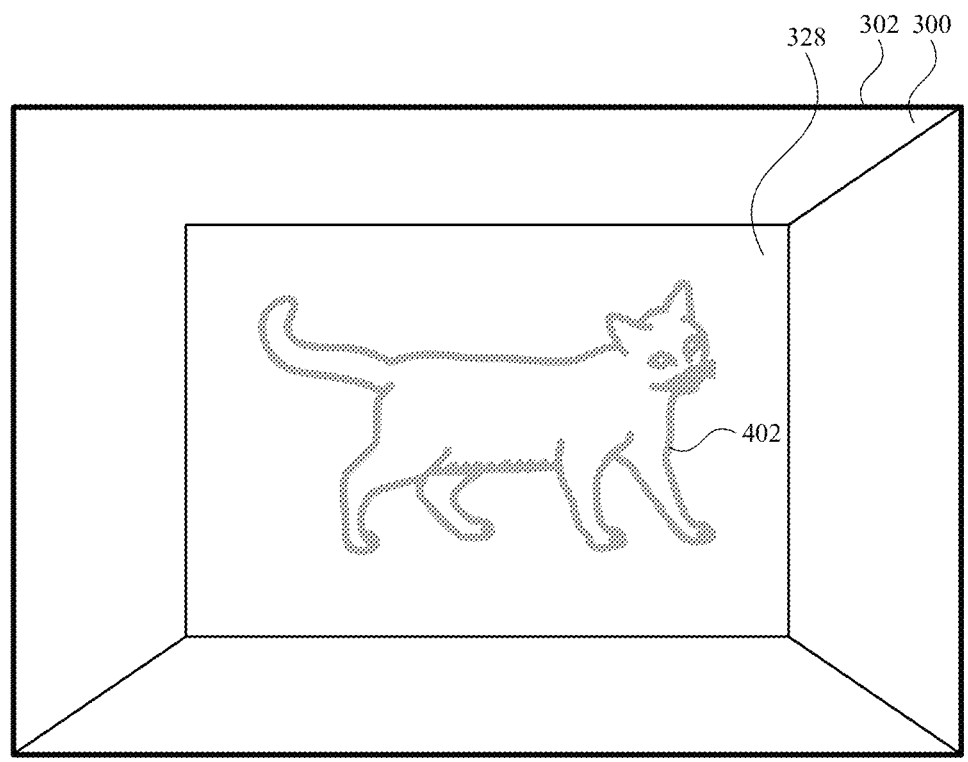

FIG. 4C shows that device 302 has selected surface 328 (e.g., the front wall) and displays graphical overlay 402 over surface 328. For example, device 302 selects surface 328 based on receiving surface selection input (e.g., the speech input "the front wall"), as discussed above. In some examples, a single input (e.g., a single speech input) includes the drawing assistance input and the surface selection input. For example, device 302 can provide the view of FIG. 4C in accordance with receiving the speech input "help me draw a cat on the front wall." DA module 208 can process the speech input to determine graphical overlay 402 and to select surface 328, e.g., according to the above discussed techniques.

Figure 4D:
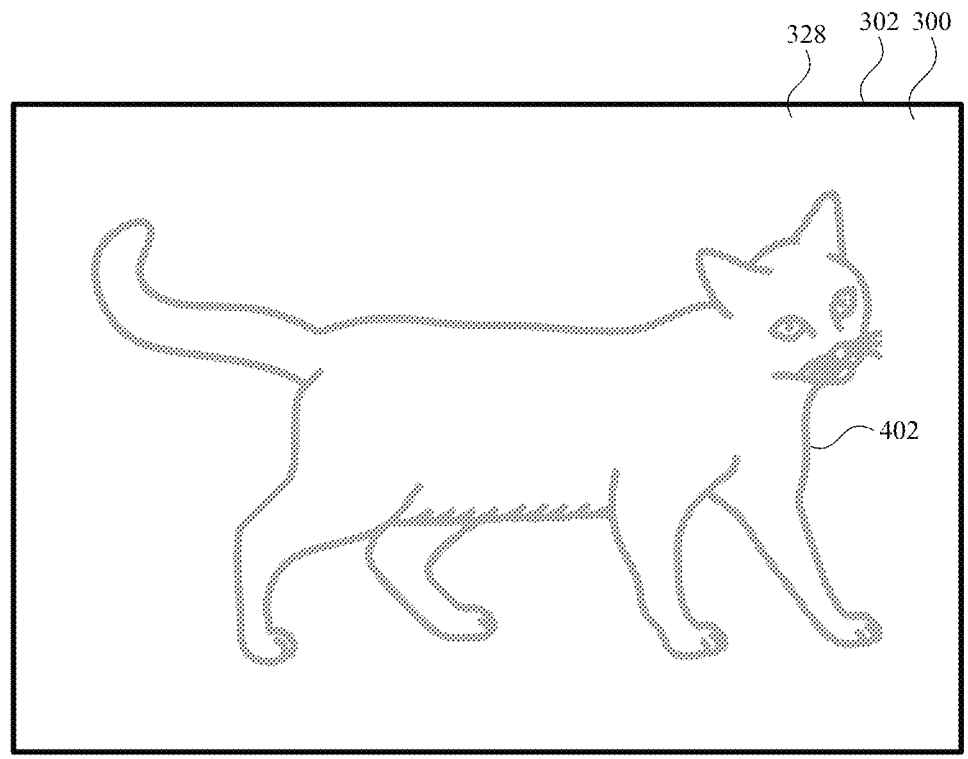

FIG. 4D shows that the user has approached surface 328 to begin to draw the requested cat.

Figure 4E:
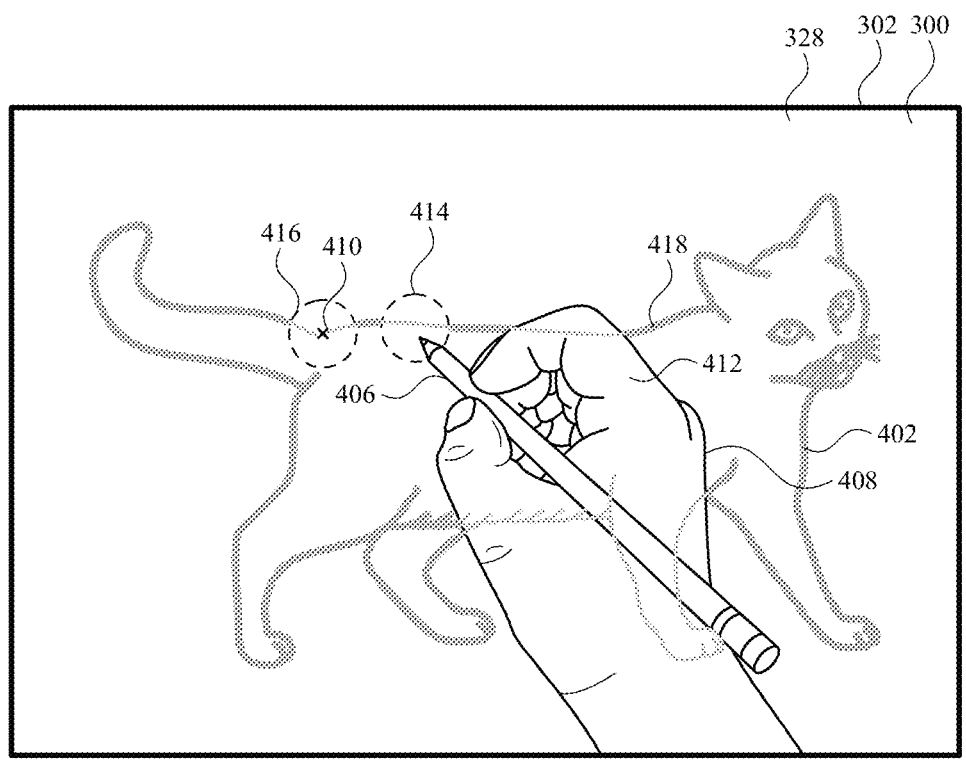

FIG. 4E shows the user's view as they draw the requested cat. The view includes drawing instrument 406 and the user's appendage 408 (e.g., a hand, an arm, fingers, or another appendage usable to mark surface 328). Device 302 displays at least of portion of graphical overlay 402 over drawing instrument 406 and appendage 408. In some examples, drawing instrument 406 and appendage 408 are physical elements. For example, the user views physical environment 300 via a transparent or translucent display of device 302 (or via pass through video) and views their physical appendage 408 and physical drawing instrument 406 held by appendage 408. In some examples, drawing instrument 406 and appendage 408 are virtual elements. For example, the user views virtual environment 300 and views appendage 408 of an avatar associated with the user and views virtual drawing instrument 406 held by the avatar.

As described below, FIG. 4E shows that device 302 modifies the respective display manners of various portions of graphical overlay 402, e.g., portions 412, 414, and 416. Such modifications can reduce graphical overlay 402's visual disruption to the user's drawing experience while preserving graphical overlay 402's ability to assist the user's drawing. In this manner, the user's drawing experience can be made more accurate and efficient.

In some examples, displaying graphical overlay 402 over surface 328 includes modifying the display of graphical overlay 402 to display a portion (e.g., portions 412, 414, and 416) in a second manner while displaying another portion (e.g., portion 418 other than portions 412, 414, and 416) in a first manner. In some examples, the second manner represents a less prominent display of graphical overlay 402 relative to the first manner. For example, compared to portions displayed in the second manner, portions displayed in the first manner have greater brightness, less transparency, greater line width, more contrast with surface 328, or the like. In other examples, the second manner represents a more prominent display of graphical overlay 402 relative to the first manner.

In some examples, device 302 detects appendage 408 at a first location, e.g., using detection module 206. Detection module 206 further determines that the first location corresponds to the location of portion 412. For example, detection module 206 determines that portion 412 is displayed over appendage 408. In accordance with a determination that the first location corresponds to the location of portion 412, device 302 displays portion 412 in the second manner. For example, FIG. 4E shows that device 302 displays portion 412 with a greater transparency than portion 418. In this manner, device 302 can reduce the visual disruption of the portion of graphical overlay 402 displayed over the user's drawing appendage 408, e.g., as users may desire to clearly view their appendage 408 when drawing.

In some examples, device 302 detects a user gaze input. Device 302 further determines (e.g., using display module 202), based on the user gaze input, that a user gaze is directed at portion 416 (e.g., directed at the location of portion 416). For example, device 302 determines portion 416 to include a predetermined area surrounding the user's determined gaze location 410. In some examples, in accordance with a determination that the user gaze is directed at portion 416, device 302 displays portion 416 in the second manner. For example, FIG. 4E shows that shows that device 302 displays portion 416 with a greater transparency than portion 418. In this manner, device 302 can reduce the visual disruption of graphical overlay 402 where the user gazes, e.g., as users may desire to more clearly view their drawing at where they gaze.

In some examples, device 302 detects a tip of drawing instrument 406 at a second location, e.g., using detection module 206. Detection module 206 further determines that the second location corresponds to the location of portion 414. For example, detection module 206 determines that a first portion of graphical overlay 402 is displayed over the tip of drawing instrument 406 and determines portion 414 to include a predetermined area surrounding the first portion. In accordance with a determination that the second location corresponds to the location of portion 414, device 302 displays portion 414 in the second manner. For example, FIG. 4E shows that device 302 displays portion 414 with a greater transparency than portion 418. In this manner, device 302 can reduce the visual disruption of graphical overlay 402 near the tip of drawing instrument 406, e.g., as users may desire to clearly view the tip of drawing instrument 406 while drawing or writing.

In some examples, device 302 magnifies the displayed view of environment 300 at the user's gaze location and/or at the tip of drawing instrument 406, e.g., magnifies the view within a predetermined area surrounding the locations. For example, device 302 magnifies the view of environment 300 within the indicated boundaries of portions 416 and 414. Accordingly, the user can perceive a magnification of environment 300 (e.g., including magnified views of graphical overlay 402, surface 328, and markings the user produces on surface 328) near where they gaze and/or near the tip of drawing instrument 406.

FIGS. 5A-5F illustrate additional techniques for modifying the display manner of a graphical overlay, according to various examples.

Figure 5A:
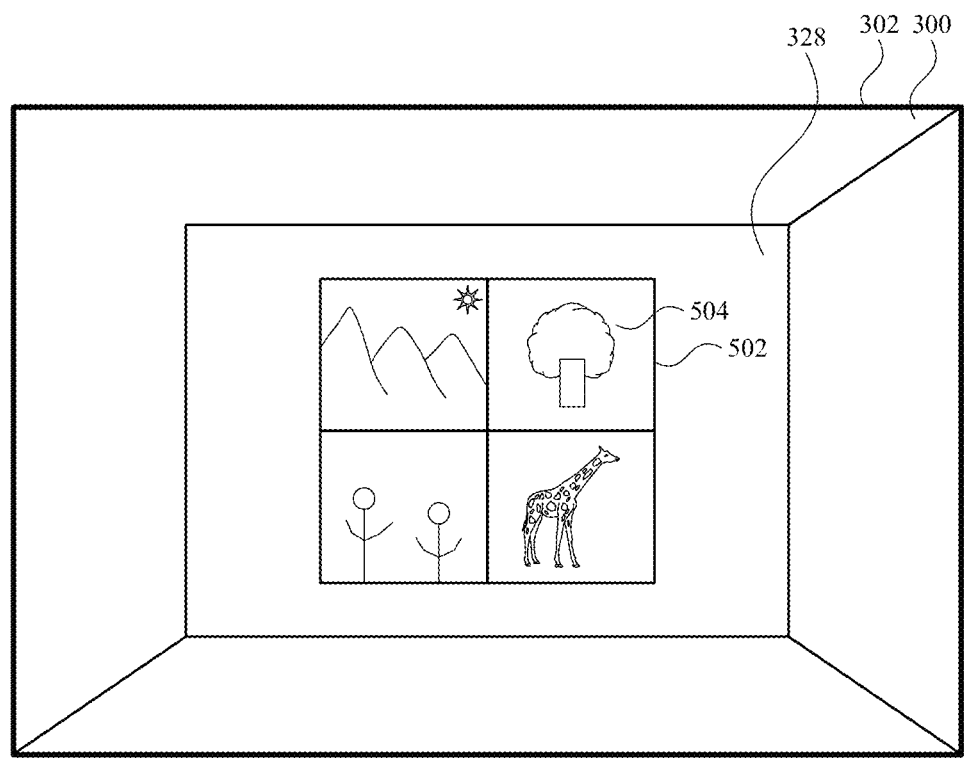
FIGS. 5A-5F illustrate techniques for modifying the display manner of a graphical overlay, according to various examples.

FIG. 5A shows a user's view of environment 300 using device 302. The view includes user interface 502 of a photos application of device 302, e.g., as a virtual element. User interface 502 includes images (e.g., image 504), videos, and/or 3D models sourced from the user's personal data.

Figure 5B:
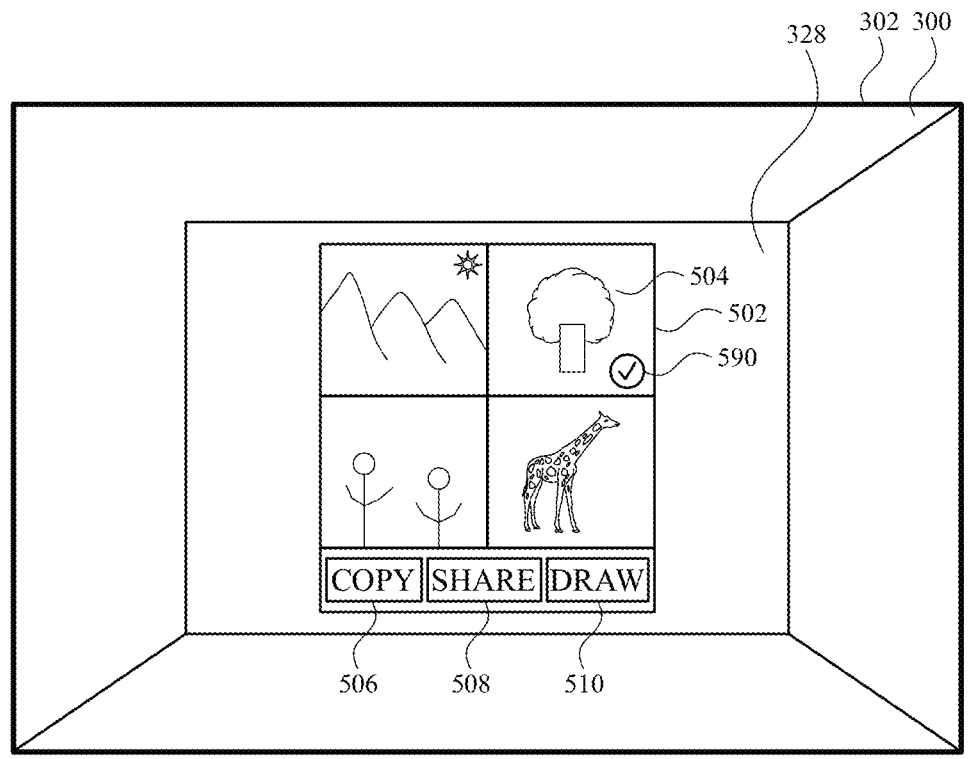

FIG. 5B shows the display of user interface 502 responsive to device 302 receiving user input selecting image 504, e.g., as indicated by selection icon 590. User interface 502 includes selectable copy icon 506, selectable share icon 508, and selectable draw icon 510.

Figure 5C:
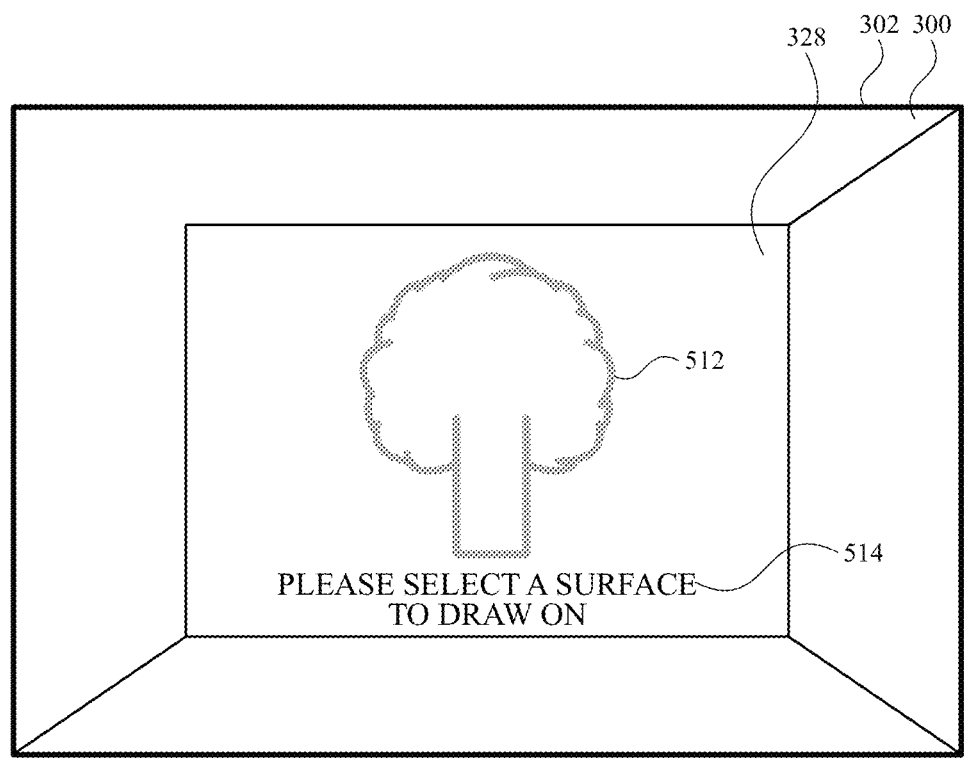

FIG. 5C shows the user's view after the user provides drawing assistance input corresponding to a selection of draw icon 510. For example, in accordance with receiving the drawing assistance input, device 302 launches the drawing assistance application and/or displays the drawing assistance application in the foreground, e.g., by displaying the view of FIG. 5C. Device 302 further obtains graphical overlay 512 representing selected image 504 and displays graphical overlay 512 over environment 300. Device 302 (e.g., using the DA) further outputs prompt 514 for the user to select a surface, e.g., "please select a surface to draw on."

Figure 5D:
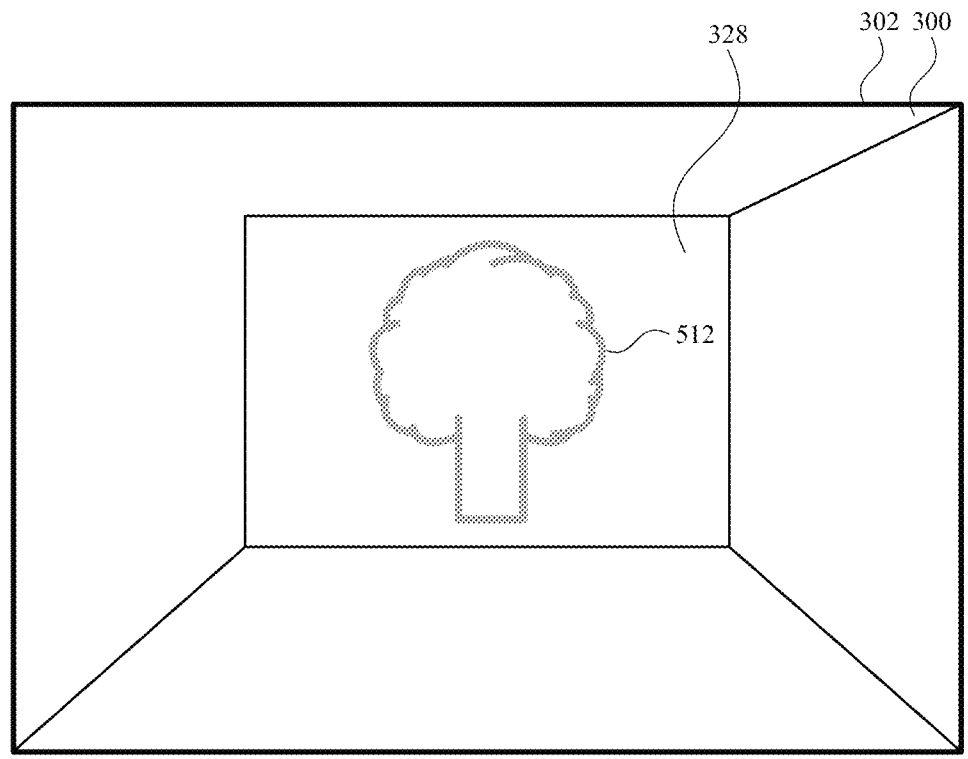

FIG. 5D shows that device 302 has selected surface 328 (e.g., the front wall) and displays graphical overlay 512 over selected surface 328. For example, device 302 selects surface 328 based on receiving surface selection input, as discussed above.

Figure 5E:
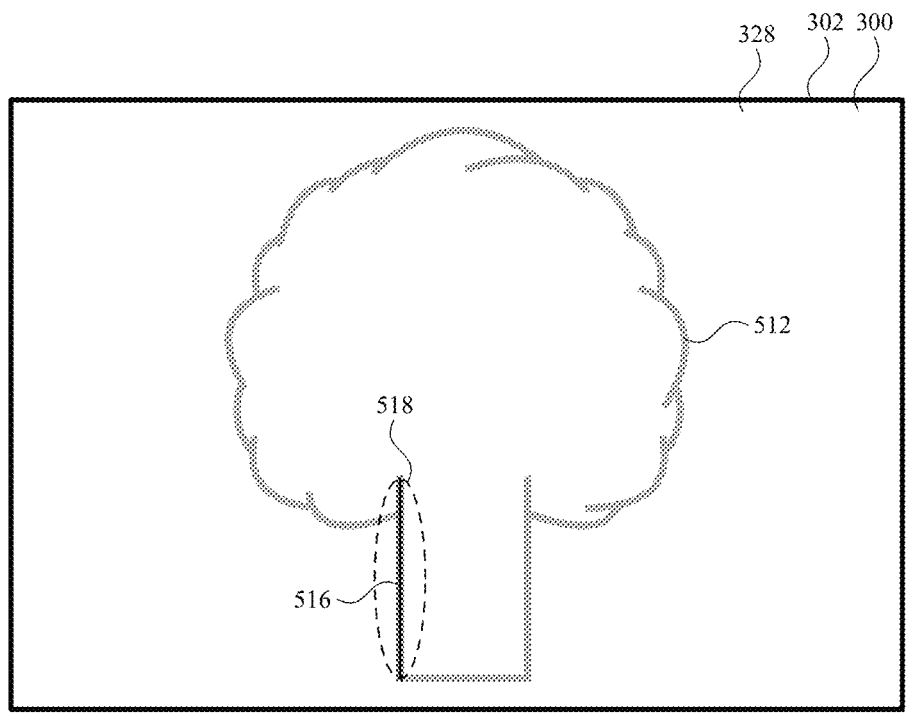

FIG. 5E shows that the user has approached surface 328 and begins to draw the selected image. For example, the user produces marking 516 on surface 328 by tracing graphical overlay 512. In some examples, device 302 detects marking 516 and/or detects user movement (e.g., movement of a drawing instrument) corresponding to producing marking 516, e.g., using detection module 206.

In some examples, detection module 206 determines that marking 516 corresponds to a completed portion of the drawing, e.g., as discussed above with respect to the one or more drawing completion criteria. In some examples, detection module 206 determines that marking 516 corresponds to a completed portion of the drawing based on the detected user movement. For example, detection module 206 processes the detected movement data to determine marking 516 produced by the movement. Detection module 206 then compares determined marking 516 to graphical overlay 512 to determine that marking 516 corresponds to a completed portion of the drawing.

In some examples, displaying graphical overlay 512 over surface 328 includes modifying a display manner of portion 518 of graphical overlay 512 that corresponds to the completed portion of the drawing. For example, FIG. 5E shows that device 302 modifies the display manner of portion 518 to have a different color than the other portions of graphical overlay 512. As described, other example display manner modifications include brightness modification (e.g., less bright), transparency modification (e.g., more transparent), line width modification (e.g., reduced line width), line style modification (e.g., change from solid to dashed lines), and the like. In this manner, as the user completes portions of the drawing, device 302 can modify corresponding portions of graphical overlay 512 to indicate completion.

Figure 5F:
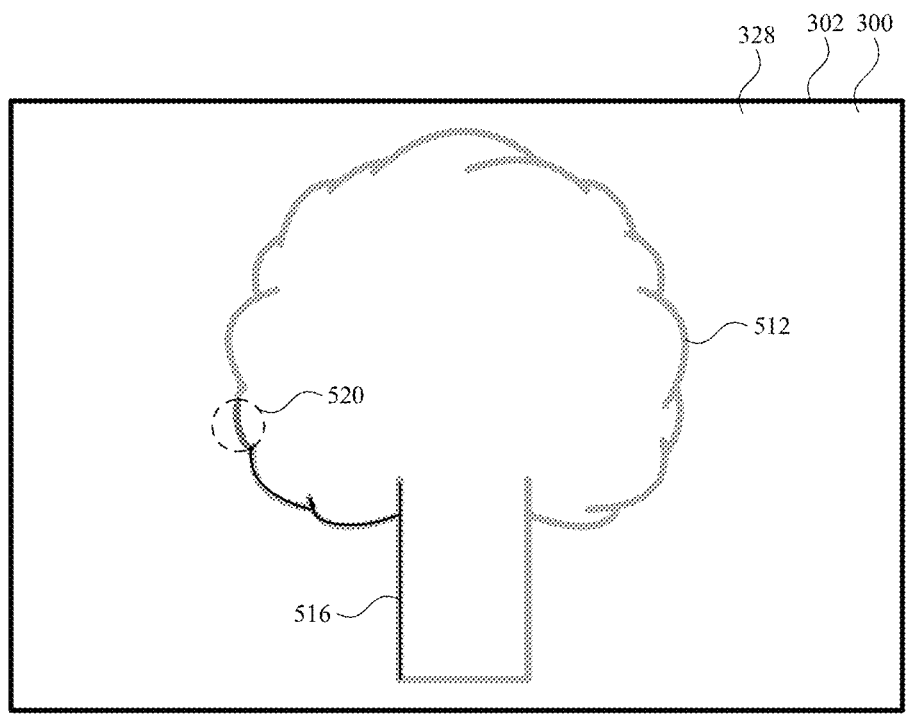

Turning to FIG. 5F, in some examples, displaying graphical overlay 512 over surface 328 includes modifying a display manner of portion 520 of graphical overlay 512 corresponding to where the user currently draws. In some examples, device 302 determines the user's current drawing location by tracking the tip of the drawing instrument, e.g., using detection module 206. In some examples, device 302 determines the user's current drawing location by detecting the most recent location of produced marking 516. Device 302 further determines portion 520 to include a predetermined area surrounding the user's current drawing location.

FIG. 5F shows that device 302 modifies the display manner of portion 520 to have a different color than the other portions of graphical overlay. In this manner, as the user draws, a corresponding portion of graphical overlay 512 changes color (or transparency, brightness, etc.) to indicate the current drawing location.

In some examples, after the display manner of portion 520 modifies, the display manner remains modified for a predetermined duration (e.g., 1 second, 2 seconds). In some examples, after the predetermined duration elapses, portion 520 modifies again (e.g., changes to another color) to indicate completion. In this manner, as the user draws, graphical overlay 512 can animate (e.g., via a color change) the user's current stroke and the portions of graphical overlay 512 corresponding to the user's previous strokes can modify (e.g., via another color change) to indicate completion.

In some examples, device 302 ceases to display graphical overlay 512. For example, device 302 ceases to display graphical overlay 512 a predetermined duration (e.g., 1 minute, 30 seconds, 10 seconds) after determining that one or more drawing completion criteria are satisfied, as discussed above. In some examples, device 302 ceases to display graphical overlay 512 upon receiving user input requesting to cease the display, e.g., the speech input "I'm done."

While the above description of FIGS. 4A-4E and 5A-5F describes example modifications to graphical overlays, in some examples, device 302 applies similar display modifications to the user's produced marking in an analogous manner. For example, rather than allowing the user to view their marking as a physical element (e.g., via a transparent display), device 302 displays the marking as another overlay displayed over environment 300. Device 302 then modifies the overlay at portions corresponding to the location of the user's drawing appendage (e.g., at portions displayed over the user's drawing appendage), at portions corresponding to the user's gaze location, and/or at portions corresponding to the tip of the drawing instrument, e.g., analogously to that described with respect to FIGS. 4A-4E. As another example, device 302 modifies the overlay to indicate completed portions of the drawing and/or the user's current drawing location, e.g., analogously to that described with respect to FIGS. 5A-5F.

FIGS. 6A-6F illustrate techniques for assisted writing, according to various examples.

Figure 6A:
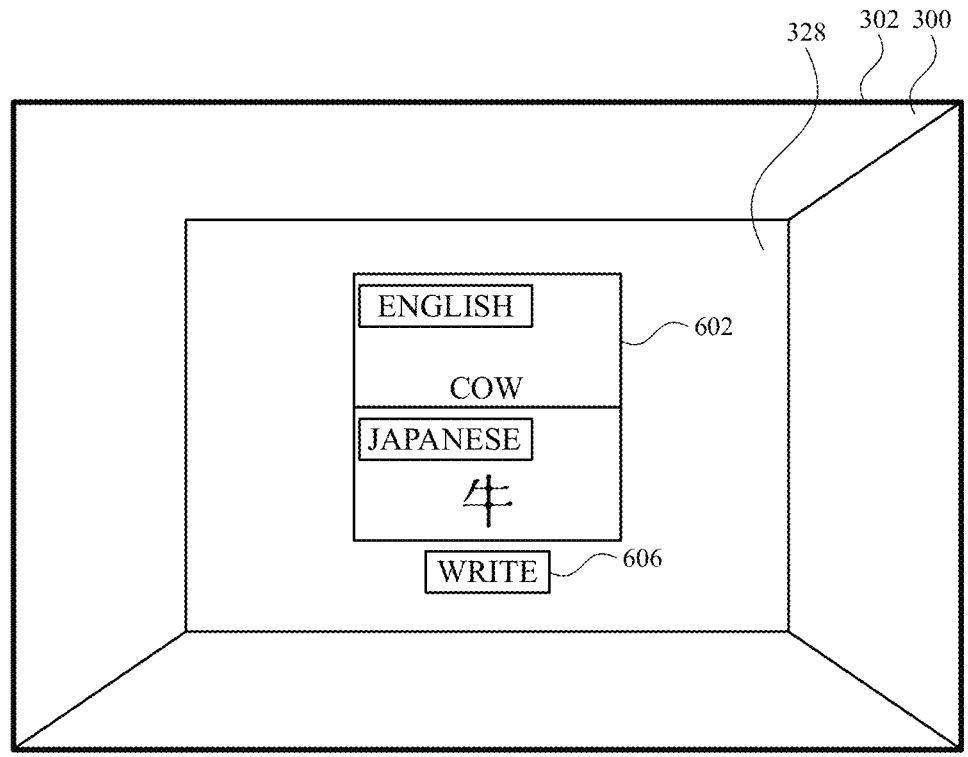
FIGS. 6A-6F illustrate techniques for assisted writing, according to various examples.

FIG. 6A shows a user's view of environment 300 using device 302. The view includes user interface 602 (e.g., a virtual element) of a translation enabled application. User interface 602 includes one or more characters (e.g., a single character, word(s), phrase(s), sentences, and the like) in a first language (e.g., the user's native language), e.g., the word "cow" in English. User interface 602 further includes the character(s) in a different second language (e.g., a foreign language), e.g., 牛 ("cow" in Japanese kanji). For example, the user provided input to cause device 302 to obtain the translation 牛.

Device 302 receives, from the user, an input corresponding to a request for assistance with writing the character(s) in the second language (writing assistance input). In some examples, the writing assistance input corresponds to a selection of the character(s) displayed in the second language. For example, the writing assistance input corresponds to a selection of write icon 606. In some examples, the writing assistance input includes a speech input specifying the character(s) in the first language, e.g., "how do I write 'cow' in Japanese?".

Device 302 further obtains a translation of the character(s) from the first language to the second language. For example, responsive to the speech input "how do I write 'cow' in Japanese?", DA module 208 obtains the translation 牛.

Figure 6B:
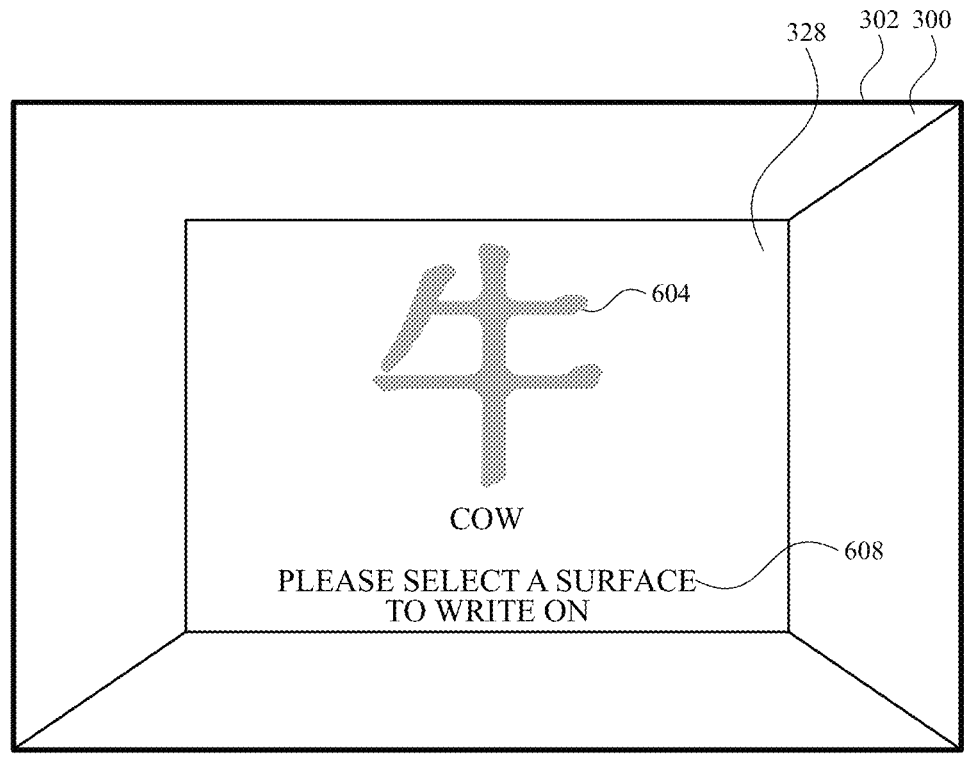

FIG. 6B shows the user's view of environment 300 in accordance with device 302 receiving the writing assistance input. For example, in accordance with receiving the writing assistance input, device 302 launches a writing assistance application (and/or causes the writing assistance application to be displayed in the foreground). In some examples, in accordance with receiving the writing assistance input, device 302 displays graphical overlay 604 representing the obtained translation over environment 300. In some examples, device 302 further outputs prompt 608 for the user to select a surface to write on.

In some examples, graphical overlay 604 includes the character(s) in the first language. For example, graphical overlay 604 includes the word "cow" in English.

Figure 6C:
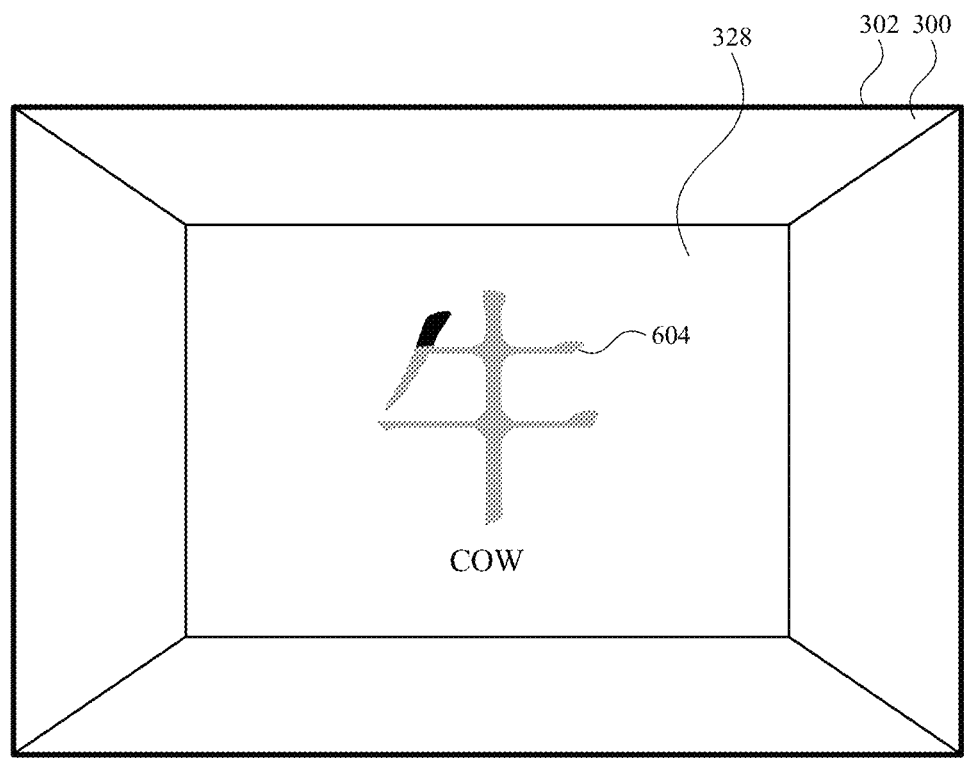

FIG. 6C shows that in accordance with receiving the writing assistance input, device 302 selects surface 328 (e.g., the front wall) in environment 300. For example, device 302 selects surface 328 based on receiving surface selection input, e.g., as described above with respect to FIGS. 3A-3M.

FIG. 6C further shows that device 302 displays graphical overlay 604 over (e.g., on) selected surface 328. In some examples, displaying graphical overlay 604 over selected surface 328 includes anchoring graphical overlay 604 to selected surface 328.

Figure 6D:
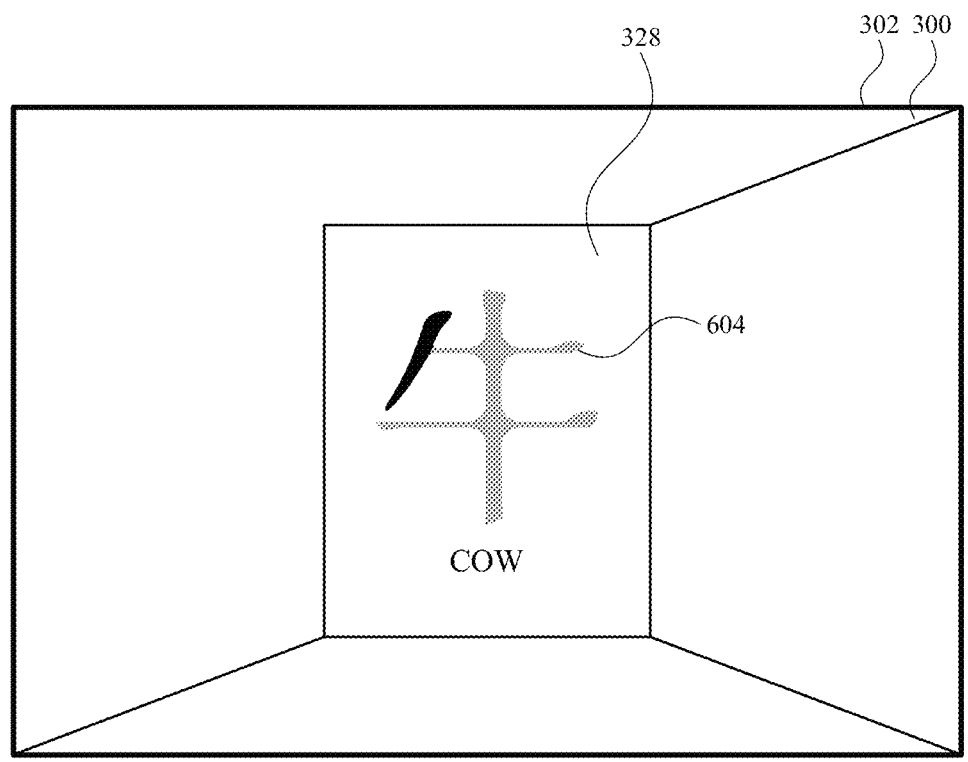

In some examples, displaying graphical overlay 604 over the selected surface 328 include animating, using graphical overlay 604, a proper stroke order for writing the character(s) in the second language. For example, FIGS. 6C-6D show that device 302 modifies the respective display manners (e.g., changes color) of different portions of graphical overlay 604 to indicate the proper stroke order. In some examples, device 302 animates graphical overlay 604 to indicate the proper stroke order according to the above discussed techniques for animating graphical overlay 314 to indicate a suggested stroke order. For example, device 302 animates graphical overlay 604 upon initial display, e.g., in FIG. 6B. As another example, device 302 animates graphical overlay 604 in accordance with determining that certain conditions (discussed above with respect to animating graphical overlay 314) are satisfied, e.g., that the user and/or device 302 are within a threshold distance of surface 328.

In some examples, device 302 animates graphical overlay 604 in a first manner to indicate a proper stroke order. When animated in the first manner, graphical overlay 604 indicates the proper stroke order without considering the user's detected marking (e.g., writing), e.g., animates in a loop. In some examples, device 302 animates graphical overlay 604 in a second manner to indicate a proper stroke order. When animated in the second manner, graphical overlay 604 indicates the proper stroke order based on considering the user's detected marking. For example, as discussed with respect to FIGS. 7A-7F below, device 302 determines, based on the user's detected marking, a proper next stroke for writing the character(s) and animates graphical overlay 604 to indicate the proper next stroke.

In some examples, device 302 animates graphical overlay 604 in the first manner in accordance with DA module 208 determining a first predetermined type of user intent, e.g., based on the writing assistance input. In some examples, device 302 animates graphical overlay 604 in the second manner in accordance with DA module 208 determining a second predetermined type of user intent, e.g., based on the writing assistance input. In some examples, the first predetermined type of user intent includes a writing assistance intent, e.g., corresponding to natural language inputs such as "how do I write 'cow' in Japanese?", "how do I write Japanese?", "show me how to write 'cow' in Japanese," and the like. In some examples, the second predetermined type of user intent includes a writing instruction intent, e.g., corresponding to natural language inputs such as "teach me to write 'cow' in Japanese," "teach me to write Japanese," "I'd like a Japanese writing lesson," and the like.

Figure 6E:
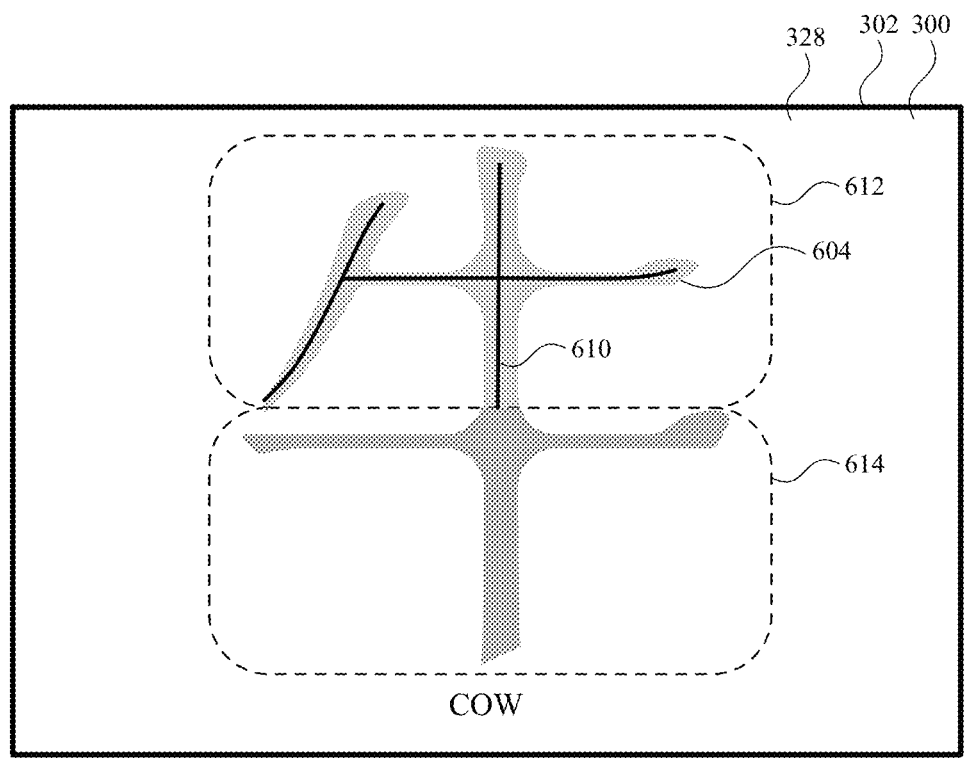

FIG. 6E shows that the user has approached surface 328 and started to write 丿, e.g., as indicated by marking 610 produced by the user on surface 328. Marking 610 corresponds to the character(s) written in the second language.

In some examples, while displaying graphical overlay 604 over surface 328, device 302 detects marking 610, e.g., using detection module 206. In some examples, device 302 further detects movement of the user (e.g., movement of a drawing instrument held by the user) that corresponds to producing marking 610, e.g., using detection module 206.

In some examples, while displaying graphical overlay 604 over surface 328, device 302 modifies the display of graphical overlay 604, e.g., consistent with the techniques discussed above with respect to FIGS. 3A-3M, 4A-4E, and 5A-5F. For example, consistent with the techniques discussed above with respect to FIGS. 5A-5F, device 302 modifies the display manner of portion 612 corresponding to the completed portion of the character(s) in the second language. For example, FIG. 6E shows that device 302 has increased the transparency of portion 612 (corresponding to the completed portion of 丿) relative to the transparency of portion 614 (corresponding to the incomplete portion of 牛).

Figure 6F:
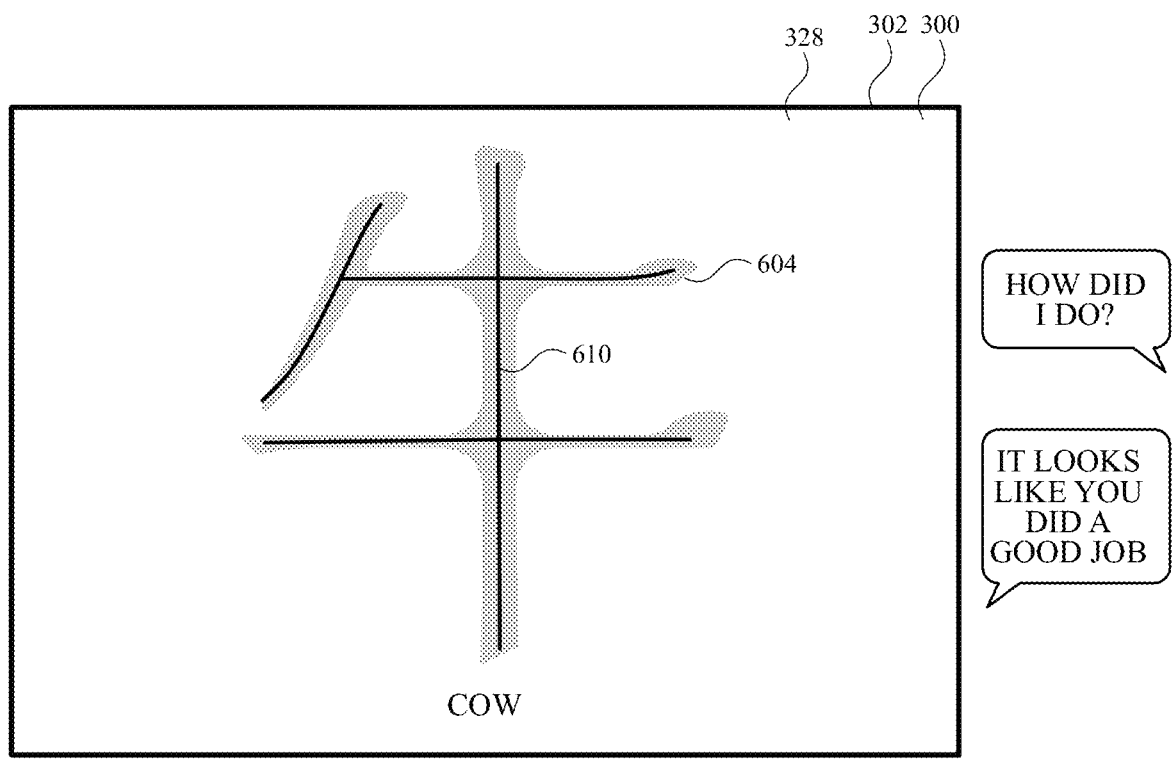

FIG. 6F shows that the user has completed writing "牛," as indicated by completed marking 610.

In some examples, device 302 receives, from the user, an input corresponding to a request to evaluate the marking (evaluation input). In some examples, the evaluation input includes a speech input (e.g., intended for the DA), a selection of a displayed icon, a gesture input, or the like. For example, FIG. 6F shows device 302 receiving the speech input "how did I do?".

In some examples, in accordance with receiving the evaluation input, device 302 compares (e.g., using detection module 206) detected marking 610 to graphical overlay 604 to obtain an evaluation result. For example, detection module 206 applies image recognition to detected marking 610 to determine a degree of match between marking 610 and graphical overlay 604. In some examples, the evaluation result indicates the degree of match, e.g., a positive evaluation result if the degree of match satisfies a threshold and a negative evaluation result if the degree of match does not satisfy the threshold.

Device 302 further provides an output (e.g., audio output, displayed output) indicating the evaluation result. For example, in FIG. 6F, the DA provides the audio output "it looks like you did a good job" indicating a positive evaluation result, e.g., based on determining that marking 610 sufficiently matches graphical overlay 604. An example output indicating a negative evaluation result includes "you may want to try again," e.g., based on determining that marking 610 does not sufficiently match graphical overlay 604.

In some examples, in accordance with receiving the evaluation input, device 302 (e.g., using detection module 206) compares detected movement of the user to a predetermined stroke order for writing the character(s) in the second language to obtain an evaluation result. For example, detection module 206 determines, based on the movement data, the user's strokes that produced marking 610. Detection module 206 further determines a degree of match between the user's strokes and the predetermined (e.g., correct) stroke order for writing the character(s). In some examples, the evaluation result is positive or negative based on the degree of match, e.g., positive if the user wrote the strokes in the correct order, negative if the user wrote the strokes in an incorrect order.

Device 302 (e.g., the DA) further provides an output indicating the evaluation result. For example, a positive evaluation result corresponds to the output "nice job, you wrote 'イ' correctly in Japanese." An example negative evaluation result corresponds to the output "you may want to try again. You may have written some strokes in an incorrect order."

In some examples, device 302 determines, based on the detected movement of the user, a visual representation of the user's movement. For example, detection module 206 processes the movement data to determine a video of the user writing marking 610 and/or a video showing the writing instrument's movement. In some examples, detection module 206 causes device 302 to directly capture a video of the user writing marking 610, e.g., by capturing video of environment 300. For example, device 302 begins capturing the video when the user starts writing, e.g., as determined based on initially detecting marking 610 and/or detecting the initial movement of the user (e.g., initial movement of the drawing instrument).

In some examples, device 302 transmits the visual representation (e.g., video) to an external electronic device. For example, the external electronic device may belong to a foreign language teacher who can provide manual feedback on the user's writing.

FIGS. 7A-7F illustrate further techniques for assisted writing, according to various examples.

Figure 7A:
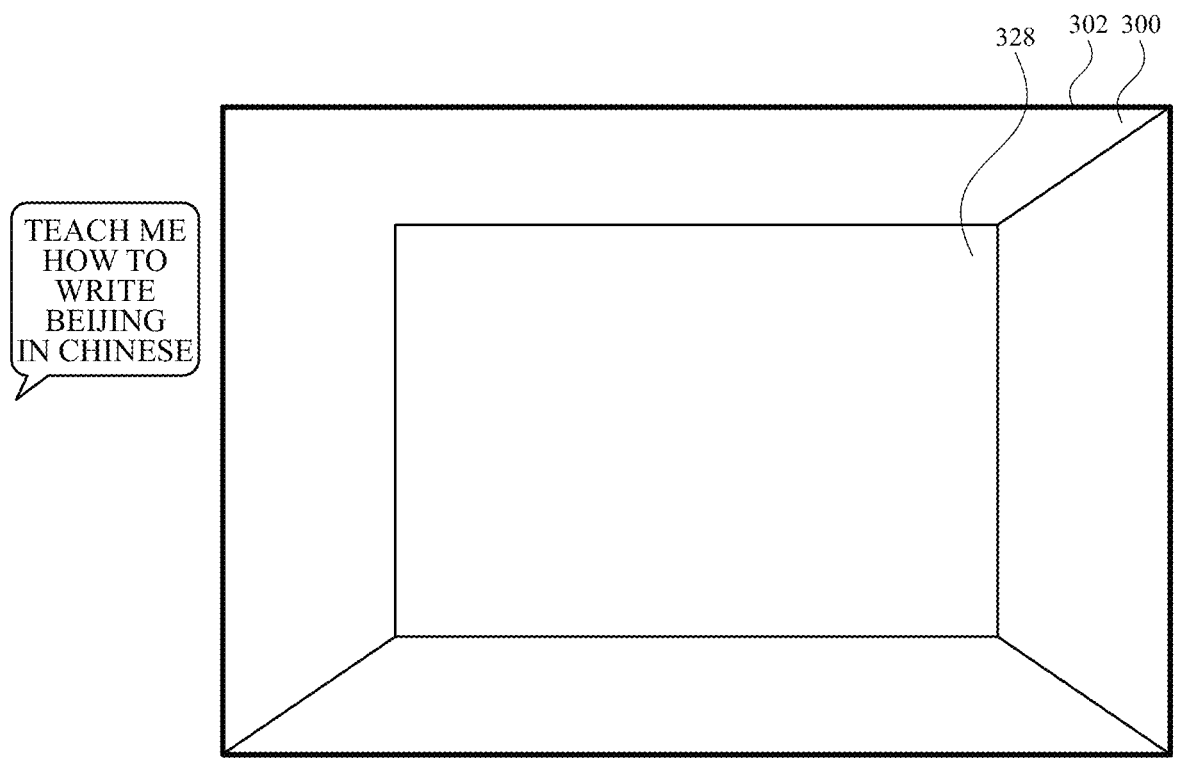
FIGS. 7A-7F illustrate techniques for assisted writing, according to various examples.

FIG. 7A shows a user's view of environment 300 using device 302. In the example of FIG. 7A, device 302 receives a writing assistance input from the user, e.g., the speech input "teach me how to write Beijing in Chinese." In other examples, the writing assistance input includes a speech input indicative of a request to learn a second language (e.g., foreign language). The speech input does not specify any character(s), e.g., does not request assistance with writing any particular characters, but rather generally requests to learn to write the second language. For example, the speech input is "teach me how to write Chinese" or "give me a Japanese writing lesson."

Figure 7B:
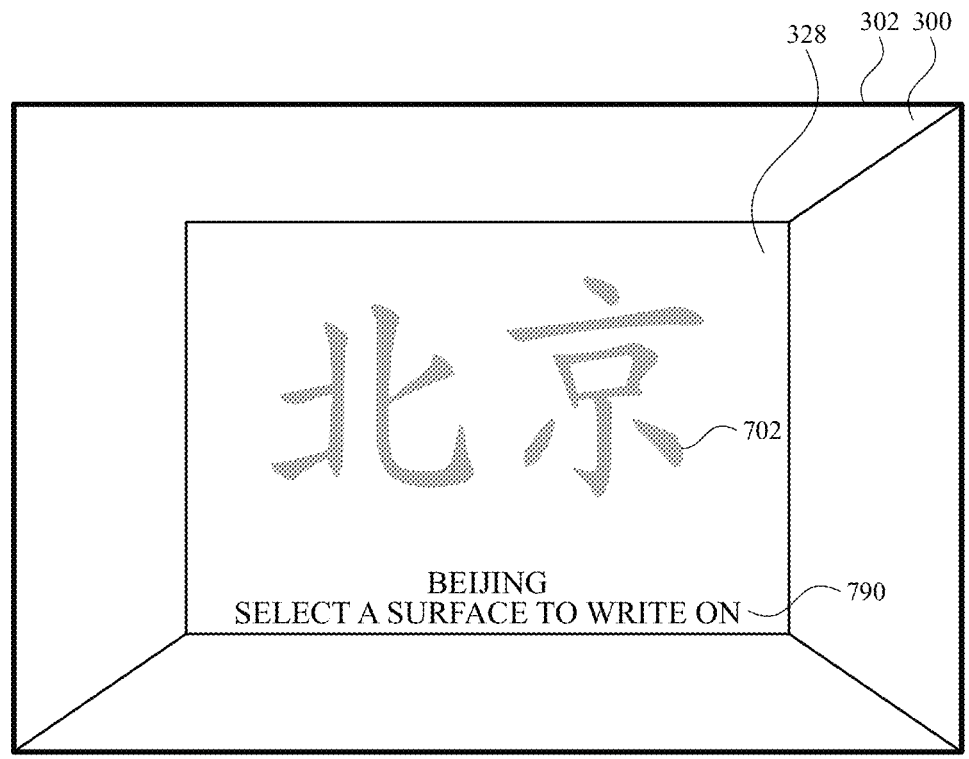

FIG. 7B shows the user's view of environment 300 in accordance with device 302 receiving the writing assistance input. For example, DA module 208 processes the speech input, device 302 launches the writing assistance application, and device 302 displays, over environment 300, graphical overlay 702 representing the requested character(s) in the second language, e.g., 北京 (Beijing). In some examples, device 302 (e.g., the DA) further outputs prompt 790 for the user to select a surface to write on.

Figure 7C:
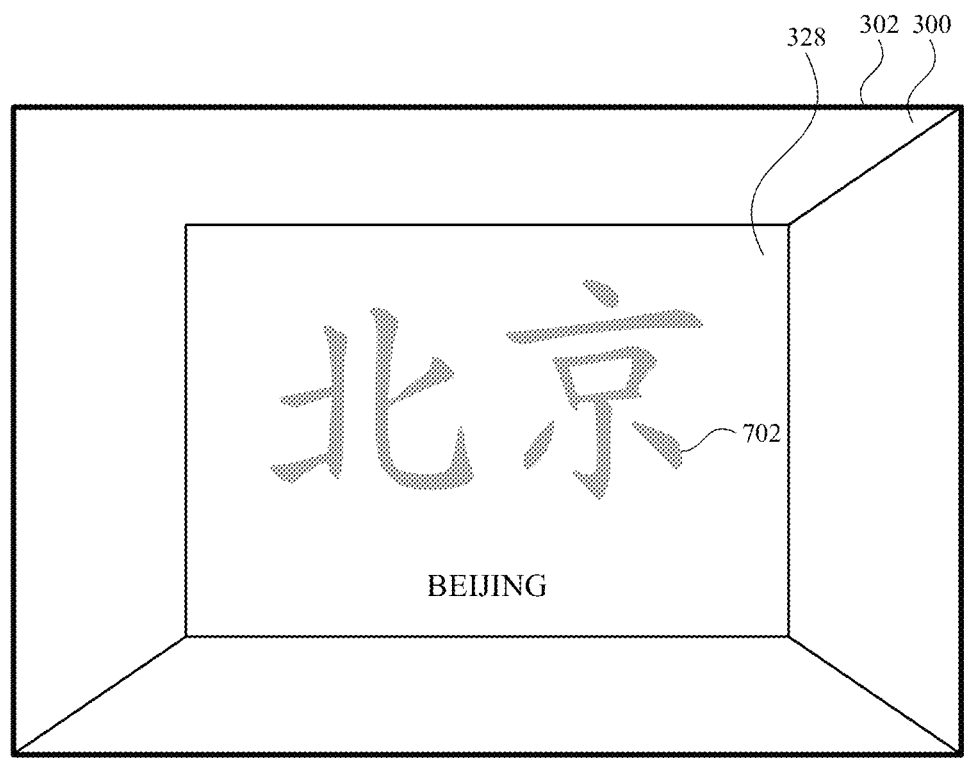

FIG. 7C shows that in accordance with receiving the writing assistance input, device 302 selects surface 328 (e.g., the front wall) in environment 300. For example, device 302 selects surface 328 based on receiving surface selection input (e.g., as described above with respect to FIGS. 3A-3M). Device 302 further displays graphical overlay 702 over (e.g., on) selected surface 328.

Figure 7D:
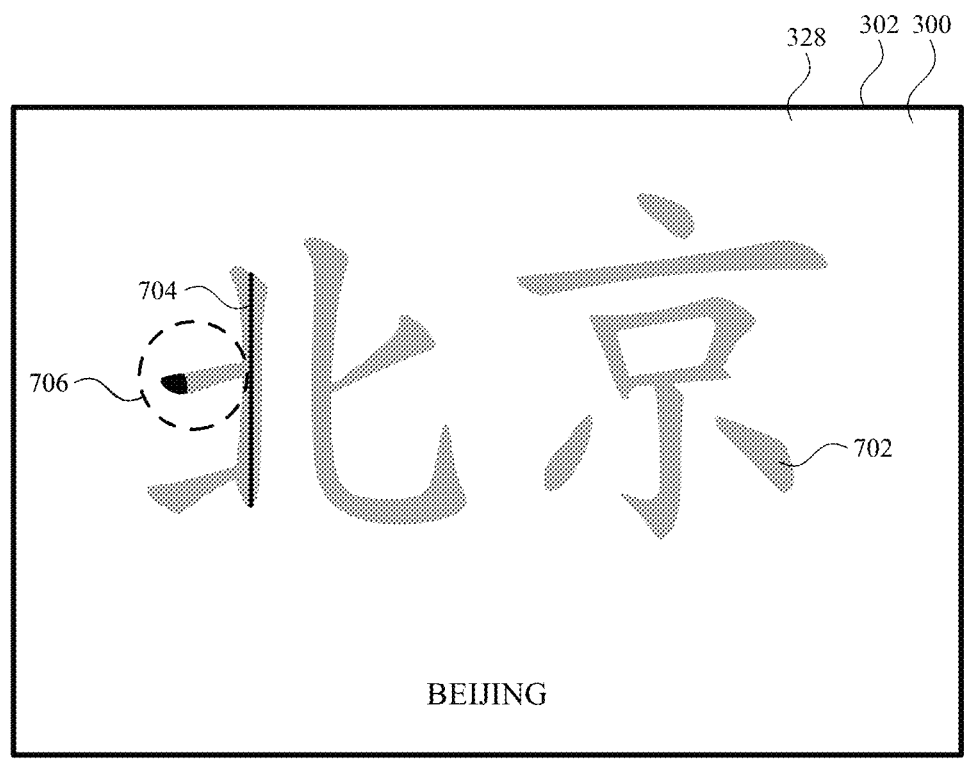

FIG. 7D shows that the user has approached surface 328 and started to write 北京, as indicated by marking 704. While displaying graphical overlay 702 over (e.g., on) surface 328, device 302 detects marking 704 and/or detects user movement corresponding to producing marking 704.

Device 302 further modifies the display of graphical overlay 702 based on detected marking 704. In some examples, modifying the display of graphical overlay 702 includes determining, based on detected marking 704, a proper next stroke for writing the character(s) in the second language and animating portion 706 to indicate the proper next stroke. For example, detection module 206 determines that marking 704 corresponds tracing a portion of graphical overlay 702 and determines (e.g., based on predetermined rules for writing the second language) next portion 706 corresponding to the proper next stroke. In some examples, detection module 206 determines the proper next stroke based on detected user movement. For example, detection module 206 determines that the detected movement corresponds to tracing a portion of graphical overlay (and/or to a particular stroke for writing the character(s)) and determines (e.g., based on the predetermined rules), next portion 706 corresponding to the proper next stroke.

In some examples, animating portion 706 to indicate the proper next stroke includes modifying, over time, a display manner (e.g., color), of portion 706. For example, FIGS. 7D-7E show that the color of portion 706 changes over time to indicate the proper next stroke for writing 北京.

Figure 7E:
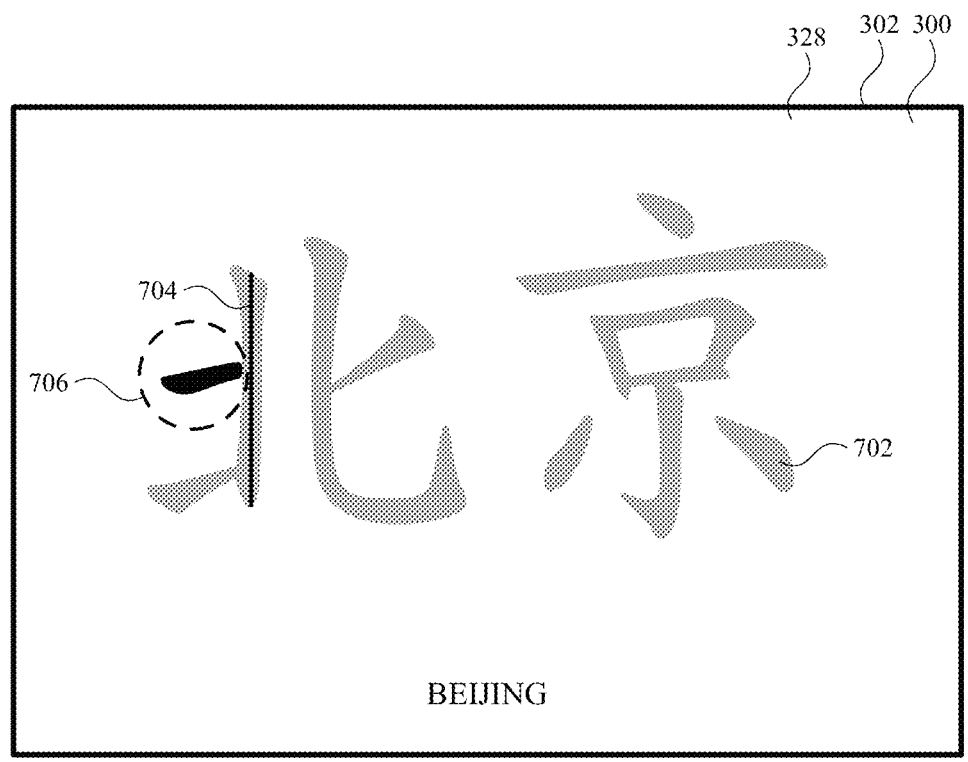

As discussed, animating graphical overlay 702 as discussed with respect to FIGS. 7D-7E includes animating graphical overlay 702 in a second manner (e.g., based on considering detected marking 704). Accordingly, in some examples, device 302 animates portion 706 to indicate a proper next stroke in accordance with DA module 208 determining a second predetermined type of user intent, e.g., based on the writing assistance input. For example, because the writing assistance input "teach me to how to write Beijing in Chinese" corresponds to a writing instruction intent, device 302 animates graphical overlay 702 to indicate a correct next stroke as the user writes.

It will be appreciated that device 302 can modify the display of graphical overlay 702 in various other manners, e.g., consistent with that discussed above with respect to FIGS. 3A-3M, 4A-4E, and 5A-5F.

Figure 7F:
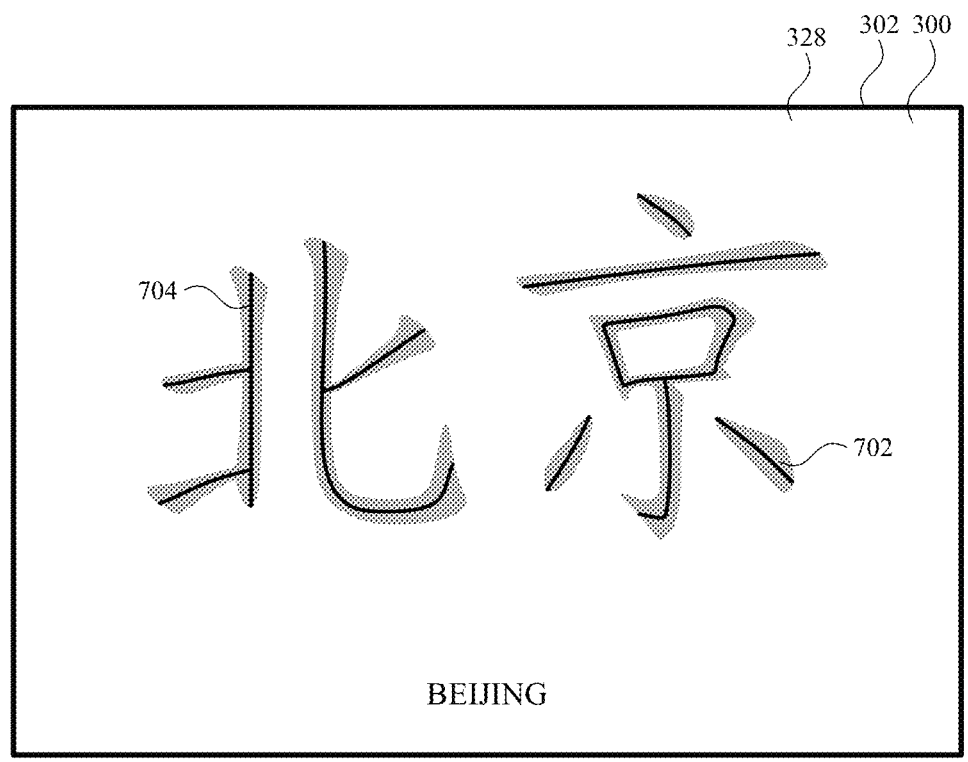

FIG. 7F shows that using graphical overlay 702, the user has completed writing 北京, as indicated by completed marking 704. In this manner, as the user writes, device 302 modifies graphical overlay 702 to indicate the proper next stroke, thereby assisting the user with writing a foreign language with a correct stroke order.

Figure 8A:
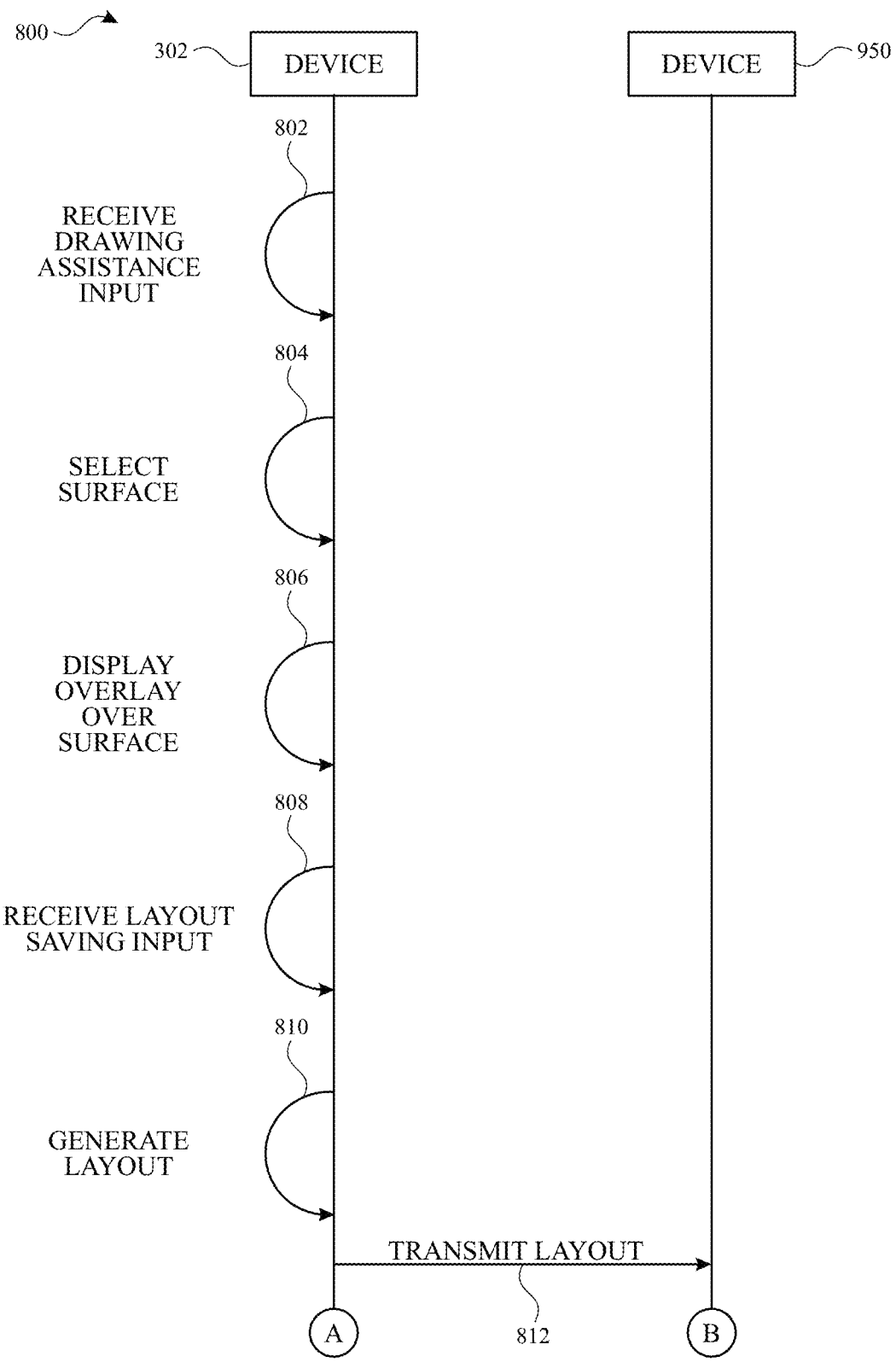
FIGS. 8A-8B illustrate a process for allowing multiple users to concurrently work on a drawing, according to various examples.
Figure 8B:
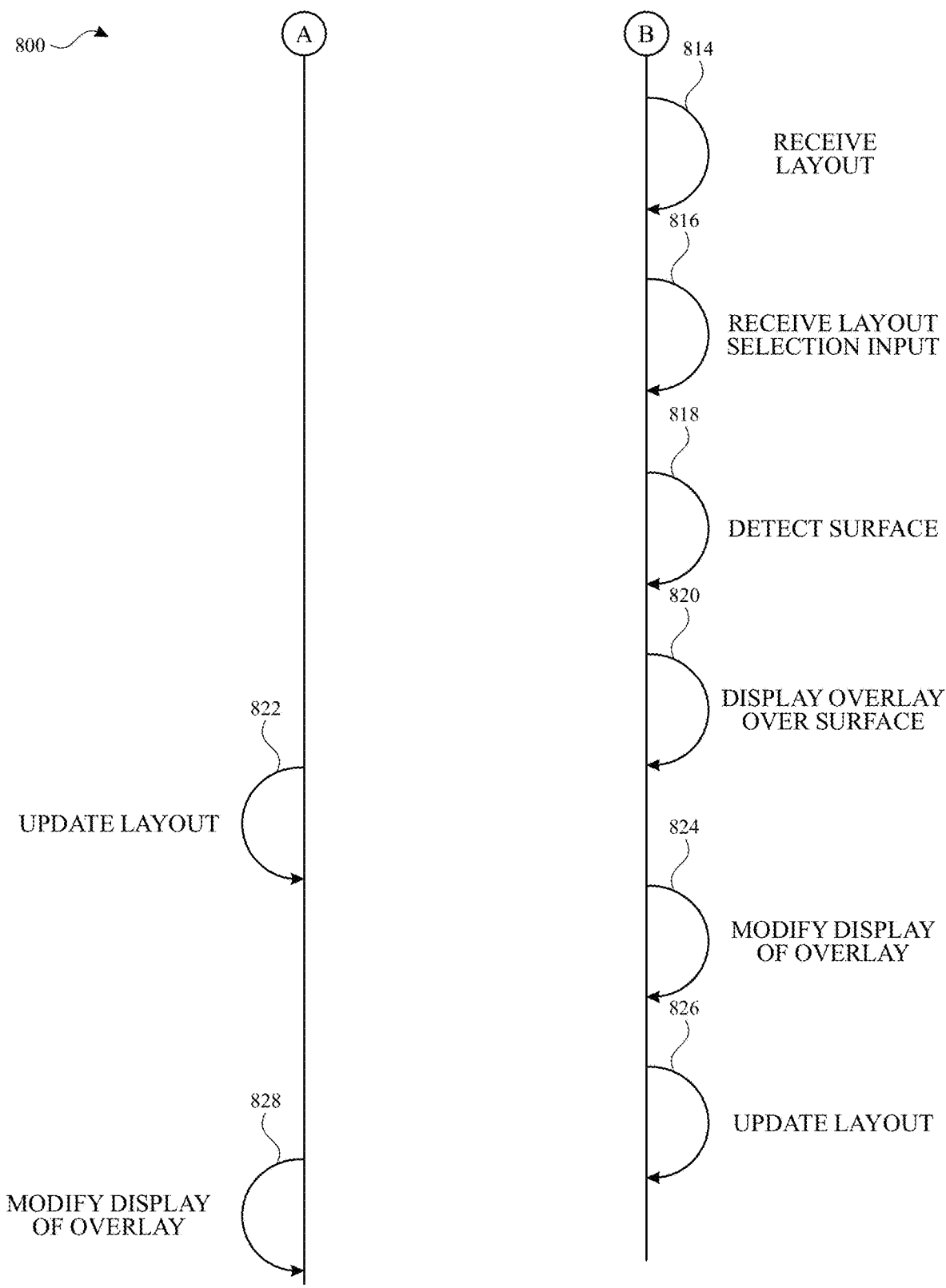

FIGS. 8A-8B illustrate process 800 for allowing multiple users to concurrently work on a drawing, according to various examples. Some steps in process 800 are, optionally, combined, the orders of some steps are, optionally, changed, and some steps are, optionally, omitted. Further, it will be appreciated that process 800 can include additional steps.

FIGS. 9A-9I illustrate techniques for allowing the multiple users to concurrently work on the drawing, according to various examples. FIGS. 9A-9I are discussed below concurrently with FIGS. 8A-8B.

At step 802, device 302 receives a drawing assistance input. For example, in FIG. 9A, device 302 (e.g., DA module 208) receives the speech input "help me draw a skyline of San Francisco." FIG. 9A further shows a first user's view of environment 300 using their device 302.

Figure 9A:
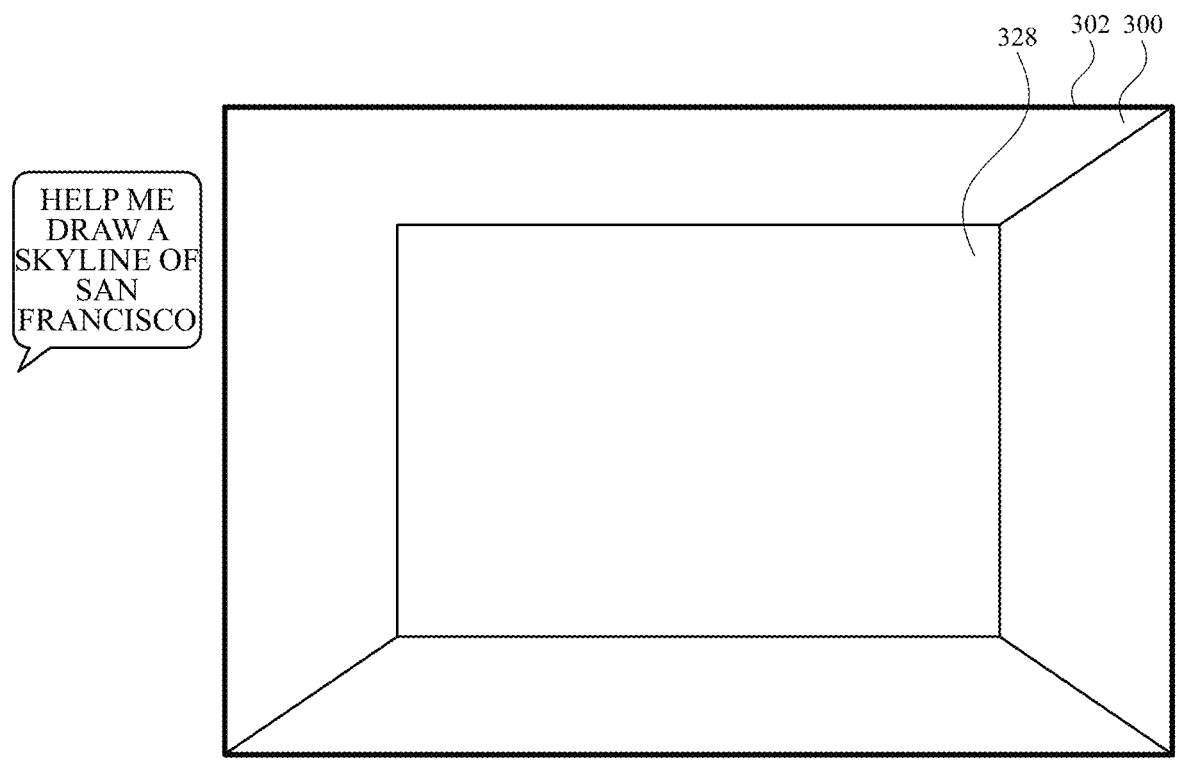
FIGS. 9A-9I illustrate techniques for allowing the multiple users to concurrently work on the drawing, according to various examples.
Figure 9B:
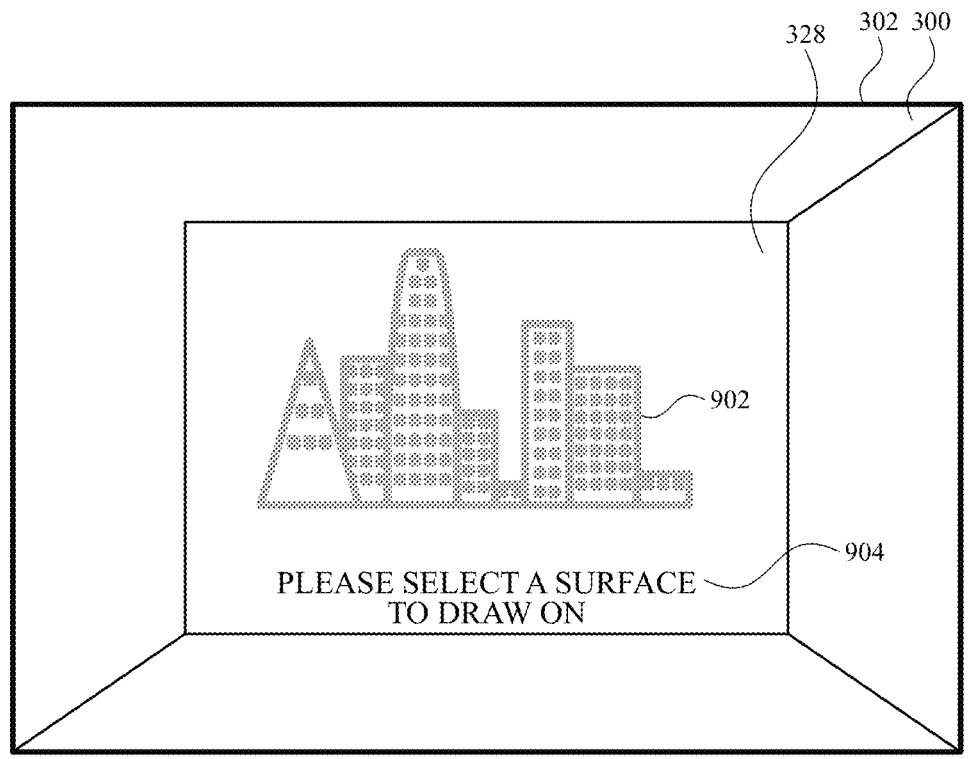

FIG. 9B shows the first user's view of environment 300 in accordance with device 302 receiving the drawing assistance input. For example, in accordance with receiving the drawing assistance input, DA module 208 processes the input, device 302 launches the drawing assistance application, obtains graphical overlay 902 representing the requested drawing, and displays graphical overlay 902 over environment 300. Device 302 (e.g., the DA) further outputs prompt 904 for the first user to select a surface to draw on.

At step 804, in accordance with receiving the drawing assistance input, device 302 selects surface 328 in environment 300.

At step 806, device 302 displays, over selected surface 328, graphical overlay 902. In some examples, displaying graphical overlay 902 over selected surface 328 includes anchoring graphical overlay 902 to selected surface 328.

Figure 9C:
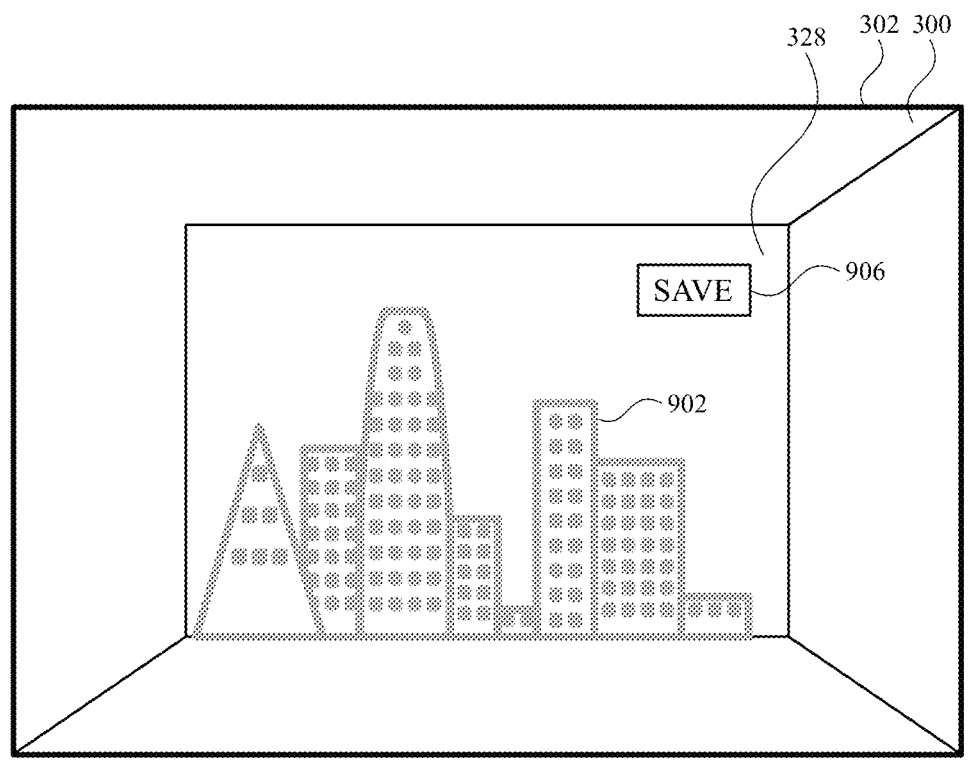

FIG. 9C shows that device 302 has selected surface 328 and displays graphical overlay 902 over selected surface 328. For example, the first user provided input to rescale and/or rotate graphical overlay 902 to appear as shown in FIG. 9C. The first user further provided surface selection input to cause display of graphical overlay 902 over surface 328 at a particular location. The view of FIG. 9C further includes save icon 906 (e.g., a virtual element), discussed in detail below.

At step 808, while displaying graphical overlay 902 over selected surface 328, device 302 receives, from the first user, input corresponding to a request to save a layout corresponding to drawing (layout saving input). As discussed, a drawing layout is a file including data representing graphical overlay 902 (e.g., with a scale, orientation, and/or location on surface 328 preselected by the first user) and selected surface 328. In some examples, the drawing layout indicates an anchoring of graphical overlay 902 to selected surface 328. For example, the drawing layout includes data representing the visual features of surface 328 (e.g., the corners and/or edges of surface 328) and/or other visual features (e.g., a user produced marking) device 302 uses as anchors for graphical overlay 902. In some examples, the drawing layout includes data representing display manner modifications to various portions of graphical overlay 902. Accordingly, as discussed in detail below, the drawing layout can indicate, to other electronic devices, the manner in which to display various portions of graphical overlay 902.

In some examples, the layout saving input includes a speech input (e.g., intended for the DA) corresponding to a request to save the drawing layout, e.g., speech inputs such as "save this drawing," "remember this layout," and the like. In some examples, the layout saving input corresponds to a selection of save icon 906 displayed concurrently with graphical overlay 902. In some examples, device 302 displays save icon 906 (and/or accepts layout saving input) in accordance with displaying graphical overlay 902 over selected surface 328.

At step 810, in accordance with receiving the layout saving input, device 302 generates the drawing layout, e.g., using layout module 210. For example, layout module 210 causes device 302 to save the drawing layout in memory.

At step 812, device 302 transmits the drawing layout to external electronic device 950. External electronic device 950 is implemented as another instance of device 302 and belongs to a second user, e.g., a user with whom the first user wants to work on the drawing.

Figure 9D:
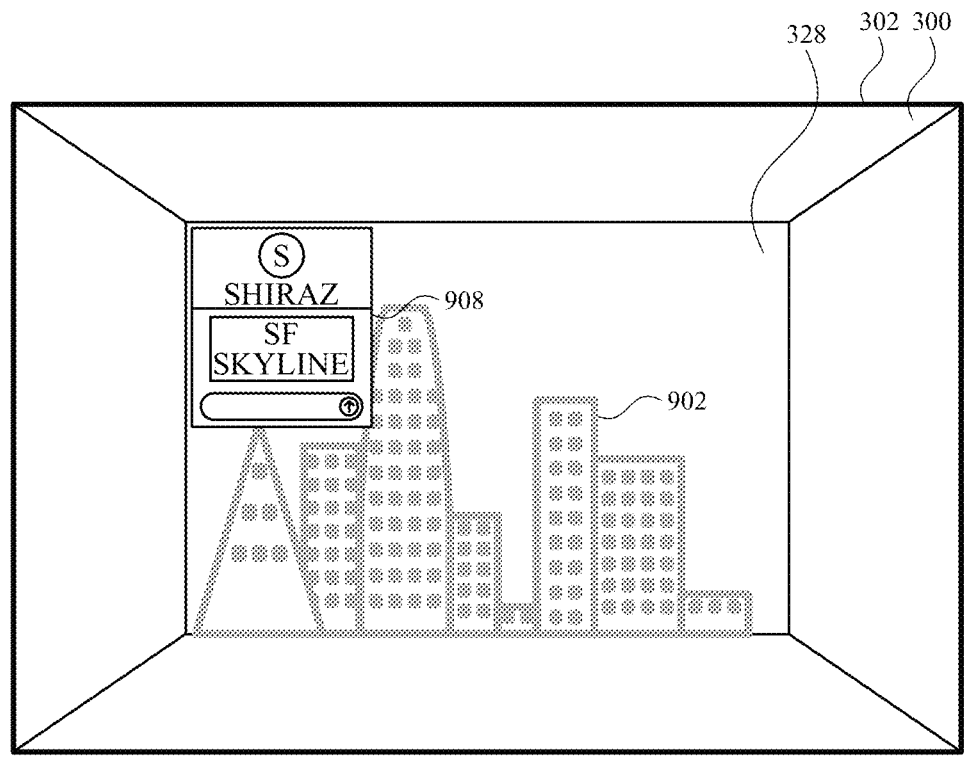

FIG. 9D shows that device 302 has transmitted the drawing layout to external device 950. In FIG. 9D, device 302 has received the layout saving input (e.g., a selection of save icon 906), saved the drawing layout in memory (e.g., with the user provided title "SF skyline"), and received input to transmit the drawing layout to external device 950. For example, FIG. 9D shows user interface 908 of a messaging application (e.g., a virtual element) indicating that the first user (e.g., Brad) sent the drawing layout to the second user (e.g., Shiraz) using a text message.

While FIG. 9D shows that device 302 transmits the drawing layout using a text message, in other examples, device 302 transmits (and external device 950 receives) the drawing layout using any other communication type for transmitting data files, e.g., an email message, Bluetooth communication between device 302 and external device 950, and the like.

Figure 9E:
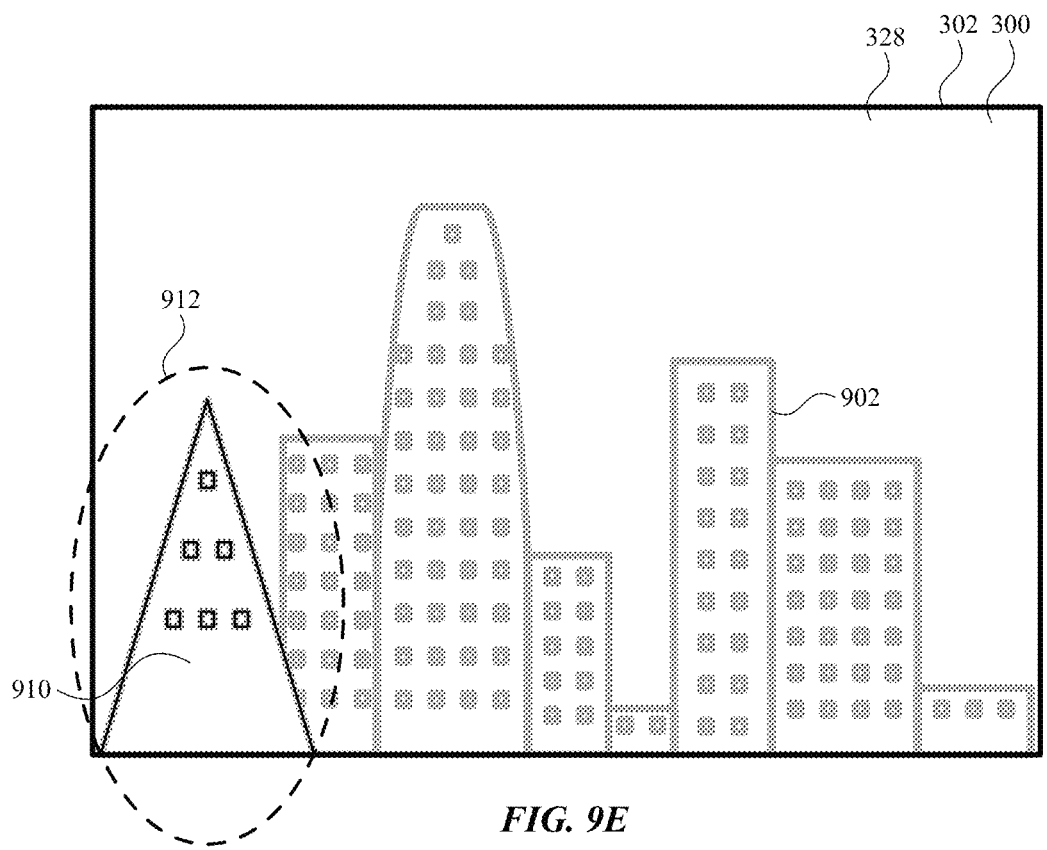

FIG. 9E shows that the first user has approached surface 328 and started to draw the drawing, e.g., as indicated by marking 910. In some examples, device 302 detects marking 910 while displaying graphical overlay 902 over surface 328.

Figure 9F:
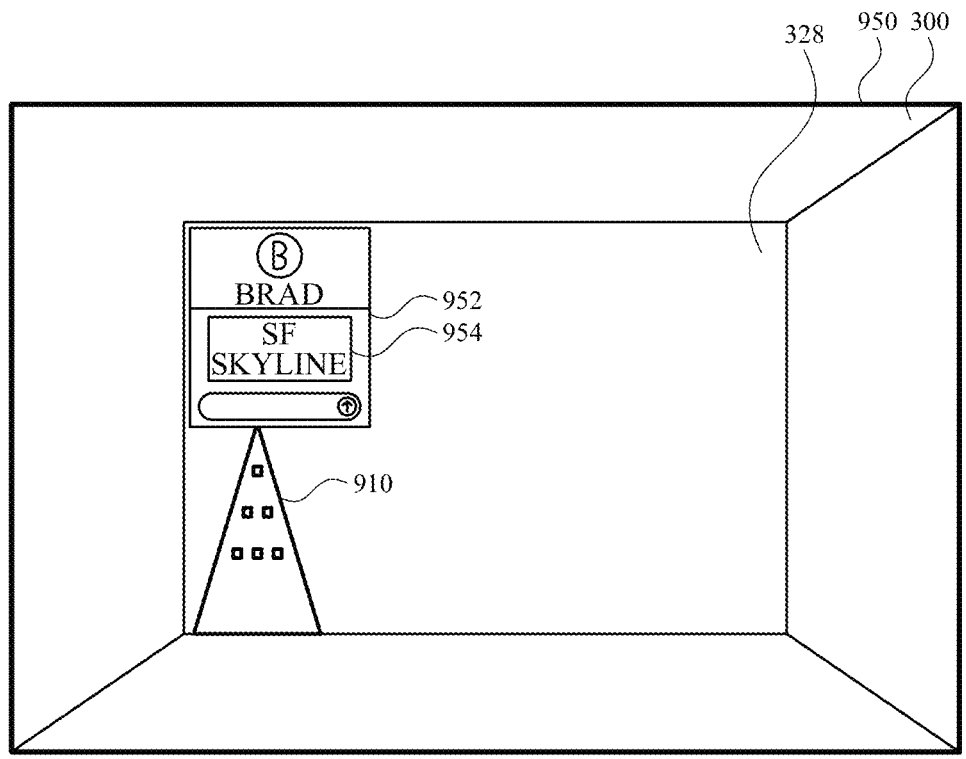

At step 814, external device 950 receives the drawing layout from device 302. For example, FIG. 9F shows the second user's view of environment 300 using external device 950. The view includes user interface 952 of a messaging application, e.g., a virtual element. User interface 952 shows that external device 950 has received the drawing layout from the first user (e.g., Brad). For example, user interface 952 includes icon 954 for the drawing layout titled "SF skyline."

The view of FIG. 9F further includes marking 910 produced by the first user. For example, because first user has started working on the drawing, the second user views marking 910 on surface 328. It will be appreciated that some of the views of FIGS. 9A-9I may include the first user, the second user, and/or their respective avatars. For example, the view of FIG. 9F may include a view of the first user (or their associated avatar) as they produce marking 910. However, FIGS. 9A-9I do not show the user(s) (or their associated avatar(s)) to avoid obscuring pertinent aspects of the figures.

At step 816, external device 950 receives, from the second user, an input corresponding to a selection of the drawing layout (layout selection input). In some examples, the layout selection input (e.g., touch input, gesture input) corresponds to a selection of displayed icon 954 representing the drawing layout. In some examples, the layout selection input includes a speech input intended for the DA, e.g., "open what Brad just sent" or "open the SF skyline drawing."

In some examples, in accordance with receiving the layout selection input, external device 950 activates a camera. The camera is configured to capture imagery of environment 300, e.g., a physical environment. In some examples, in accordance with receiving the layout selection input, external device 950 launches an installed application (e.g., a drawing assistance application) and/or causes the application to be displayed in the foreground. The application is configured to display graphical overlay 902 over environment 300.

At step 818, in accordance with receiving the layout selection input, external device 950 detects (e.g., using surface selection module 204), surface 328 in environment 300. For example, external device 950 attempts to detect the same surface 328 previously selected by device 302 in FIG. 9C and represented by the received drawing layout.

In some examples, detecting surface 328 incudes detecting, in environment 300, one or more candidate surfaces and comparing each of the candidate surface(s) to surface 328. For example, surface selection module 204 processes data captured by the activated cameras of device 950 using plane and/or surface detection techniques to detect the candidate surface(s). Surface selection module 204 then applies image recognition techniques to compare the candidate surface(s) to surface 328 and selects the best matching candidate surface.

In some examples, detecting surface 328 includes detecting marking 910 produced by the first user of device 302 and determining that marking 910 corresponds to at least a portion of graphical overlay 902. For example, using image recognition, surface selection module 204 compares marking 910 to graphical overlay 902 to determine if marking 910 matches any portion of graphical overlay 902, e.g., matches within a predetermined amount. In this manner, external device 950 can use previously produced markings on surface 328 to detect the correct surface, e.g., as the first user likely drew on the correct surface 328.

In some examples, detecting surface 328 is performed in accordance with a determination that a first location of external device 950 is within a threshold distance (e.g., 50 feet, 20 feet, 10 feet, 5 feet) of a second location of device 302. In some examples, external device 950 detects device 302 within physical proximity, e.g., detects device 302 using a short range communication protocol such as Bluetooth, UWB, and/or Zigbee. In some examples, detecting surface 328 is performed in accordance with detecting device 302 within physical proximity of external device 950. In some examples, detecting surface 328 is performed in accordance with a determination that an avatar associated with the first user is proximate to an avatar associated with the second user. For example, if the avatars intend to produce a virtual drawing in virtual environment 300, device 302 may determine whether the avatars are within a threshold virtual distance of each other, whether the avatars are in the same virtual environment (e.g., same virtual space), and the like. In this manner, before attempting to detect surface 328, device 950 can first determine proximity between the first user and the second user (or their associated avatars), e.g., as the users (or their associated avatars) should be proximate to concurrently work on the same drawing on the same surface. Accordingly, in some examples, in accordance with a determination that the first user and the second user (or their associated avatars) are not proximate, external device 950 forgoes detecting surface 328.

In some examples, external device 950 detects surface 328 without receiving any user input indicative of surface 328, e.g., without receiving surface selection input from the second user. For example, because the received drawing layout already represents preselected surface 328, device 950 can automatically detect surface 328 without requiring the second user's input after they provide the layout selection input.

In some examples, device 302 is unable to detect surface 328. For example, device 302 determines that the first and second users (or their associated avatars) are not proximate to each other, as discussed above. As another example, device 302 is unable to detect any candidate surface that sufficiently matches surface 328. In some examples, in accordance with a determination that surface 328 cannot be detected, device 302 (e.g., the DA) provides output (e.g., audio output and/or displayed output) indicative of an error associated with the drawing, e.g., "sorry I can't find where to put this drawing."

Figure 9G:
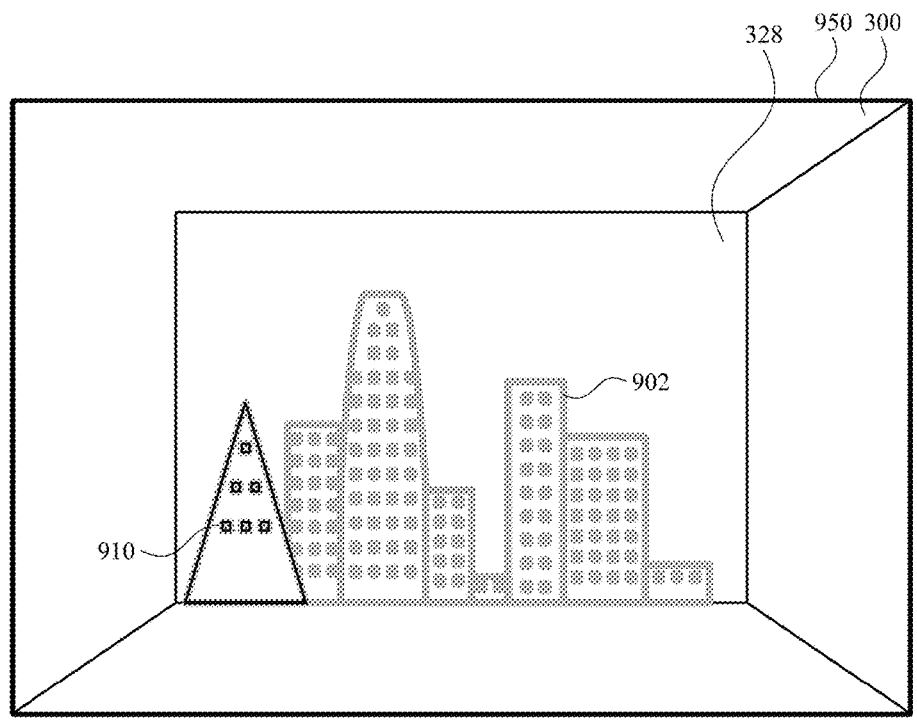

FIG. 9G shows the second user's view of environment 300 in accordance with receiving the layout selection input, e.g., in accordance with the second user selecting icon 954. For example, in accordance with receiving the layout selection input, device 302 has launched the drawing assistance application, activated camera(s) configured to capture imagery of environment 300, and detected surface 328.

At step 820, in accordance with detecting surface 328, device 950 displays graphical overlay 902 over surface 328, as shown in FIG. 9G. Graphical overlay 902 is anchored to surface 328. Graphical overlay 902 also has the same scale, orientation, and/or location on surface 328 that was preselected by the first user and indicated by the received drawing layout. Accordingly, the first and second users perceive that graphical overlay 902 is displayed over surface 328 (e.g., anchored to surface 328) consistently (e.g., FIGS. 9C and 9G), thereby allowing both users to correctly produce the drawing on the same surface 328. For example, FIG. 9G shows that a portion of graphical overlay 902 (viewed by the second user) correctly overlaps the first user's produced marking 910.

In some examples, because the received drawing layout indicates an anchoring of graphical overlay 902 to surface 328, external device 950 performs reduced processing to anchor graphical overlay 902. For example, because the drawing layout includes data representing the visual features (e.g., corners and/or edges of surface 328) used to anchor graphical overlay 902, external device 950 does not perform additional processing to determine the visual features.

In some examples, device 302 updates the visual features used to anchor graphical overlay 902 to surface 328. For example, as discussed, as the first user produces marking 910, device 302 anchors overlay 902 to surface 328 using updated visual features of produced marking 910 (e.g., the first user's drawn lines and curves). In some examples, in accordance with updating the visual features, device 302 (e.g., using layout module 210) updates the drawing layout to include data representing the updated visual features. In some examples, in accordance with updating the drawing layout, device 302 causes external device 950 to anchor (e.g., re-anchor) graphical overlay 902 to surface 328 using the updated visual features, e.g., by transmitting the updated drawing layout to external device 950. It will be appreciated that external device 950 can cause device 302 to anchor (e.g., re-anchor) graphical overlay 902 to surface 328 in analogous manner. In this manner, the visual features devices 302 and 950 use to anchor graphical overlay 902 remain consistent, thereby enabling consistent display of graphical overlay 902 for both the first and the second users, e.g., so that the users do not perceive graphical overlay 902 at different locations on surface 328.

Figure 9H:
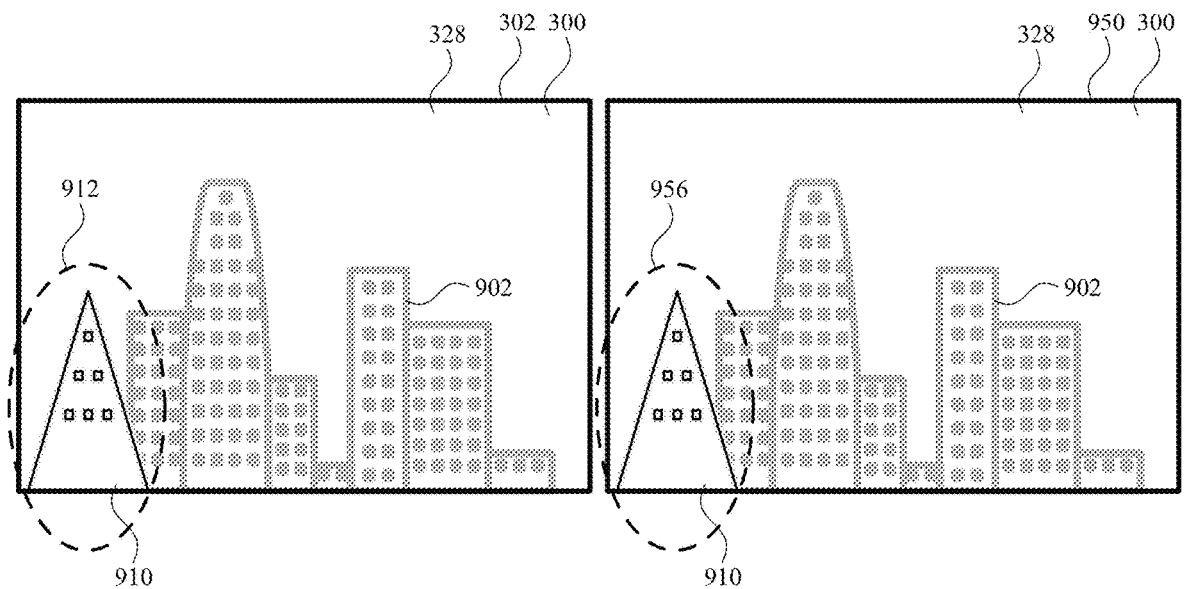
Figure 9I:
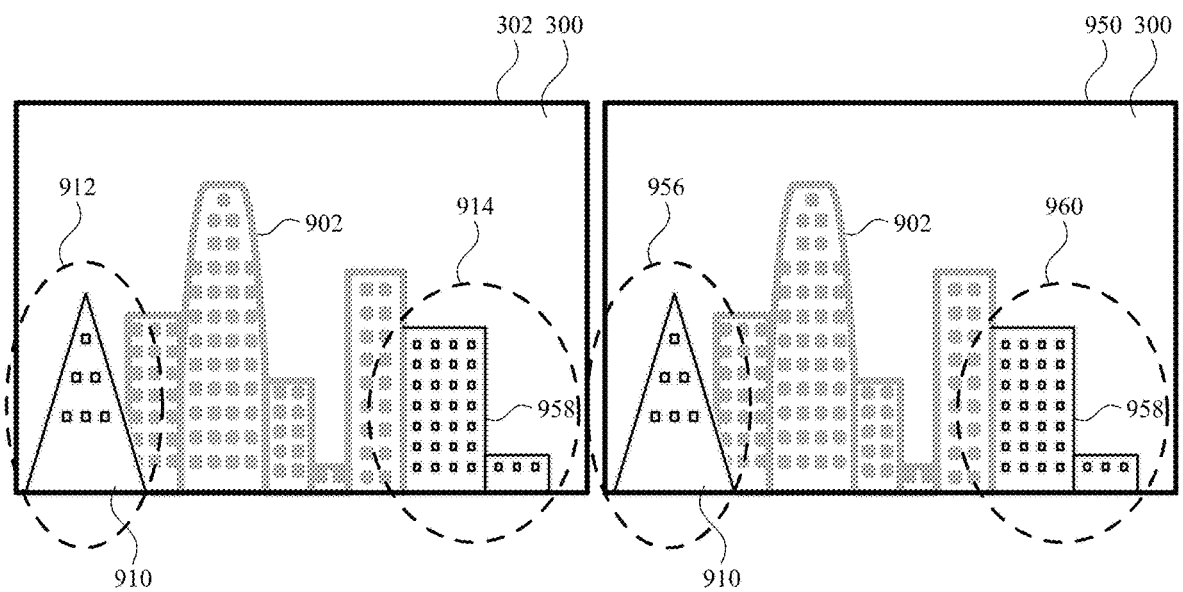

FIG. 9H shows the first user's and the second user's respective views of environment 300 using their respective devices 302 and 950. For example, from the view of FIG. 9G, the second user has approached surface 328 to see the view shown in the right panel of FIG. 9H. Device 302 displays first instance of graphical overlay 902 (first instance 902) and external device 950 displays second instance of graphical overlay 902 (second instance 902).

In some examples, referring to the left panel of FIG. 9H, device 302 determines that detected marking 910 corresponds to a completed portion of the drawing. In some examples, device 302 modifies a display manner of portion 912 (e.g., the left-most building) of first instance 902 corresponding to the completed portion of the drawing. In some examples, modifying the display manner includes modifying a color (e.g., or transparency, brightness, etc.) of portion 912. For example, the left panel of FIG. 9H shows that device 302 has modified the color of portion 912 that overlaps marking 910.

At step 822, in accordance with modifying the display manner of portion 912, device 302 (e.g., using layout module 910) updates the drawing layout to indicate the modified display manner. For example, device 302 updates the drawing layout to include data representing portion 912 displayed in the modified manner. In some examples, updating the drawing layout causes external device 950 to modify a display manner of portion 956 (e.g., the left-most building) of second instance 902 according to the modified display manner of portion 912, as shown in step 824. For example, device 302 transmits the updated drawing layout to external device 950 and external device 950 modifies portion 956 using the received (and updated) drawing layout. Portions 956 and 912 correspond to the same portion of graphical overlay 902. In this manner, device 302 and external device 950 can synchronize display manner modifications to graphical overlay 902 to indicate the portions of the drawing that each user has completed.

While FIGS. 8A-8B and 9A-9H show that device 302 causes external device 950 to modify the display manner of portion 956 after external device 950 initially displays second instance 902, in some examples, device 302 causes external device 950 to initially display second instance 902 (e.g., in FIG. 9G) with portion 956 having the modified displayed manner. For example, in FIG. 9E, device 302 modifies the display manner of portion 912 to indicate completion and updates the drawing layout to indicate the modified display manner. Accordingly, the initial version of the drawing layout transmitted to external device 950 indicates the display manner modification. Accordingly, based on the received drawing layout, external device 950 initially displays second instance 902 (e.g., in FIG. 9G) with portion 956 having the modified display manner.

External device 950 can cause device 302 to modify the display manner of first instance 902 in an analogous manner. For example, referring to the right panel of FIG. 9I, while displaying second instance 902, external device 950 detects marking 958 produced by the second user. External device 950 further determines that marking 958 corresponds to a completed portion of the drawing and thus modifies the display manner (e.g., color) of portion 960 (corresponding to the completed portion of the drawing) of second instance 902.

At step 826, in accordance with modifying the display manner of portion 960 (e.g., the two right-most buildings), external device 950 (e.g., using layout module 210) updates the drawing layout to indicate the modified display manner. In some examples, updating the drawing layout causes device 302 to modify a display manner of portion 914 (e.g., the two right-most buildings) of first instance 902 according to the modified display manner of portion 960, as shown in step 828. Portions 960 and 914 correspond to the same portion of graphical overlay 902.

It will be appreciated that devices 302 and 950 can modify the display manner of instances 902 in various other manners, e.g., as described with respect to FIGS. 3A-3M, 4A-4E, 5A-5F, 6A-F, and 7A-7F above. In some examples, devices 302 and 950 update the drawing layout to indicate only predetermined types of display manner modifications. For example, device 302 updates the drawing layout to indicate the modified display manner of portion 912 (and device 950 updates the drawing layout to indicate the modified display manner of portion 960) in accordance with display module 202 determining that the modification is of the predetermined type. In some examples, the predetermined type of modification includes modifications that may enhance both user's drawing experiences, e.g., modifications to indicate completion and modifications to indicate where a user currently draws, as discussed with respect to FIGS. 5A-5F. Modifications not of the predetermined type include modifications that may only enhance a single user's drawing experience, e.g., modifications corresponding to where a user gazes, modifications corresponding to the location of a user's appendage, modifications corresponding to the location of a tip of a drawing instrument, modifications based on the device's (or user's) distance from surface 328, and modifications to indicate a proper next stroke, as discussed with respect to FIGS. 3A-3M, 4A-4E, 6A-F, and 7A-7F. Accordingly, in some examples, devices 302 and 950 do not synchronize display manner modifications not of the predetermined type, e.g., by not updating the drawing layout to indicate such modifications.

Figure 10:
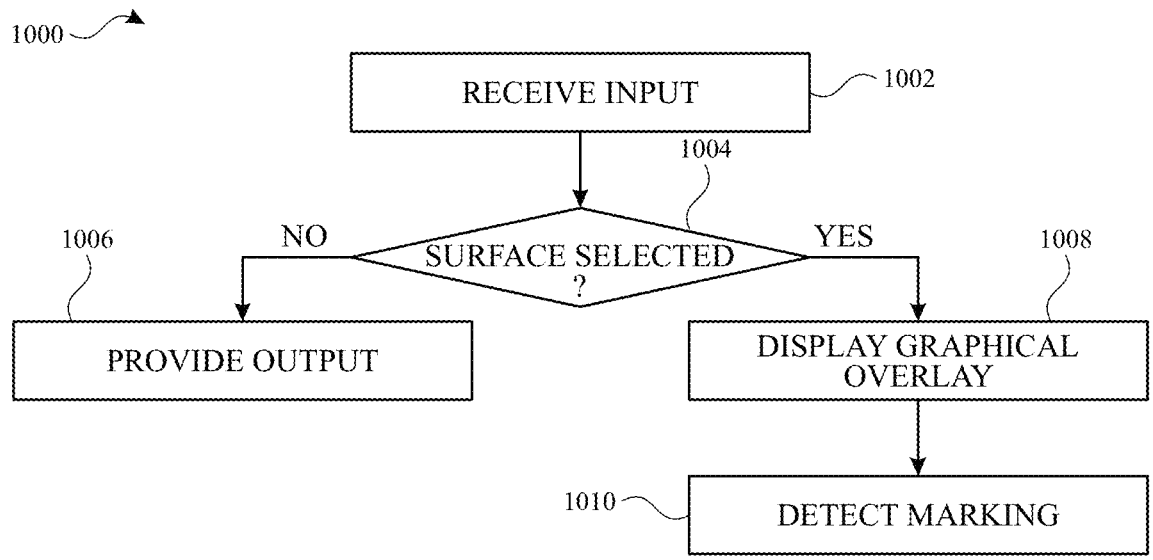
FIG. 10 illustrates a process for drawing assistance, according to various examples.

FIG. 10 illustrates process 1000 for drawing assistance, according to various examples. Process 1000 is performed, for example, at a device (e.g., device 302) and using system 200. In process 1000, some operations are, optionally, combined, the orders of some operations are, optionally, changed, and some operations are, optionally, omitted. In some examples, additional operations are performed in combination with process 1000.

At block 1002, an input corresponding to a request for assistance with a drawing (drawing assistance input) is received (e.g., by device 302) from a user. In some examples, the input corresponds to a selection of an image (e.g., image 308) corresponding to the drawing or to a selection of a 3-dimensional model (e.g., 3D model 310) corresponding to the drawing. In some examples, the input includes a speech input specifying the drawing, e.g., the speech input "help me draw a cat" in FIG. 4A or the speech input "help me draw a skyline of San Francisco" in FIG. 9A.

At block 1004, in accordance with receiving the input, it is determined whether a physical surface (e.g., surfaces 320, 328) in a physical environment (e.g., environment 300) is selected. For example, surface selection module 204 attempts to select a physical surface.

At block 1006, in accordance with a determination that the physical surface is not selected, an output is provided, e.g., the output "sorry, I can't find where to put the drawing."

In some examples, selecting the physical surface includes: detecting one or more candidate physical surfaces (e.g., surfaces 318, 320, 322, 324, 326, and 328); providing a first output indicative of the one or more candidate physical surfaces; and after providing the first output, receiving, from the user, a second input (e.g., surface selection input) corresponding to a selection of the physical surface from the one or more candidate physical surfaces.

In some examples, selecting the physical surface includes: receiving, from the user, a third input corresponding to a selection of the physical surface (e.g., surface selection input), where displaying a graphical overlay (e.g., graphical overlays 314, 402, 512, 604, 702, 902) over the selected physical surface is performed in accordance with receiving the third input. In some examples, the third input includes a user gaze input, where the user gaze input indicates that a user gaze is directed at the physical surface. In some examples, the third input includes a second speech input including a reference to the physical surface. In some examples, selecting the physical surface further includes processing the second speech input using context information associated with the second speech input to determine that the reference refers to the physical surface.

In some examples, in accordance with receiving the input corresponding to the request for assistance with the drawing, and prior to receiving the third input, the graphical overlay is displayed over the physical environment at a first location, where the third input corresponds to displacing the graphical overlay from the first location to a second location on the physical surface.

In some examples, selecting the physical surface includes determining (e.g., using surface selection module 204) that the graphical overlay is incompatible with a first candidate physical surface (e.g., surface 318). In some examples, in accordance with a determination that the graphical overlay is incompatible with the first candidate physical surface, a second output indicating that the graphical overlay is incompatible with the first candidate physical surface is provided.

At block 1008, a graphical overlay (graphical overlays 314, 402, 512, 604, 702, 902) representing the drawing is displayed over the selected physical surface (e.g., using display module 202). In some examples, displaying the graphical overlay over the selected physical surface includes anchoring the graphical overlay to the selected physical surface (e.g., using surface selection module 204).

In some examples, displaying the graphical overlay over the selected physical surface includes animating, using the graphical overlay, a suggested stroke order for the drawing. In some examples, the drawing includes multiple layers and the graphical overlay represents a single layer of the multiple layers.

In some examples, anchoring the graphical overlay to the selected physical surface includes: displaying the graphical overlay at a third location on the selected physical surface (e.g., the location of graphical overlay 314 in FIG. 3G); detecting movement of the electronic device; and in response to detecting the movement, continuing to display the graphical overlay at the third location (e.g., as shown in FIG. 3H).

In some examples, in accordance with receiving the input corresponding to the request for assistance with the drawing, the graphical overlay is displayed over the physical environment with a first orientation (e.g., as shown in FIG. 3C). In some examples, while displaying the graphical overlay with the first orientation, a fourth input corresponding to rotation of the graphical overlay is received. In some examples, displaying, over the selected physical surface, the graphical overlay includes: in accordance with receiving the fourth input, displaying, over the selected physical surface, the graphical overlay with a second orientation (e.g., as shown in FIG. 3F).

In some examples, in accordance with receiving the input corresponding to the request for assistance with the drawing the graphical overlay is displayed over the physical environment with a first scale (e.g., as shown in FIG. 3C). In some examples, while displaying the graphical overlay with the first scale, a fifth input corresponding to rescaling the graphical overlay is received. In some examples, displaying, over the selected physical surface, the graphical overlay includes: in accordance with receiving the fifth input, displaying, over the selected physical surface, the graphical overlay with a second scale (e.g., as shown in FIG. 3F).

In some examples, the graphical overlay includes a first portion (e.g., portion 418) and a second portion (e.g., portions 412, 414, and 416) and the second portion is displayed at a fourth location. In some examples, displaying, over the selected physical surface, the graphical overlay includes: while displaying the first portion in a first manner, modifying the display of the graphical overlay (e.g., using display module 202) to display the second portion in a second manner. In some examples, the first portion, when displayed in the first manner, has a greater brightness than the second portion displayed in the second manner. In some examples, the first portion, when displayed in the first manner, has a lesser transparency than the second portion displayed in the second manner.

In some examples, a second user gaze input is detected. In some examples, it is determined, based on the second user gaze input, that a user gaze is directed at the fourth location, where modifying the display of the graphical overlay is performed in accordance with a determination (e.g., by display module 202) that the user gaze is directed at the fourth location.

In some examples, an appendage of the user (e.g., appendage 408) is detected at a fifth location (e.g., by detection module 206). In some examples, it is determined (e.g., by detection module 206) that the fifth location corresponds to the fourth location, where modifying the display of the graphical overlay is performed in accordance with determining that the fifth location corresponds to the fourth location.

In some examples, a tip of a drawing instrument associated with the user (e.g., drawing instrument 406) is detected at sixth location (e.g., by detection module 206). In some examples, it is determined (e.g., by detection module 206) that the sixth location corresponds to the fourth location, where modifying the display of the graphical overlay is performed in accordance with determining that the sixth location corresponds to the fourth location.

At block 1010, while displaying the graphical overlay over the selected physical surface a marking (e.g., markings 330, 516, 610, 704, 910) produced by the user on the physical surface is detected (e.g., by detection module 206), where the marking corresponding to the drawing. In some examples, anchoring the graphical overlay to the selected physical surface includes anchoring the graphical overlay to the selected physical surface based on the detected marking produced by the user.

In some examples, it is determined (e.g., by detection module 206) that the detected marking (e.g., marking 516) corresponds to a completed portion of the drawing. In some example: displaying, over the selected physical surface, the graphical overlay includes: in accordance with a determination that the detected marking corresponds to the completed portion of the drawing, modifying (e.g., using display module 202) a display manner of a third portion of the graphical overlay (e.g., portion 518), the third portion corresponding to the completed portion of the drawing.

In some examples, while displaying the graphical overlay over the selected physical surface, movement of the electronic device away from the selected physical surface is detected (e.g., as shown in FIGS. 3J and 3M). In some examples, in accordance with detecting movement of the electronic device away from the selected physical surface, it is determined (e.g., by display module 202) whether one or more drawing completion criteria are satisfied. In some examples, in accordance with a determination that the one or more drawing completion criteria are satisfied, the display of the graphical overlay is modified (e.g., by display module 202) to display the graphical overlay in a third manner (e.g., as show in FIG. 3M). In some examples, in accordance with a determination that the one or more drawing completion criteria are not satisfied, the display of the graphical overlay is modified (e.g., by display module 202) to display the graphical overlay in a fourth manner (e.g., as shown in FIG. 3J).

In some examples, movement of the user is detected (e.g., by detection module 206), where the movement corresponds to the user producing the marking.

The operations discussed above with respect to FIG. 10 are optionally implemented by the components depicted in FIG. 2, e.g., by system 200.

Figure 11:
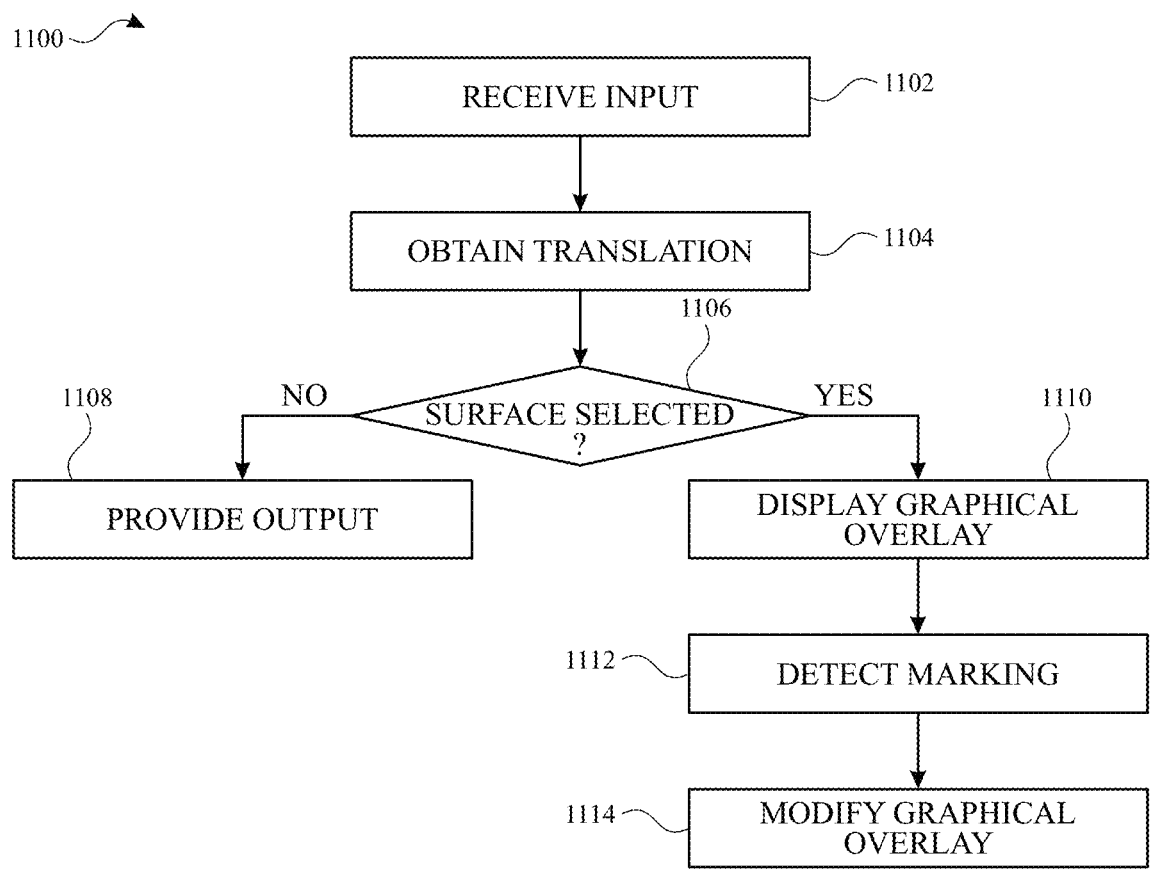
FIG. 11 illustrates a process for writing assistance, according to various examples.

FIG. 11 illustrates process 1100 for writing assistance, according to various examples. Process 1100 is performed, for example, at a device (e.g., device 302) and using system 200. In process 1100, some operations are, optionally, combined, the orders of some operations are, optionally, changed, and some operations are, optionally, omitted. In some examples, additional operations are performed in combination with process 1100.

At block 1102, an input corresponding to a request for assistance with writing one or more characters in a second language different from a first language (writing assistance input) is received from a user. In some examples, the input includes a speech input specifying, in the first language, the one or more characters (e.g., "how do I write cow in Japanese?"). In some examples, the input includes a second speech input indicative of a request to learn the second language (e.g., "teach me how to write Chinese"), where the second speech input does not specify the one or more characters. In some examples, the input corresponds to a selection of the one or more characters displayed in the second language (e.g., a selection of icon 606).

At block 1104, a translation of the one or more characters from the first language to the second language is obtained.

At block 1106, in accordance with receiving the input, it is determined whether a physical surface (e.g., surface 328) in a physical environment (e.g., environment 300) is selected. For example, surface selection module 204 attempts to select a physical surface.

In some examples, selecting the physical surface includes: receiving, from the user, a fourth input corresponding to a selection of the physical surface (e.g., surface selection input). In some examples, displaying the graphical overlay over the selected physical surface is performed in accordance with receiving the fourth input. In some examples, the fourth input includes a user gaze input, wherein the user gaze input indicates that a user gaze is directed at the physical surface. In some examples, the fourth input includes a third speech input including a reference to the physical surface (e.g., "the front wall," "behind the whiteboard"). In some examples, selecting the physical surface further includes processing (e.g., using DA module 208) the third speech input using context information associated with the third speech input to determine that the reference refers to the physical surface.

In some examples, in accordance with receiving the input corresponding to the request for assistance with writing one or more characters in the second language, and prior to receiving the fourth input, a graphical overlay (e.g., graphical overlays 604, 702) is displayed over the physical environment (e.g., environment 300) at a first location. In some examples, the fourth input corresponds to displacing the graphical overlay from the first location to a second location on the physical surface.

At block 1108, in accordance with a determination that a physical surface is not selected, an output is provided (e.g., "sorry I can't find where to put the writing").

At block 1110, a graphical overlay representing the translation is displayed (e.g., using display module 202) over the selected physical surface. In some examples, displaying the graphical overlay over the selected physical surface includes anchoring (e.g., using surface selection module 204) the graphical overlay to the selected physical surface.

In some examples, anchoring the graphical overlay to the selected physical surface includes: displaying the graphical overlay at a third location on the selected physical surface; detecting movement of the electronic device; and in response to detecting the movement, continuing to display the graphical overlay at the third location. In some examples, anchoring the graphical overlay to the selected physical surface includes anchoring the graphical overlay to the selected physical surface based on a detected marking (e.g., markings 704, 610) produced by the user.

In some examples, the graphical overlay includes the one or more characters in the first language. In some examples, displaying the graphical overlay over the selected physical surface includes animating, using the graphical overlay, a proper stroke order for writing the one or more characters in the second language, e.g., as shown in FIGS. 6C-6D.

At block 1112, while displaying the graphical overlay over the selected physical surface, a marking (e.g., markings 704, 610) produced by the user on the physical surface is detected (e.g., by detection module 206). The marking corresponds to the one or more characters written in the second language.

At block 1114, the display of the graphical overlay is modified (e.g., using display module 202) based on the marking. In some examples, modifying the display of the graphical overlay based on the marking includes: determining (e.g., using detection module 206), based on the detected marking, a proper next stroke for writing the one or more characters in the second language; and animating a first portion of the graphical overlay (e.g., portion 706) to indicate the proper next stroke. In some examples, animating the first portion of the graphical overlay to indicate the proper next stroke includes modifying, over time, a color of the first portion of the graphical overlay. In some examples, animating the first portion of the graphical overlay to indicate the proper next stroke is performed in accordance with determining, based on the input, a predetermined type of user intent (e.g., using DA module 208).

In some examples, modifying the display of the graphical overlay based on the marking includes: determining (e.g., using detection module 206) that the detected marking corresponds to a completed portion of the one or more characters in the second language; and in accordance with a determination that the detected marking corresponds to the completed portion of the one or more characters in the second language: modifying a display manner of a second portion of the graphical overlay, the second portion corresponding to the completed portion of the one or more characters in the second language.

In some examples, a second input corresponding to a request to evaluate the marking (e.g., "how did I do?" in FIG. 6F) is received from the user. In some examples, in accordance with receiving the second input, the detected marking is compared (e.g., using detection module 206) to the graphical overlay to obtain a first evaluation result. In some examples, a first output indicating the first evaluation result is provided (e.g., "It looks like you did a good job" in FIG. 6F).

In some examples, movement of the user is detected (e.g., using detection module 206). The movement corresponds to the user producing the marking.

In some examples, a third input corresponding to a request to evaluate the marking is received from the user. In some examples, in accordance with receiving the third input, the detected movement of the user is compared (e.g., using detection module 206) to a predetermined stroke order for writing the one or more characters in the second language to obtain a second evaluation result. In some examples, a second output indicating the second evaluation result is provided.

In some examples, a visual representation of the movement of the user (e.g., a video) is determined (e.g., using detection module 206) based on the detected movement of the user. In some examples, the visual representation is transmitted to an external electronic device.

The operations discussed above with respect to FIG. 11 are optionally implemented by the components depicted in FIG. 2, e.g., by system 200.

Figure 12:
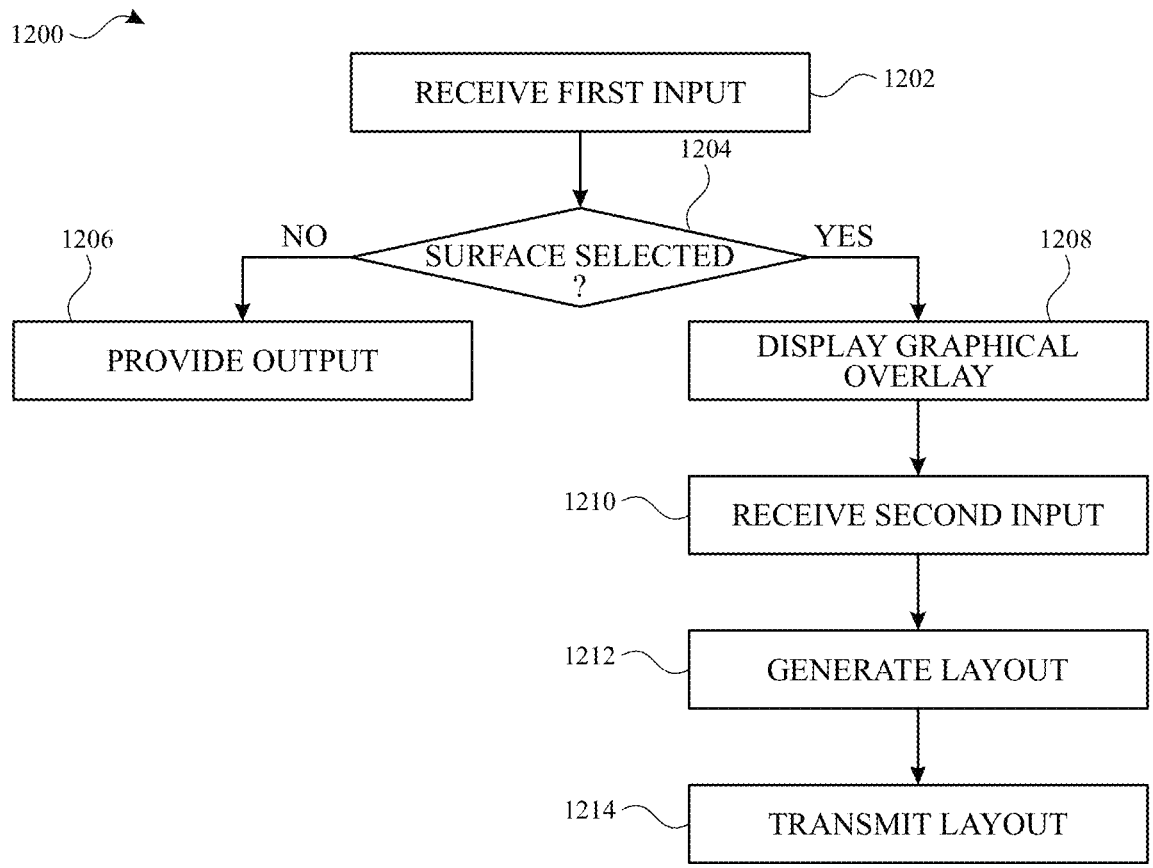
FIG. 12 illustrates a process for sharing a drawing layout, according to various examples.

FIG. 12 illustrates process 1200 for sharing a drawing layout, according to various examples. Process 1200 is performed, for example, at a device (e.g., device 302) and using system 200. In process 1200, some operations are, optionally, combined, the orders of some operations are, optionally, changed, and some operations are, optionally, omitted. In some examples, additional operations are performed in combination with process 1200.

At block 1202, a first input corresponding to a request for assistance with a drawing (e.g., the drawing assistance input "help me draw a skyline of San Francisco" in FIG. 9A) is received from a user. In some examples, the first input corresponds to a selection of an image corresponding to the drawing or to a selection of a 3-dimensional model corresponding to the drawing. In some examples, first input includes a second speech input specifying the drawing.

At block 1204, in accordance with receiving the first input, it is determined whether a physical surface (e.g., surface 328) in a physical environment (e.g., environment 300) is selected. For example, surface selection module 204 attempts to select a physical surface.

In some examples, selecting the physical surface includes receiving, from the user, a third input corresponding to a selection of the physical surface, where displaying a graphical overlay (e.g., graphical overlay 902) over the selected physical surface is performed in accordance with receiving the third input. In some examples, the third input includes a user gaze input, where the user gaze input indicates that a user gaze is directed at the physical surface. In some examples, third input includes a third speech input including a reference to the physical surface and wherein selecting the physical surface further includes processing the third speech input (e.g., using DA module 208) using context information associated with the third speech input to determine that the reference refers to the physical surface.

In some examples, in accordance with receiving the first input corresponding to the request for assistance with the drawing, and prior to receiving the third input, the graphical overlay is displayed over the physical environment at a first location (e.g., the location of graphical overlay 902 in FIG. 9B). In some examples, the third input corresponds to displacing the graphical overlay from the first location to a second location on the physical surface (e.g., the location of graphical overlay 902 in FIG. 9C).

At block 1206, in accordance with a determination that a physical surface is not selected, an output (e.g., "sorry, I can't find where to put this drawing") is provided.

At block 1208, a graphical overlay representing the drawing (e.g., graphical overlay 902) is displayed (e.g., using display module 202) over the selected physical surface (e.g., surface 328). In some examples, displaying the graphical overlay over the selected physical surface includes anchoring (e.g., using surface selection module 204) the graphical overlay to the selected physical surface. In some examples, anchoring the graphical overlay to the selected physical surface includes: displaying the graphical overlay at a third location on the selected physical surface; detecting movement of the electronic device; and in response to detecting the movement, continuing to display the graphical overlay at the third location.

At block 1210, while displaying the graphical overlay over the selected physical surface, a second input corresponding to a request to save a layout corresponding to the drawing (layout saving input) is received from the user. In some examples, second input includes a speech input corresponding to the request to save the layout corresponding to the drawing. In some examples, second input corresponds to a selection of an icon (e.g., icon 906) displayed concurrently with the graphical overlay.

At block 1212, in accordance with receiving the second input, the layout corresponding to the drawing is generated (e.g., by layout module 210). In some examples, the layout indicates an anchoring of the graphical overlay to the selected physical surface At block 1214, the layout is transmitted to an external electronic device (e.g., external device 950). In some examples, transmitting the layout to the external electronic device includes transmitting the layout using at least one of: an email message; a text message; and Bluetooth communication between the electronic device and the external electronic device.

In some examples, while displaying the graphical overlay over the selected physical surface, a marking produced by the user on the physical surface (e.g., marking 910) is detected (e.g., using detection module 206). The marking corresponds to the drawing.

In some examples, it is determined (e.g., using detection module 206) that the detected marking corresponds to a completed portion of the drawing. In some examples, displaying, over the selected physical surface, the graphical overlay includes in accordance with a determination that the detected marking corresponds to the completed portion of the drawing, modifying (e.g., using display module 202) a first display manner of a first portion of the graphical overlay (e.g., portion 912), the first portion corresponding to the completed portion of the drawing. In some examples, modifying the first display manner includes modifying a color of the first portion.

In some examples, displaying the graphical overlay over the selected physical surface includes displaying a first instance of the graphical overlay (e.g., graphical overlay 902 in FIGS. 9B-9E and in the left panels of FIGS. 9H-9I) over the selected physical surface. In some examples, in accordance with modifying the first display manner, the layout is updated (e.g., using layout module 210) to indicate the modified first display manner. In some examples, updating the layout causes the external electronic device (e.g., device 950) to: while displaying a second instance of the graphical overlay (e.g., graphical overlay 902 in FIG. 9G and in the right panels of FIGS. 9H-9I) over the selected physical surface, modify a second display manner of a second portion (e.g., portion 956) of the second instance of the graphical overlay according to the modified first display manner, where the first portion (e.g., portion 912) and the second portion correspond to a same portion of the graphical overlay. In some examples, updating the layout to indicate the modified first display manner is performed in accordance with a determination (e.g., by display module 202) that the modification to the first display manner is of a predetermined type.

The operations discussed above with respect to FIG. 12 are optionally implemented by the components depicted in FIG. 2, e.g., by system 200.

Figure 13:
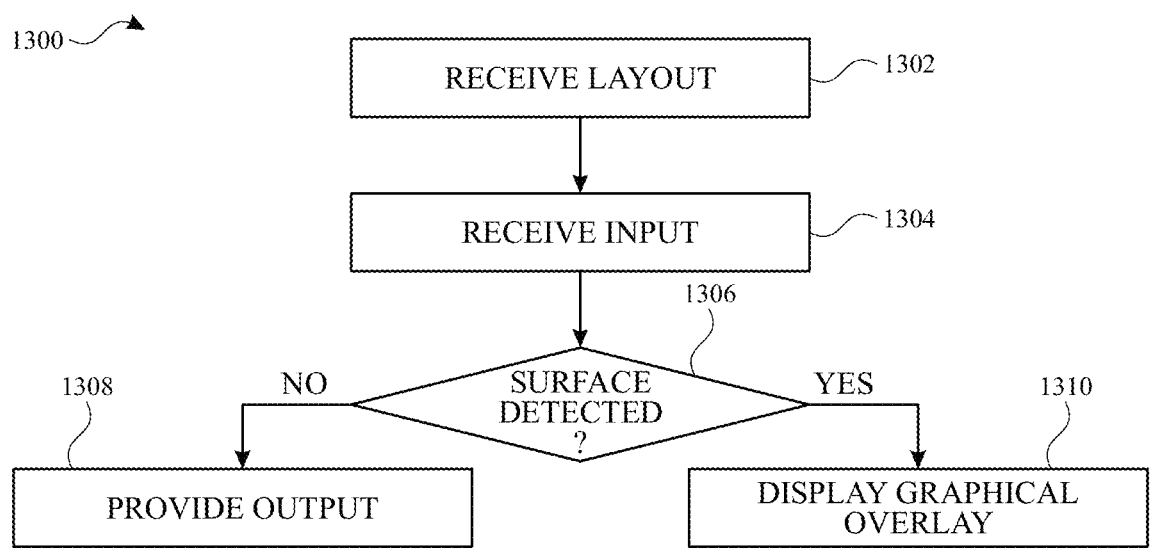
FIG. 13 illustrates a process for using a shared drawing layout for drawing assistance, according to various examples.

FIG. 13 illustrates process 1300 for using a shared drawing layout for drawing assistance, according to various examples. Process 1300 is performed, for example, at a device (e.g., device 950) and using system 200. In process 1300, some operations are, optionally, combined, the orders of some operations are, optionally, changed, and some operations are, optionally, omitted. In some examples, additional operations are performed in combination with process 1300.

At block 1302, a layout corresponding to a drawing is received from an external electronic device (e.g., device 302). In some examples, the layout indicates an anchoring of a graphical overlay (e.g., graphical overlay 902) representing the drawing to a physical surface (e.g., surface 328). In some examples, receiving the layout includes receiving the layout via at least one of: an email message from the external electronic device; a text message from the external electronic device; and a Bluetooth connection between the electronic device and the external electronic device.

At block 1304, an input (e.g., layout selection input) corresponding to a selection of the layout is received from the user. In some examples, the input corresponds to a selection of a displayed icon (e.g., icon 954) representing the layout.

In some examples, in accordance with receiving the input: a camera of the electronic device is activated, where the camera is configured to capture imagery of a physical environment (e.g., environment 300). In some examples, in accordance with receiving the input, an application installed on the electronic device (e.g., a drawing assistance application) is launched, where the application is configured to display the graphical overlay over the physical environment.

At block 1306, in accordance with receiving the input, it is determined whether the physical surface is detected in the physical environment. For example, surface selection module 204 attempts to detect the physical surface.

In some examples, detecting the physical surface includes: detecting (e.g., using surface selection module 204), in the physical environment, one or more candidate physical surfaces; and comparing each of the one or more candidate physical surfaces to the physical surface. In some examples, detecting the physical surface includes: detecting (e.g., using detection module 206) a marking (e.g., marking 910) on the physical surface, where the marking is produced by a second user of the external electronic device; and determining that the marking corresponds to at least a portion of the graphical overlay. In some examples, detecting the physical surface is performed in accordance with a determination that a first location of the electronic device (e.g., device 950) is within a threshold distance of a second location of the external electronic device (e.g., device 302). In some examples, the external electronic device is detected within physical proximity of the electronic device, where detecting the physical surface is performed in accordance with detecting the external electronic device within physical proximity of the electronic device. In some examples, detecting the physical surface is performed without receiving user input indicative of the physical surface (e.g., without receiving surface selection input).

At block 1308, in accordance with a determination that the physical surface cannot be detected, a first output indicative of an error associated with the drawing (e.g., "sorry, I can't find where to put this drawing") is provided.

At block 1310, in accordance with detecting the physical surface, the graphical overlay is displayed (e.g., using display module 202) over the physical surface, where the displayed graphical overlay is anchored to the physical surface. In some examples, while the graphical overlay is anchored to the physical surface: the graphical overlay is displayed at a third location on the physical surface; movement of the electronic device is detected; and in response to detecting the movement, the graphical overlay continues to be displayed at the third location.

In some examples, while displaying the graphical overlay over the physical surface, a second marking (e.g., marking 958) produced by the user on the physical surface is detected (e.g., by detection module 206), the second marking corresponding to the drawing. In some examples, it is determined (e.g., by detection module 206) that the detected second marking corresponds to a completed portion of the drawing. In some examples, displaying, over the physical surface, the graphical overlay includes: in accordance with a determination that the detected second marking corresponds to the completed portion of the drawing, modifying a first display manner of a first portion (e.g., portion 960) of the graphical overlay, the first portion corresponding to the completed portion of the drawing. In some examples, modifying the first display manner includes modifying a color of the first portion.

In some examples, displaying the graphical overlay over the physical surface includes displaying a first instance of the graphical overlay (e.g., graphical overlay 902 in FIG. 9G and in the right panels of 9H-9I) over the physical surface. In some examples, in accordance with modifying the first display manner, the layout is updated (e.g., using layout module 210) to indicate the modified first display manner. In some examples, updating the layout causes the external electronic device (e.g., device 302) to: while displaying a second instance of the graphical overlay (e.g., graphical overlay 902 in FIGS. 9B-9E and in the left panels of FIGS. 9H-9I) over the selected physical surface, modify a second display manner of a second portion (e.g., portion 914) of the second instance of the graphical overlay according to the modified first display manner, where the first portion (e.g., portion 960) and the second portion (e.g., portion 914) correspond to a same portion of the graphical overlay. In some examples, updating the layout to indicate the modified first display manner is performed in accordance with a determination (e.g., by display module 202) that the modification to the first display manner is of a predetermined type.

The operations discussed above with respect to FIG. 13 are optionally implemented by the components depicted in FIG. 2, e.g., by system 200.

It will be appreciated that one or more steps described above with respect to processes 1000, 1100, 1200, or 1300 may be included in another one of processes 1000, 1100, 1200, or 1300. For example, processes 1100, 1200, or 1300 can include the steps of modifying the display of the graphical overlay according to the user's gaze, according to the location of the user's appendage, according to the location of a tip of a drawing instrument, and/or according to whether one or more drawing completion criteria are satisfied and detecting movement of the device away from a physical surface, as described with respect to process 1000. As another example, processes 1000, 1200, or 1300 can include the steps of receiving an input corresponding to a request to evaluate the marking, in accordance with receiving the input, comparing the detected marking to the graphical overlay to obtain an evaluation result, and outputting the evaluation result, as described with respect to process 1200. Further details are not recited for brevity.

In some examples, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In some examples, an electronic device is provided that comprises means for performing any of the methods or processes described herein.

In some examples, an electronic device is provided that comprises a processing unit configured to perform any of the methods or processes described herein.

In some examples, an electronic device is provided that comprises one or more processors and memory storing one or more programs for execution by the one or more processors, the one or more programs including instructions for performing any of the methods or processes described herein.

As described above, one aspect of the present technology is the gathering and use of data available from various sources to assist a user with drawing or writing. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to enhance a user's drawing or writing experience. Accordingly, use of such personal information data may enable users to draw or write more accurately. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case providing drawing or writing assistance, the present technology can be configured to allow users to select to "opt in" or "opt out" of participation in the collection of personal information data during registration for services or anytime thereafter. In another example, users can select not to provide personal data for drawing or writing assistance. In yet another example, users can select to limit the length of time for which personal data used for drawing or writing assistance is retained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, drawing or writing assistance can be provided based on non-personal information data or a bare minimum amount of personal information, such as the input specifying the drawing or writing, other non-personal information available to the device, or publicly available information.

What is claimed is:

1. An electronic device, comprising:
   one or more processors;
   a memory; and
   one or more programs, wherein the one or more programs are stored in the memory and configured to be executed by the one or more processors, the one or more programs including instructions for:
   receiving, from a user, an input corresponding to a request for assistance with a drawing;
   in accordance with receiving the input, selecting a physical surface in a physical environment;
   displaying, over the selected physical surface, a graphical overlay representing the drawing, wherein displaying the graphical overlay over the selected physical surface includes anchoring the graphical overlay to the selected physical surface; and
   while displaying the graphical overlay over the selected physical surface:
   detecting a marking produced by the user on the physical surface, the marking corresponding to the drawing.

2. The electronic device of claim 1, wherein the input corresponds to a selection of an image corresponding to the drawing or to a selection of a 3-dimensional model corresponding to the drawing.

3. The electronic device of claim 1, wherein the input includes a speech input specifying the drawing.

4. The electronic device of claim 1, wherein selecting the physical surface includes:
   detecting one or more candidate physical surfaces;
   providing a first output indicative of the one or more candidate physical surfaces; and
   after providing the first output, receiving, from the user, a second input corresponding to a selection of the physical surface from the one or more candidate physical surfaces.

5. The electronic device of claim 1, wherein selecting the physical surface includes:
   receiving, from the user, a third input corresponding to a selection of the physical surface, wherein displaying the graphical overlay over the selected physical surface is performed in accordance with receiving the third input.

6. The electronic device of claim 5, wherein the third input includes a user gaze input, wherein the user gaze input indicates that a user gaze is directed at the physical surface.

7. The electronic device of claim 5, wherein the third input includes a second speech input including a reference to the physical surface, and wherein selecting the physical surface further includes:
   processing the second speech input using context information associated with the second speech input to determine that the reference refers to the physical surface.

8. The electronic device of claim 5, wherein the one or more programs further include instructions for:
   in accordance with receiving the input corresponding to the request for assistance with the drawing, and prior to receiving the third input, displaying the graphical overlay over the physical environment at a first location, and wherein:
   the third input corresponds to displacing the graphical overlay from the first location to a second location on the physical surface.

9. The electronic device of claim 1, wherein selecting the physical surface includes:
   determining that the graphical overlay is incompatible with a first candidate physical surface; and
   in accordance with a determination that the graphical overlay is incompatible with the first candidate physical surface, providing a second output indicating that the graphical overlay is incompatible with the first candidate physical surface.

10. The electronic device of claim 1, wherein the one or more programs further include instructions for:
    in accordance with receiving the input corresponding to the request for assistance with the drawing, displaying, over the physical environment, the graphical overlay with a first orientation; and
    while displaying the graphical overlay with the first orientation, receiving a fourth input corresponding to rotation of the graphical overlay, wherein displaying, over the selected physical surface, the graphical overlay includes:
    in accordance with receiving the fourth input, displaying, over the selected physical surface, the graphical overlay with a second orientation.

11. The electronic device of claim 1, wherein the one or more programs further include instructions for:
    in accordance with receiving the input corresponding to the request for assistance with the drawing, displaying, over the physical environment, the graphical overlay with a first scale; and
    while displaying the graphical overlay with the first scale, receiving a fifth input corresponding to rescaling the graphical overlay, wherein displaying, over the selected physical surface, the graphical overlay includes:
    in accordance with receiving the fifth input, displaying, over the selected physical surface, the graphical overlay with a second scale.

12. The electronic device of claim 1, wherein anchoring the graphical overlay to the selected physical surface includes:
    displaying the graphical overlay at a third location on the selected physical surface;
    detecting movement of the electronic device; and
    in response to detecting the movement, continuing to display the graphical overlay at the third location.

13. The electronic device of claim 1, wherein anchoring the graphical overlay to the selected physical surface includes:
    anchoring the graphical overlay to the selected physical surface based on the detected marking produced by the user.

14. The electronic device of claim 1, wherein:
    the graphical overlay includes a first portion and a second portion;
    the second portion is displayed at a fourth location; and
    displaying, over the selected physical surface, the graphical overlay includes:
    while displaying the first portion in a first manner, modifying the display of the graphical overlay to display the second portion in a second manner.

15. The electronic device of claim 14, wherein the first portion, when displayed in the first manner, has a greater brightness than the second portion displayed in the second manner.

16. The electronic device of claim 14, wherein the first portion, when displayed in the first manner, has a lesser transparency than the second portion displayed in the second manner.

17. The electronic device of claim 14, wherein the one or more programs further include instructions for:
  detecting a second user gaze input; and
  determining, based on the second user gaze input, that a user gaze is directed at the fourth location, wherein modifying the display of the graphical overlay is performed in accordance with a determination that the user gaze is directed at the fourth location.

18. The electronic device of claim 14, wherein the one or more programs further include instructions for:
  detecting, at a fifth location, an appendage of the user; and
  determining that the fifth location corresponds to the fourth location, wherein modifying the display of the graphical overlay is performed in accordance with determining that the fifth location corresponds to the fourth location.

19. The electronic device of claim 14, wherein the one or more programs further include instructions for:
  detecting, at a sixth location, a tip of a drawing instrument associated with the user; and
  determining that the sixth location corresponds to the fourth location, wherein modifying the display of the graphical overlay is performed in accordance with determining that the sixth location corresponds to the fourth location.

20. The electronic device of claim 1, wherein the one or more programs further include instructions for:
  determining that the detected marking corresponds to a completed portion of the drawing; and
  wherein displaying, over the selected physical surface, the graphical overlay includes:
    in accordance with a determination that the detected marking corresponds to the completed portion of the drawing, modifying a display manner of a third portion of the graphical overlay, the third portion corresponding to the completed portion of the drawing.

21. The electronic device of claim 1, wherein the one or more programs further include instructions for:
  while displaying the graphical overlay over the selected physical surface, detecting movement of the electronic device away from the selected physical surface; and
  in accordance with detecting movement of the electronic device away from the selected physical surface:
    determining whether one or more drawing completion criteria are satisfied;
    in accordance with a determination that the one or more drawing completion criteria are satisfied:
      modifying the display of the graphical overlay to display the graphical overlay in a third manner; and
    in accordance with a determination that the one or more drawing completion criteria are not satisfied:
      modifying the display of the graphical overlay to display the graphical overlay in a fourth manner.

22. The electronic device of claim 1, wherein the one or more programs further include instructions for:
  detecting movement of the user, the movement corresponding to the user producing the marking.

23. The electronic device of claim 1, wherein displaying, over the selected physical surface, the graphical overlay includes:
  animating, using the graphical overlay, a suggested stroke order for the drawing.

24. The electronic device of claim 1, wherein:
  the drawing includes multiple layers; and
  the graphical overlay represents a single layer of the multiple layers.

25. A method, comprising:
  at an electronic device with one or more processors and memory:
    receiving, from a user, an input corresponding to a request for assistance with a drawing;
    in accordance with receiving the input, selecting a physical surface in a physical environment;
    displaying, over the selected physical surface, a graphical overlay representing the drawing, wherein displaying the graphical overlay over the selected physical surface includes anchoring the graphical overlay to the selected physical surface; and
    while displaying the graphical overlay over the selected physical surface:
      detecting a marking produced by the user on the physical surface, the marking corresponding to the drawing.

26. The method of claim 25, wherein the input corresponds to a selection of an image corresponding to the drawing or to a selection of a 3-dimensional model corresponding to the drawing.

27. The method of claim 25, wherein the input includes a speech input specifying the drawing.

28. The method of claim 25, wherein selecting the physical surface includes:
  detecting one or more candidate physical surfaces;
  providing a first output indicative of the one or more candidate physical surfaces; and
  after providing the first output, receiving, from the user, a second input corresponding to a selection of the physical surface from the one or more candidate physical surfaces.

29. The method of claim 25, wherein selecting the physical surface includes:
  receiving, from the user, a third input corresponding to a selection of the physical surface, wherein displaying the graphical overlay over the selected physical surface is performed in accordance with receiving the third input.

30. The method of claim 25, wherein selecting the physical surface includes:
  determining that the graphical overlay is incompatible with a first candidate physical surface; and
  in accordance with a determination that the graphical overlay is incompatible with the first candidate physical surface, providing a second output indicating that the graphical overlay is incompatible with the first candidate physical surface.

31. The method of claim 25, further comprising:
  in accordance with receiving the input corresponding to the request for assistance with the drawing, displaying, over the physical environment, the graphical overlay with a first orientation; and
  while displaying the graphical overlay with the first orientation, receiving a fourth input corresponding to rotation of the graphical overlay, wherein displaying, over the selected physical surface, the graphical overlay includes:
    in accordance with receiving the fourth input, displaying, over the selected physical surface, the graphical overlay with a second orientation.

32. The method of claim 25, further comprising:
in accordance with receiving the input corresponding to the request for assistance with the drawing, displaying, over the physical environment, the graphical overlay with a first scale; and
while displaying the graphical overlay with the first scale, receiving a fifth input corresponding to rescaling the graphical overlay, wherein displaying, over the selected physical surface, the graphical overlay includes:
in accordance with receiving the fifth input, displaying, over the selected physical surface, the graphical overlay with a second scale.

33. The method of claim 25, wherein anchoring the graphical overlay to the selected physical surface includes:
displaying the graphical overlay at a third location on the selected physical surface;
detecting movement of the electronic device; and
in response to detecting the movement, continuing to display the graphical overlay at the third location.

34. The method of claim 25, wherein anchoring the graphical overlay to the selected physical surface includes:
anchoring the graphical overlay to the selected physical surface based on the detected marking produced by the user.

35. The method of claim 25, wherein:
the graphical overlay includes a first portion and a second portion;
the second portion is displayed at a fourth location; and
displaying, over the selected physical surface, the graphical overlay includes:
while displaying the first portion in a first manner, modifying the display of the graphical overlay to display the second portion in a second manner.

36. The method of claim 35, wherein the first portion, when displayed in the first manner, has a lesser transparency than the second portion displayed in the second manner.

37. The method of claim 35, further comprising:
detecting a second user gaze input; and
determining, based on the second user gaze input, that a user gaze is directed at the fourth location, wherein modifying the display of the graphical overlay is performed in accordance with a determination that the user gaze is directed at the fourth location.

38. The method of claim 35, further comprising:
detecting, at a fifth location, an appendage of the user; and
determining that the fifth location corresponds to the fourth location, wherein modifying the display of the graphical overlay is performed in accordance with determining that the fifth location corresponds to the fourth location.

39. The method of claim 35, further comprising:
detecting, at a sixth location, a tip of a drawing instrument associated with the user; and
determining that the sixth location corresponds to the fourth location, wherein modifying the display of the graphical overlay is performed in accordance with determining that the sixth location corresponds to the fourth location.

40. The method of claim 25, further comprising:
determining that the detected marking corresponds to a completed portion of the drawing; and
wherein displaying, over the selected physical surface, the graphical overlay includes:
in accordance with a determination that the detected marking corresponds to the completed portion of the drawing, modifying a display manner of a third portion of the graphical overlay, the third portion corresponding to the completed portion of the drawing.

41. The method of claim 25, further comprising:
while displaying the graphical overlay over the selected physical surface, detecting movement of the electronic device away from the selected physical surface; and
in accordance with detecting movement of the electronic device away from the selected physical surface:
determining whether one or more drawing completion criteria are satisfied;
in accordance with a determination that the one or more drawing completion criteria are satisfied:
modifying the display of the graphical overlay to display the graphical overlay in a third manner; and
in accordance with a determination that the one or more drawing completion criteria are not satisfied:
modifying the display of the graphical overlay to display the graphical overlay in a fourth manner.

42. The method of claim 25, wherein displaying, over the selected physical surface, the graphical overlay includes:
animating, using the graphical overlay, a suggested stroke order for the drawing.

43. A non-transitory computer-readable storage medium storing one or more programs, the one or more programs comprising instructions, which when executed by one or more processors of an electronic device, cause the electronic device to:
receive, from a user, an input corresponding to a request for assistance with a drawing;
in accordance with receiving the input, select a physical surface in a physical environment;
display, over the selected physical surface, a graphical overlay representing the drawing, wherein displaying the graphical overlay over the selected physical surface includes anchoring the graphical overlay to the selected physical surface; and
while displaying the graphical overlay over the selected physical surface:
detect a marking produced by the user on the physical surface, the marking corresponding to the drawing.

44. The non-transitory computer-readable storage medium of claim 43, wherein the input corresponds to a selection of an image corresponding to the drawing or to a selection of a 3-dimensional model corresponding to the drawing.

45. The non-transitory computer-readable storage medium of claim 43, wherein the input includes a speech input specifying the drawing.

46. The non-transitory computer-readable storage medium of claim 43, wherein selecting the physical surface includes:
detecting one or more candidate physical surfaces;
providing a first output indicative of the one or more candidate physical surfaces; and
after providing the first output, receiving, from the user, a second input corresponding to a selection of the physical surface from the one or more candidate physical surfaces.

47. The non-transitory computer-readable storage medium of claim 43, wherein selecting the physical surface includes:
receiving, from the user, a third input corresponding to a selection of the physical surface, wherein displaying the graphical overlay over the selected physical surface is performed in accordance with receiving the third input.

48. The non-transitory computer-readable storage medium of claim 43, wherein selecting the physical surface includes:
   determining that the graphical overlay is incompatible with a first candidate physical surface; and
   in accordance with a determination that the graphical overlay is incompatible with the first candidate physical surface, providing a second output indicating that the graphical overlay is incompatible with the first candidate physical surface.

49. The non-transitory computer-readable storage medium of claim 43, wherein the one or more programs further comprise instructions, which when executed by the one or more processors, cause the electronic device to:
   in accordance with receiving the input corresponding to the request for assistance with the drawing, display, over the physical environment, the graphical overlay with a first orientation; and
   while displaying the graphical overlay with the first orientation, receive a fourth input corresponding to rotation of the graphical overlay, wherein displaying, over the selected physical surface, the graphical overlay includes:
      in accordance with receiving the fourth input, displaying, over the selected physical surface, the graphical overlay with a second orientation.

50. The non-transitory computer-readable storage medium of claim 43, wherein the one or more programs further comprise instructions, which when executed by the one or more processors, cause the electronic device to:
   in accordance with receiving the input corresponding to the request for assistance with the drawing, display, over the physical environment, the graphical overlay with a first scale; and
   while displaying the graphical overlay with the first scale, receive a fifth input corresponding to rescaling the graphical overlay, wherein displaying, over the selected physical surface, the graphical overlay includes:
      in accordance with receiving the fifth input, displaying, over the selected physical surface, the graphical overlay with a second scale.

51. The non-transitory computer-readable storage medium of claim 43, wherein anchoring the graphical overlay to the selected physical surface includes:
   displaying the graphical overlay at a third location on the selected physical surface;
   detecting movement of the electronic device; and
   in response to detecting the movement, continuing to display the graphical overlay at the third location.

52. The non-transitory computer-readable storage medium of claim 43, wherein anchoring the graphical overlay to the selected physical surface includes:
   anchoring the graphical overlay to the selected physical surface based on the detected marking produced by the user.

53. The non-transitory computer-readable storage medium of claim 43, wherein:
   the graphical overlay includes a first portion and a second portion;
   the second portion is displayed at a fourth location; and
   displaying, over the selected physical surface, the graphical overlay includes:
      while displaying the first portion in a first manner, modifying the display of the graphical overlay to display the second portion in a second manner.

54. The non-transitory computer-readable storage medium of claim 53, wherein the first portion, when displayed in the first manner, has a lesser transparency than the second portion displayed in the second manner.

55. The non-transitory computer-readable storage medium of claim 53, wherein the one or more programs further comprise instructions, which when executed by the one or more processors, cause the electronic device to:
   detect a second user gaze input; and
   determine, based on the second user gaze input, that a user gaze is directed at the fourth location, wherein modifying the display of the graphical overlay is performed in accordance with a determination that the user gaze is directed at the fourth location.

56. The non-transitory computer-readable storage medium of claim 53, wherein the one or more programs further comprise instructions, which when executed by the one or more processors, cause the electronic device to:
   detect, at a fifth location, an appendage of the user; and
   determine that the fifth location corresponds to the fourth location, wherein modifying the display of the graphical overlay is performed in accordance with determining that the fifth location corresponds to the fourth location.

57. The non-transitory computer-readable storage medium of claim 53, wherein the one or more programs further comprise instructions, which when executed by the one or more processors, cause the electronic device to:
   detect, at a sixth location, a tip of a drawing instrument associated with the user; and
   determine that the sixth location corresponds to the fourth location, wherein modifying the display of the graphical overlay is performed in accordance with determining that the sixth location corresponds to the fourth location.

58. The non-transitory computer-readable storage medium of claim 43, wherein the one or more programs further comprise instructions, which when executed by the one or more processors, cause the electronic device to:
   determine that the detected marking corresponds to a completed portion of the drawing; and
   wherein displaying, over the selected physical surface, the graphical overlay includes:
      in accordance with a determination that the detected marking corresponds to the completed portion of the drawing, modifying a display manner of a third portion of the graphical overlay, the third portion corresponding to the completed portion of the drawing.

59. The non-transitory computer-readable storage medium of claim 43, wherein the one or more programs further comprise instructions, which when executed by the one or more processors, cause the electronic device to:
   while displaying the graphical overlay over the selected physical surface, detect movement of the electronic device away from the selected physical surface; and
   in accordance with detecting movement of the electronic device away from the selected physical surface:
      determine whether one or more drawing completion criteria are satisfied;
      in accordance with a determination that the one or more drawing completion criteria are satisfied:
         modify the display of the graphical overlay to display the graphical overlay in a third manner; and in accordance with a determination that the one or more drawing completion criteria are not satisfied:
    modify the display of the graphical overlay to display the graphical overlay in a fourth manner.

60. The non-transitory computer-readable storage medium of claim 43, wherein displaying, over the selected physical surface, the graphical overlay includes:
    animating, using the graphical overlay, a suggested stroke order for the drawing.

* * * * *